US012756441B2

(12) United States Patent
Luz et al.

(10) Patent No.: US 12,756,441 B2
(45) Date of Patent: Oct. 6, 2026

(54) METHODS AND APPARATUS FOR USING A MASTER DEVICE TO MITIGATE AND/OR AVOID INTERFERENCE IN UNCOORDINATED NETWORKS

(71) Applicant: Charter Communications Operating, LLC, St. Louis, MO (US)

(72) Inventors: Yehuda Yuda Luz, Buffalo Grove, IL (US); Muhammad Fazili, Audubon, PA (US); Francisco Azcuy, Miami, FL (US); Dumitru Ionescu, Poway, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 357 days.

(21) Appl. No.: 18/545,944

(22) Filed: Dec. 19, 2023

(65) Prior Publication Data

US 2025/0202554 A1 Jun. 19, 2025

(51) Int. Cl.
*H04L 5/14* (2006.01)
*H04B 7/06* (2006.01)
*H04B 17/336* (2015.01)

(52) U.S. Cl.
CPC ......... *H04B 7/0626* (2013.01); *H04B 17/336* (2015.01); *H04L 5/1469* (2013.01)

(58) Field of Classification Search
None
See application file for complete search history.

(56) References Cited

U.S. PATENT DOCUMENTS

2015/0078212 A1 3/2015 Buckley et al.
2019/0296873 A1* 9/2019 Gupta .................... H04B 7/024
2022/0264348 A1 8/2022 Manolakos et al.
2023/0067545 A1 3/2023 Hattab et al.

OTHER PUBLICATIONS

3GPP TSG RAN WG1 #112, R1-2300149 Athens, Greece, Feb. 27-Mar. 4, 2023.*
WF for co-existence study, 3GPP TSG-RAN WG4 Meeting #105, R4-2220246, Toulouse, France, Nov. 14-18, 2022, 7 pages.
(Continued)

*Primary Examiner* — Abdelillah Elmejjarmi
(74) *Attorney, Agent, or Firm* — Straub & Straub; Michael P. Straub; Stephen T. Straub

(57) ABSTRACT

Methods and apparatus relating to controlling TDD scheduling on a network wide and/or base station, e.g., gNB, basis are described. Depending on the exemplary method being implemented, the method includes one, more or all of 3 processes which can be used alone or in combination. A first exemplary process relates to implementing and using gNB CSI-IM measurements to determine a new TDD schedule which can then be used by devices, e.g., gNBs and UEs in the network. The second exemplary process relates to implementing and using UE and/or gNB CSI-IM measurements to determine a new TDD schedule which can then be used by devices in the network and/or communicating interference information to base stations. The third process uses interference information determined at an individual gNB and/or received from another device in determining slots, frequencies and/or symbols to be assigned and/or used by individual UEs at the gNB.

20 Claims, 31 Drawing Sheets

(56) References Cited

OTHER PUBLICATIONS

Simulation assumptions for SBFD adjacent channel co-existence study, 3GPP TSG-RAN WG4 Meeting # 105, R4-2220247, Toulouse, France, Nov. 14-Nov. 18, 2022, 28 pages.

Simulation assumptions for SBFD adjacent channel coexistence study on the UMa-to-UMi scenario, 3GPP TSG-RAN WG4 Meeting # 106, R4-2300143, Athens, Greece, Feb. 27-Mar. 3, 2023, 7 pages.

Adjacent channel co-existence use-case of non-overlapping sub band full duplex (SBFD) between n48 and n77, 3GPP TSG-RAN WG4 Meeting # 106, R4-2300145, Feb. 27-Mar. 3, 2022, 4 pages.

* cited by examiner

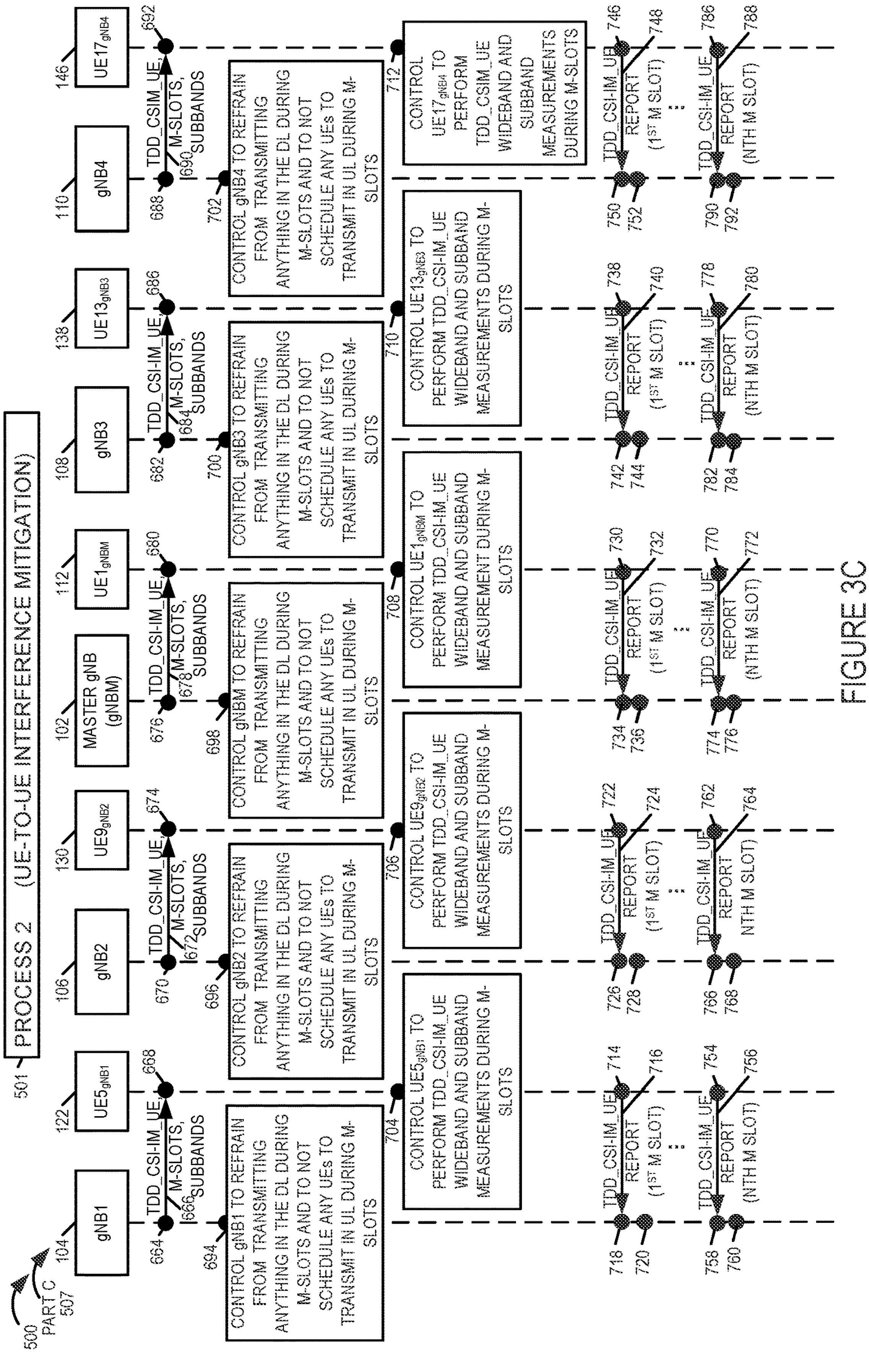
500
PART C
507
501
PROCESS 2 (UE-TO-UE INTERFERENCE MITIGATION)
104
gNB1
122
UE5gNB1
106
gNB2
130
UE9gNB2
102
MASTER gNB (gNBM)
112
UE1gNBM
108
gNB3
138
UE13gNB3
110
gNB4
146
UE17gNB4
TDD_CSI-IM_UE, M-SLOTS, SUBBANDS
TDD_CSIM_UE, M-SLOTS, SUBBANDS
664
666
668
670
672
674
676
678
680
682
684
686
688
690
692
694
CONTROL gNB1 TO REFRAIN FROM TRANSMITTING ANYTHING IN THE DL DURING M-SLOTS AND TO NOT SCHEDULE ANY UEs TO TRANSMIT IN UL DURING M-SLOTS
696
CONTROL gNB2 TO REFRAIN FROM TRANSMITTING ANYTHING IN THE DL DURING M-SLOTS AND TO NOT SCHEDULE ANY UEs TO TRANSMIT IN UL DURING M-SLOTS
698
CONTROL gNBM TO REFRAIN FROM TRANSMITTING ANYTHING IN THE DL DURING M-SLOTS AND TO NOT SCHEDULE ANY UEs TO TRANSMIT IN UL DURING M-SLOTS
700
CONTROL gNB3 TO REFRAIN FROM TRANSMITTING ANYTHING IN THE DL DURING M-SLOTS AND TO NOT SCHEDULE ANY UEs TO TRANSMIT IN UL DURING M-SLOTS
702
CONTROL gNB4 TO REFRAIN FROM TRANSMITTING ANYTHING IN THE DL DURING M-SLOTS AND TO NOT SCHEDULE ANY UEs TO TRANSMIT IN UL DURING M-SLOTS
704
CONTROL UE5gNB1 TO PERFORM TDD_CSI-IM_UE WIDEBAND AND SUBBAND MEASUREMENTS DURING M-SLOTS
706
CONTROL UE9gNB2 TO PERFORM TDD_CSI-IM_UE WIDEBAND AND SUBBAND MEASUREMENTS DURING M-SLOTS
708
CONTROL UE1gNBM TO PERFORM TDD_CSI-IM_UE WIDEBAND AND SUBBAND MEASUREMENT DURING M-SLOTS
710
CONTROL UE13gNB3 TO PERFORM TDD_CSI-IM_UE WIDEBAND AND SUBBAND MEASUREMENTS DURING M-SLOTS
712
CONTROL UE17gNB4 TO PERFORM TDD_CSIM_UE WIDEBAND AND SUBBAND MEASUREMENTS DURING M-SLOTS
TDD_CSI-IM_UE REPORT (1ST M SLOT)
TDD_CSI-IM_UE REPORT (NTH M SLOT)
714
716
718
720
722
724
726
728
730
732
734
736
738
740
742
744
746
748
750
752
754
756
758
760
762
764
766
768
770
772
774
776
778
780
782
784
786
788
790
792
FIGURE 3C

1900

1902 1904

| EXEMPLARY TDD CSI-IM BS PER SLOT MEASUREMENT REPORT INFORMATION (FROM gNB1 to MASTER gNB) | |
|---|---|
| SLOT NUMBER IN RADIO FRAME | AVERAGE BS MEASURED NOISE VALUE |
| 0 | AVERAGE gNB1 MEASURED NOISE VALUE (FOR THE M-SLOTS WHICH CORRESPOND TO SLOT 0) |
| 1 | AVERAGE gNB1MEASURED NOISE VALUE (FOR THE M-SLOTS WHICH CORRESPOND TO SLOT 1) |
| 2 | AVERAGE gNB1 MEASURED NOISE VALUE (FOR THE M-SLOTS WHICH CORRESPOND TO SLOT 2) |
| 3 | AVERAGE gNB1 MEASURED NOISE VALUE (FOR THE M-SLOTS WHICH CORRESPOND TO SLOT 3) |
| 4 | AVERAGE gNB1 MEASURED NOISE VALUE (FOR THE M-SLOTS WHICH CORRESPOND TO SLOT 4) |
| 5 | AVERAGE gNB1 MEASURED NOISE VALUE (FOR THE M-SLOTS WHICH CORRESPOND TO SLOT 5) |
| 6 | AVERAGE gNB1 MEASURED NOISE VALUE (FOR THE M-SLOTS WHICH CORRESPOND TO SLOT 6) |
| 7 | AVERAGE gNB1 MEASURED NOISE VALUE (FOR THE M-SLOTS WHICH CORRESPOND TO SLOT 7) |
| 8 | AVERAGEgNB1 MEASURED NOISE VALUE (FOR THE M-SLOTS WHICH CORRESPOND TO SLOT 8) |
| 9 | AVERAGEgNB1 MEASURED NOISE VALUE (FOR THE M-SLOTS WHICH CORRESPOND TO SLOT 9) |

FIGURE 11

2000

2002 2004 2006 ... 2008

| EXEMPLARY TDD CSI-IM UE PER SLOT MEASUREMENT REPORT INFORMATION (FROM gNB1 TO MASTER gNB) | | | | |
|---|---|---|---|---|
| SLOT NUMBER IN RADIO FRAME | AVERAGE UE WIDEBAND MEASURED NOISE VALUE | AVERAGE UE SUBBAND 1 MEASURED NOISE VALUE | ... | AVERAGE UE SUBBAND n MEASURED NOISE VALUE |
| 0 | AVERAGE UE WIDEBAND MEASURED NOISE VALUE (FOR SLOT 0 M-SLOTS) | AVERAGE UE SUBBAND 1 MEASURED NOISE VALUE (FOR SLOT 0 M-SLOTS) | ... | AVERAGE UE SUBBAND n MEASURED NOISE VALUE (FOR SLOT 0 M-SLOTS) |
| 1 | AVERAGE UE WIDEBAND MEASURED NOISE VALUE (FOR SLOT 1 M-SLOTS) | AVERAGE UE SUBBAND 1 MEASURED NOISE VALUE (FOR SLOT 1 M-SLOTS) | ... | AVERAGE UE SUBBAND n MEASURED NOISE VALUE (FOR SLOT 1 M-SLOTS) |
| 2 | AVERAGE UE WIDEBAND MEASURED NOISE VALUE (FOR SLOT 2 M-SLOTS) | AVERAGE UE SUBBAND 1 MEASURED NOISE VALUE (FOR SLOT 2 M-SLOTS) | ... | AVERAGE UE SUBBAND n MEASURED NOISE VALUE (FOR SLOT 2 M-SLOTS) |
| 3 | AVERAGE UE WIDEBAND MEASURED NOISE VALUE (FOR SLOT 3 M-SLOTS) | AVERAGE UE SUBBAND 1 MEASURED NOISE VALUE (FOR SLOT 3 M-SLOTS) | ... | AVERAGE UE SUBBAND n MEASURED NOISE VALUE (FOR SLOT 3 M-SLOTS) |
| 4 | AVERAGE UE WIDEBAND MEASURED NOISE VALUE (FOR SLOT 4 M-SLOTS) | AVERAGE UE SUBBAND 1 MEASURED NOISE VALUE (FOR SLOT 4 M-SLOTS) | ... | AVERAGE UE SUBBAND n MEASURED NOISE VALUE (FOR SLOT 4 M-SLOTS) |
| 5 | AVERAGE UE WIDEBAND MEASURED NOISE VALUE (FOR SLOT 5 M-SLOTS) | AVERAGE UE SUBBAND 1 MEASURED NOISE VALUE (FOR SLOT 5 M-SLOTS) | ... | AVERAGE UE SUBBAND n MEASURED NOISE VALUE (FOR SLOT 5 M-SLOTS) |
| 6 | AVERAGE UE WIDEBAND MEASURED NOISE VALUE (FOR SLOT 6 M-SLOTS) | AVERAGE UE SUBBAND 1 MEASURED NOISE VALUE (FOR SLOT 6 M-SLOTS) | ... | AVERAGE UE SUBBAND n MEASURED NOISE VALUE (FOR SLOT 6 M-SLOTS) |
| 7 | AVERAGE UE WIDEBAND MEASURED NOISE VALUE (FOR SLOT 7 M-SLOTS) | AVERAGE UE SUBBAND 1 MEASURED NOISE VALUE (FOR SLOT 7 M-SLOTS) | ... | AVERAGE UE SUBBAND n MEASURED NOISE VALUE (FOR SLOT 7 M-SLOTS) |
| 8 | AVERAGE UE WIDEBAND MEASURED NOISE VALUE (FOR SLOT 8 M-SLOTS) | AVERAGE UE SUBBAND 1 MEASURED NOISE VALUE (FOR SLOT 8 M-SLOTS) | ... | AVERAGE UE SUBBAND n MEASURED NOISE VALUE (FOR SLOT 8 M-SLOTS) |
| 9 | AVERAGE UE WIDEBAND MEASURED NOISE VALUE (FOR SLOT 9 M-SLOTS) | AVERAGE UE SUBBAND 1 MEASURED NOISE VALUE (FOR SLOT 9 M-SLOTS) | ... | AVERAGE UE SUBBAND n MEASURED NOISE VALUE (FOR SLOT 9 M-SLOTS) |

FIGURE 12

2100

2102 2104

| EXEMPLARY TDD CSI-IM BS PER M SLOT MEASUREMENT REPORT INFORMATION (FROM gNB1 to MASTER gNB) | |
|---|---|
| M-SLOT NUMBER | BS MEASURED NOISE VALUE |
| 1 | gNB1 MEASURED NOISE VALUE FOR FIRST M-SLOT |
| 2 | gNB1MEASURED NOISE VALUE FOR SECOND M-SLOT |
| 3 | gNB1 MEASURED NOISE VALUE FOR THIRD M-SLOT |
| ⋮ | ⋮ |
| 100 | gNB1 MEASURED NOISE VALUE FOR 100$^{TH}$ M-SLOT |

FIGURE 13

2200

2202 2204 2206 ... 2208

| EXEMPLARY TDD CSI-IM UE PER M SLOT MEASUREMENT REPORT INFORMATION (FROM gNB1 TO MASTER gNB) | | | | |
|---|---|---|---|---|
| M SLOT NUMBER | AVERAGE UE WIDEBAND MEASURED NOISE VALUE | AVERAGE UE SUBBAND 1 MEASURED NOISE VALUE | ... | AVERAGE UE SUBBAND n MEASURED NOISE VALUE |
| 1 | AVERAGE UE WIDEBAND MEASURED NOISE VALUE | AVERAGE UE SUBBAND 1 MEASURED NOISE VALUE | ... | AVERAGE UE SUBBAND n MEASURED NOISE VALUE |
| 2 | AVERAGE UE WIDEBAND MEASURED NOISE VALUE | AVERAGE UE SUBBAND 1 MEASURED NOISE VALUE | ... | AVERAGE UE SUBBAND n MEASURED NOISE VALUE |
| 3 | AVERAGE UE WIDEBAND MEASURED NOISE VALUE | AVERAGE UE SUBBAND 1 MEASURED NOISE VALUE | ... | AVERAGE UE SUBBAND n MEASURED NOISE VALUE |
| ⋮ | ⋮ | ⋮ | | ⋮ |
| 100 | AVERAGE UE WIDEBAND MEASURED NOISE VALUE | AVERAGE UE SUBBAND 1 MEASURED NOISE VALUE | ... | AVERAGE UE SUBBAND n MEASURED NOISE VALUE |

FIGURE 14

2400

| | 2402 | 2404 | 2406 | 2408 | 2410 | 2412 | 2414 | 2416 | 2418 | 2420 | 2422 | 2424 | 2426 | 2428 | 2430 | |
|---|---|---|---|---|---|---|---|---|---|---|---|---|---|---|---|---|
| | EXEMPLARY SLOT FORMATS FOR SPECIAL SLOT | | | | | | | | | | | | | | | |
| | FORMAT | SYMBOL NUMBER IN A SLOT | | | | | | | | | | | | | | |
| | | 0 | 1 | 2 | 3 | 4 | 5 | 6 | 7 | 8 | 9 | 10 | 11 | 12 | 13 | |
| 2432 | 0 | D | D | D | D | D | D | D | D | D | D | D | D | D | D | DL ONLY SLOT (DL SLOT) |
| 2434 | 1 | U | U | U | U | U | U | U | U | U | U | U | U | U | U | UL ONLY SLOT (UL SLOT) |
| 2436 | 2 | F | F | F | F | F | F | F | F | F | F | F | F | F | F | FLEXIBLE ONLY SLOT |
| 2438 | 3 | D | D | D | D | D | D | D | D | D | D | D | D | D | F | |
| | ⋮ | | | | | | | | | | | | | | | |
| 2440 | 8 | F | F | F | F | F | F | F | F | F | F | F | F | F | U | |
| | ⋮ | | | | | | | | | | | | | | | |
| 2442 | 19 | D | F | F | F | F | F | F | F | F | F | F | F | F | U | |
| | ⋮ | | | | | | | | | | | | | | | |
| 2444 | 55 | D | D | F | F | F | U | U | U | D | D | D | D | D | D | |
| 2446 | 56-254 | RESERVED | | | | | | | | | | | | | | |
| 2448 | 255 | UE DETERMINES THE SLOT FORMAT FOR THE SLOT BASED ON tdd-UL-DL-ConfigurationCommonDedicated and. if any detected DCI formats | | | | | | | | | | | | | | |

Formats 3 through 55: MIXED SLOTS

Formats 2 through 55: (FLEXIBLE SLOT)

2450

NOTES:

EACH 1 msec SLOT HAS 14 SYMBOLS (0, 1, ..., 13)
EACH SYMBOL CAN BE UL, DL, OR FLEXIBLE
D = DOWNLINK (DL) SYMBOL
U = UPLINK (UL) SYMBOL
F = FLEXIBLE SYMBOL
(EACH FLEXIBLE SYMBOL CAN BE IDLE (GUARD SYMBOL OR RESERVED SYMBOL), UL SYMBOL, OR DL SYMBOL

FIGURE 16

METHODS AND APPARATUS FOR USING A MASTER DEVICE TO MITIGATE AND/OR AVOID INTERFERENCE IN UNCOORDINATED NETWORKS

FIELD

The present application relates to communications methods and, more particularly to methods and apparatus for mitigating and/or avoiding interference in uncoordinated networks and, more particularly, in some embodiments to methods and apparatus for generating one or more TDD schedules to be used in a network and/or controlling at a base station allocation of resources such as time slots or frequency resources to individual devices.

BACKGROUND

Third Generation Partnership Project (3GPP) is a consortium which generates specifications that cover cellular telecommunications technologies, including radio access, core network and service capabilities, which provide a complete system description for mobile telecommunications.

3GPP SBFD (Sub Band Full Duplex) operation is a new feature to be released in Release 18 (Rel-18) of the 3GPP standards. This feature allows a gNB base station to operate in full duplex on a time division duplex (TDD) carrier.

TDD transmission of one network, referred to as an aggressor network, can interfere with TDD operation of another network, e.g., a victim network, that is not synchronized in terms of TDD structure with the aggressor network especially during an UL time-slot. Similar uncoordinated interference will be caused in the victim network if the adjacent aggressor network employs dynamic TDD. Also, SBFD in the uncoordinated aggressor network can cause similar interference to the TDD victim network. Uncoordinated networks case cause gNB-to-gNB interference, which is when uplink reception at the victim gNB is interfered by the DL transmission of the adjacent aggressor gNB. Another interference that can happen for uncoordinated networks and for SBFD networks that enabled SBFD feature in DL TDD slots is UE-to-UE interference, which is caused when DL traffic reception of the victim UE is interfered by the UL transmission of a nearby aggressor UE.

Since the aggressor gNB of the aggressor network is normally much more powerful than a TDD UE of the victim network, the interference can lead to severe degradation in area coverage and in data speed which may cause a blocking of the victim, e.g., legacy, TDD network included therein.

In view of the above it should be appreciated that there is a need for improved methods and/or apparatus for controlling or mitigating interference between networks. This is particularly the case where the timing structures of the different network and/or devices in the networks are unsynchronized in terms of uplink/downlink (UL/DL) timing structures as may be the case where devices in one network support 3GPP SBFD and devices in another network do not support 3GPP SBFD.

SUMMARY

Various features will be explained in the context of an exemplary embodiment where base stations are implemented as gNBs and user equipment, such as user devices including, for example, cell phones, wireless data collecting devices, pad devices, etc, are referred to as UEs. While in some embodiments base stations are implemented as gNBs they could also be implemented as WiFi access points or as various other devices which provide base station functionality that can be used by a user device to connect to a communications network.

The methods and apparatus relate to controlling TDD scheduling on a network wide and/or base station, e.g., gNB, basis depending on the particular embodiment. Depending on the exemplary method being implemented, the method includes one, more or all of 3 processes referred to as a first process, second process and third process, respectively, which can be used alone or in combination. A first exemplary process, e.g., process 1, includes steps relating to implementing and using gNB CSI-IM measurements to determine a new TDD schedule which can then be used by devices, e.g., gNBs and UEs in the network. The second exemplary process, e.g., process 2, includes steps relating to implementing and using UE and/or gNB CSI-IM measurements to implement scheduling at base stations, e.g., the master base station and/or other base stations which received interference information from the master base station. As part of the scheduling process per slot and/or per symbol per slot interference information is used at a base station to determine which UEs particular slots and/or symbols are assigned.

In some embodiments in which process 2 is used, individual base stations receive per slot and/or per symbol interference information, e.g., from a master device. The base station implementing the scheduling than identifies UEs at a cell edge, e.g., based on interference information. Cell edge UEs are then given priority during scheduling of UL and/or DL slots with slot and/or symbols with better conditions, e.g., lower noise, being allocated to cell edge UEs before less favorable, from a noise perspective, slots and/or symbols of slots are assigned to non-cell edge UEs. Thus cell edge UEs are provided in some embodiments preferential treatment when being assigned slots and/or symbols over non-cell edge UEs with slots and/or symbols having better noise or average noise characteristics being given to cell edge UEs and the lower quality, e.g., nosier slots and/or symbols being assigned to non-cell edge UEs. In some embodiments noise information from the master device that corresponds to base station noise measurements is used by a schedule when making UL slot assignments and/or assignments of symbols of UL slots. In the case of DL assignments, UE noise measurement information communicated from the master to the base station implementing the method is taken into consideration. In addition to, or as an alternative to using master device provided noise measurement information, a base station may use noise, e.g., interference, information measured at the base station implementing the scheduling. When per symbol noise is taken into consideration a cell edge UE can and sometimes is assigned a low noise symbol of a slot with a non-cell edge UE being assigned a noise symbol of the same slot. Thus, by taking into consideration per symbol noise, e.g., per symbol noise communicated from a master device to the base station performing the scheduling, cell edge and non-cell edge UEs may be assigned different symbols of the same UL or DL slot due to the symbols having different associated noise levels.

The third process, e.g., process 3, uses measurements made at an individual gNB and/or by UEs at the gNB, e.g., the base station implementing the third process, in determining slots and/or frequencies to be assigned and/or used by individual UEs at the gNB. The noise measurements made at the gNB can be used made on a per slot and/or per symbol basis and are used in some embodiments in making scheduling decisions including DL slot assignments to UEs and/or assignment of DL symbols to UEs. In embodiment 3 cell edge UEs are giving priority over non-cell edge UEs in at least some embodiments with cell edge UEs being given less noisy slots or symbols with non-cell edge UEs being assigned to slots/symbols having a higher level of noise than the slots assigned to cell edge UEs. In some cases where noise measurements made by the UE are used in making DL slot assignments or assignments of symbols of DL slots, UL assignments of slots and/or symbols of UL slots are made based on interference information measured by one or more base stations which is communicated to the base station implementing the scheduling of UEs.

Process 1 is used to mitigate base station to base station (e.g., gNB to gNB) interference. Process 2 is used to mitigate UE to UE interference. Process 3 is used to mitigate UE interference for edge cell UEs.

In some but not all embodiments base stations and/or UEs perform per slot noise and per symbol noise measurements. Per slot measurements (DL or UL) noise measurements performed by base stations and/or UEs include measurement per symbol in the slot and also measurement per slot (e.g., by averaging across all the symbols). Both these measurements are conveyed to master device/node when the device performing the measurements is a device other than the master device. The master device then conveys per slot noise and per symbol noise for each slot back to all the gNBs so that it is available for use in scheduling UEs. The per symbol noise information is also used in some embodiments by the gNBs in deciding whether to use symbols as DL or UL or keep them flexible.

Numerous additional features, benefits and exemplary embodiments are discussed in the detailed description which follows.

BRIEF DESCRIPTION OF THE FIGURES

FIG. 3C is a third part of an exemplary signaling diagram of exemplary process 2 for UE-to-UE interference mitigation.

FIG. 11 is a drawing of a table including exemplary TDD CSI-IM BS per slot measurement report information, in accordance with an exemplary embodiment.

FIG. 12 is a drawing of a table including exemplary TDD CSI-IM UE per slot measurement report information, in accordance with an exemplary embodiment.

FIG. 13 is a drawing of a table including exemplary TDD CSI-IM BS per M slot measurement report information, in accordance with an exemplary embodiment.

FIG. 14 is a drawing of a table including exemplary TDD CSI-IM UE per M slot measurement report information, in accordance with an exemplary embodiment.

FIG. 16 is a drawing which includes a table which illustrates exemplary slot formats for a special slot, wherein at least some of the slot formats including flexible symbols.

DETAILED DESCRIPTION

Figure 1:
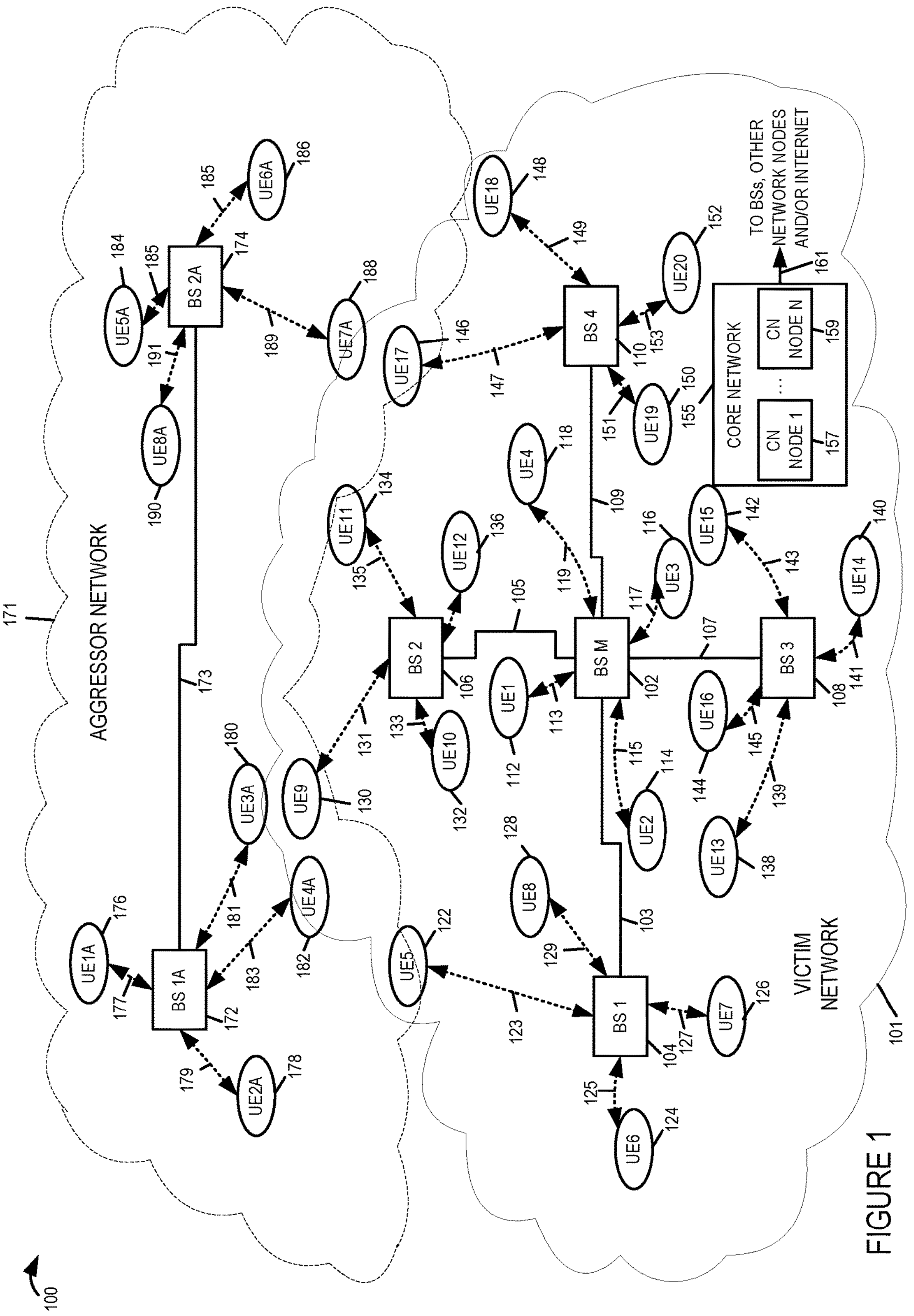
FIG. 1 is a drawing of an exemplary communications system which includes a victim network and an aggressor network.

FIG. 1 is a drawing of an exemplary communications system 100 which includes a victim network 101 and an aggressor network 171. Victim network 101 includes features in accordance with the present invention, to mitigate the effects of interference from the aggressor network. The victim network 101 includes a plurality of base stations, e.g. gNB base stations (base station M (BS M) 102, e.g., gNB M, which is a designated master base station, base station 1 (BS1) 104, e.g., gNB1, base station 2 (BS2) 106, base station 3 (BS3) 108, e.g., gNB3, base station 4 (BS4) 110, e.g., gNB4), and a core network (CN) 155 including a plurality of core network nodes (CN node 1 157, . . . , CN node 2 159), coupled together via communications link 161. Master BS M 102 is coupled to each of the other BSs (BS1 104, BS2 106, BS3 108, BS4 110), via communications links (103, 105, 107, 109), respectively. Victim network 101 further includes a plurality of user equipments (UEs) (UE1 112, UE2 114, UE3 116, UE4 118, UE5 122, UE6 124, UE7 126, UE8 128, UE9 130, UE10 132, UE11 134, UE12 136, UE13 138, UE14 140, UE15 142, UE16 144, UE17 146, UE18, 148, UE19 150, UE20 152). At least some of the UEs are mobile devices which may move throughout network 101 and be connected to different base stations at different times. UE1 112, UE2 114, UE3 116 and UE4 118 are shown in FIG. 1, as being currently connected to BS M 102 via wireless links (113, 115, 117, 119), respectively. UE5 122, UE6 124, UE7 126 and UE8 128 are shown in FIG. 1, as being currently connected to BS 1 104 via wireless links (123, 125, 127, 129), respectively. UE9 130, UE10 132, UE11 134 and UE12 136 are shown in FIG. 1, as being currently connected to BS 2 106 via wireless links (131, 133, 135, 137), respectively. UE13 138, UE14 140, UE15 142 and UE16 144 are shown in FIG. 1, as being currently connected to BS 3 108 via wireless links (139, 141, 143, 145), respectively. UE17 146, UE18 148, UE19 150 and UE20 152 are shown in FIG. 1, as being currently connected to BS 4 110 via wireless links (147, 149, 151, 153), respectively.

The aggressor network 171 includes a plurality of base stations, e.g., gNB base stations (base station 1A (BS1A) 172, base station 2A (BS2A) 174 coupled together via communications link 173. Network 171 further includes a plurality of user equipments (UEs) (UE1A 172, UE2A 178, UE3A 180, UE4A 182, UE5A 184, UE6A 186, UE7A 188, UE8A 190). At least some of the UEs are mobile devices which may move throughout network 171 and be connected to different base stations at different times. UE1A 176, UE2A 178, UE3A 180 and UE4A 182 are shown in FIG. 1, as being currently connected to BS 1A 172 via wireless links (177, 179, 181, 183), respectively. UE5A 184, UE6A 186, UE7A 188 and UE8A 190 are shown in FIG. 1, as being currently connected to BS 2A 174 via wireless links (185, 187, 189, 191), respectively.

Victim network 1 101 and aggressor network 171 are both using TDD timing structures and are nominally timing synchronized, e.g., with respect to start times, length, number of slots and slot duration. However, the particular TDD-UL-DL implementation currently being used by the aggressor network 171 may be, and generally is, different than the particular TDD-UL-DL implementation currently being used by the victim network 101, e.g., with the aggressor network 171 scheduling UL slots in different slot positions than the victim network 101 is currently using for its UL slots, and/or scheduling a different number of UL slots than the victim network 101 is scheduling. In addition, the aggressor network 171 configuration may include slots in which a first portion (subband) is for uplink and a second portion (second subband) is for downlink. The aggressor network 171 may change its configuration, e.g., dynamically, and without notice to the victim network 101. The aggressor network 171 may assign slots which can be used differently by different base stations in its network, e.g. depending on local resource needs. Lack of coordination of TDD-UL-DL configurations between the victim network 101 and aggressor network 171, with regards to the slot usage, can result in high levels of interference, at the victim network 101, e.g., when both the victim network 101 and the aggressor network 171 are using the same frequency band, e.g., a TDD frequency band e.g., n77 band, which is available to be used by both networks.

Signals transmitted by the base stations (BS 1A 172, BS 2A 174) and by the UEs (UE1A 172, UE2A 178, UE3A 180, UE4A 182, UE5A 184, UE6A 186, UE7A 188, UE8A 190) of aggressor network 171, are viewed from the perspective of the BSs and UEs of the victim network 101 as interference.

Figure 7:
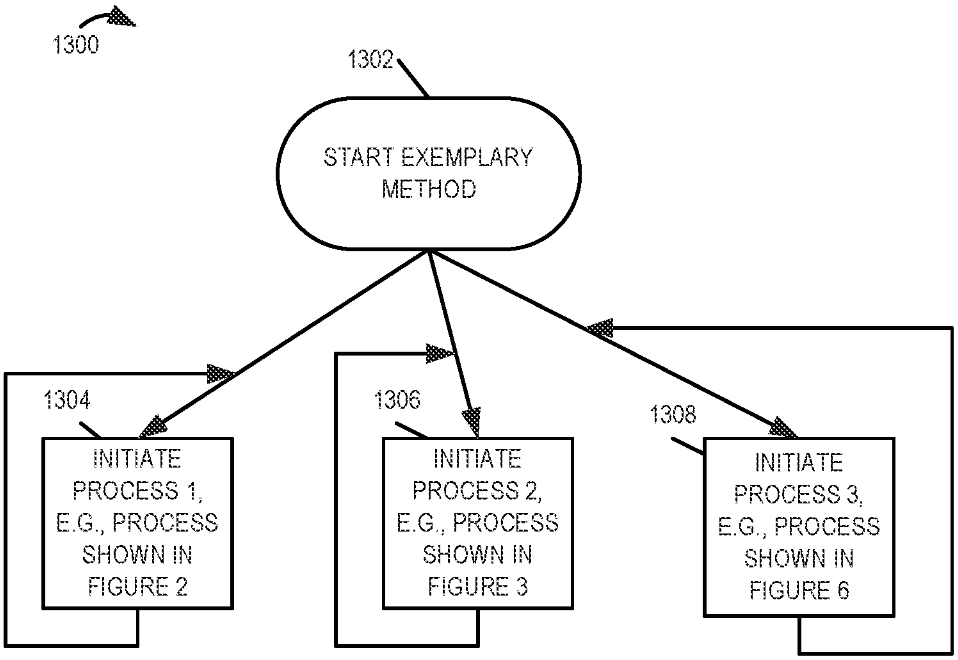
FIG. 7 is a drawing illustrating an exemplary method which includes process 1 of FIG. 2, process 2 of FIG. 3, and/or process 3 of FIG. 6.

The victim network 101 is implemented, in accordance with the present invention, to perform various processes, e.g., one or more processes as shown in FIG. 7, to mitigate the effects of interference from the aggressor network 171.

Referring now briefly to FIG. 7, the steps of an exemplary method 1300 implemented in accordance with one exemplary embodiment are shown. The method 1300 is for controlling TDD scheduling on a network wide and/or base station basis, e.g., gNB, basis, depending on the particular embodiment. Depending on the exemplary method being implemented, the method includes one, more or all of 3 of three processes, e.g., a first process, also referred to as process 1, a second process sometimes referred to as process 2, and a third process sometimes referred to as process 3. The individual processes can be used alone or in combination depending on the embodiment. Thus, while FIG. 7 shows the three processes being used together, an individual embodiment may implement one, two or all three processes depending on the particular embodiment.

The method 1300 shown in FIG. 7 begins in start step 1302 with components in the system, e.g., gNBs being powered on. Operation proceeds from start step 1302 to steps 1304, 1306 and 1308 in which first, second and third processes are initiated. Initiation of process 1 in step 1304 includes starting to perform the steps of the process shown in FIG. 2. Process 1 includes steps relating to implementing and using gNB CSI-IM measurements to determine a new TDD schedule which can then be used by devices, e.g., gNBs and UEs in the network. Process 1 involves use of a base station or other network device as a master device and is well suited for generating a TDD schedule which is designed to mitigate the effect of interference on uplink communications.

Figure 3:
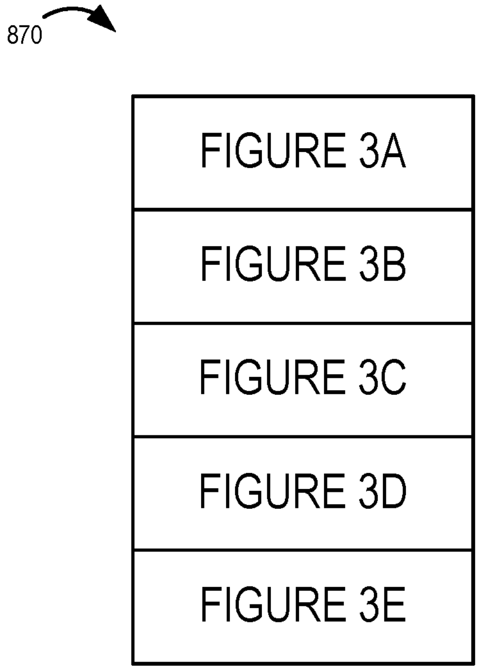
FIG. 3 comprises the combination of FIG. 3A, FIG. 3B, FIG. 3C, FIG. 3D and FIG. 3E.
Figure 3A:
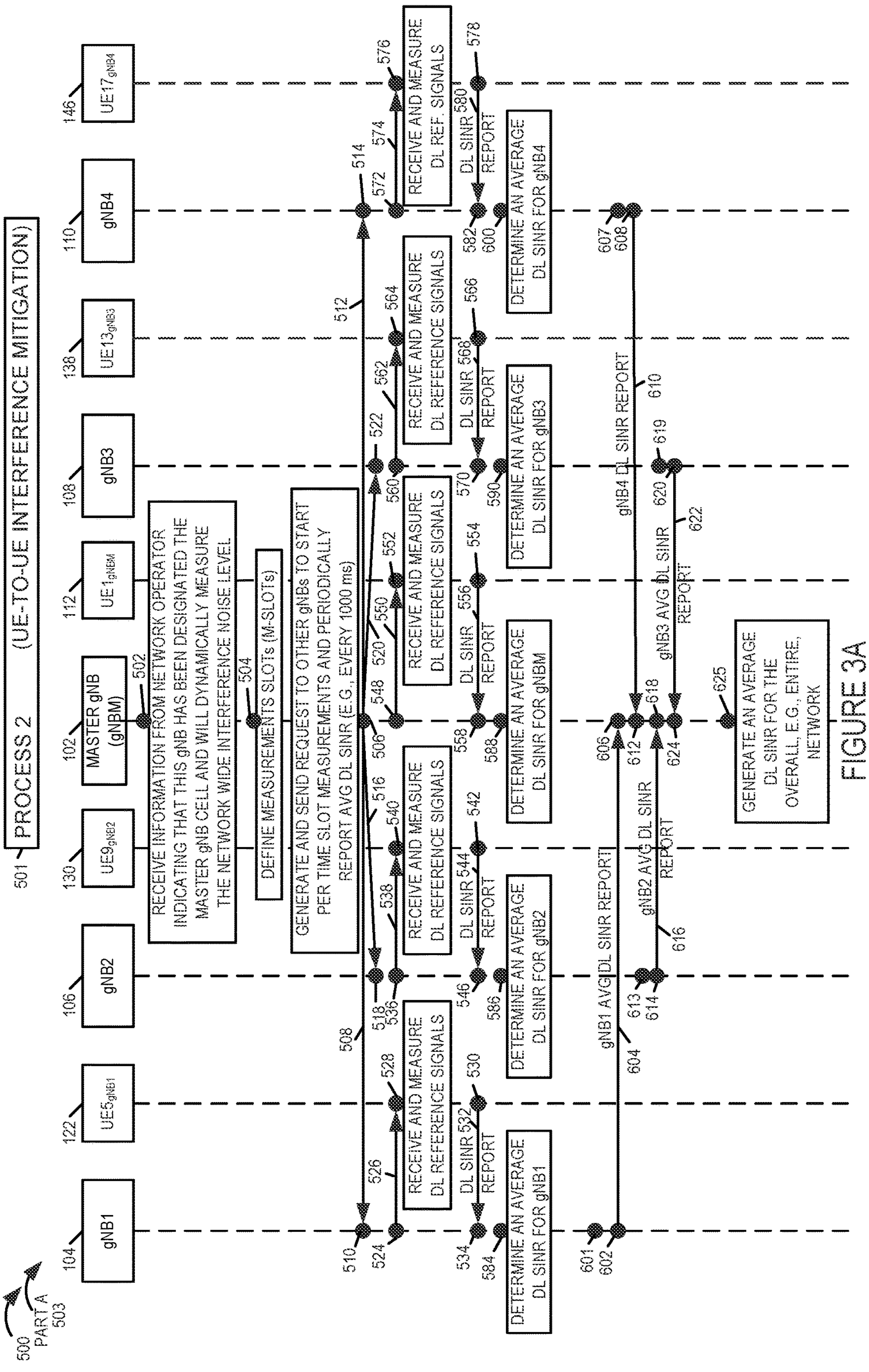
FIG. 3A is a first part of an exemplary signaling diagram of exemplary process 2 for UE-to-UE interference mitigation.
Figure 3B:
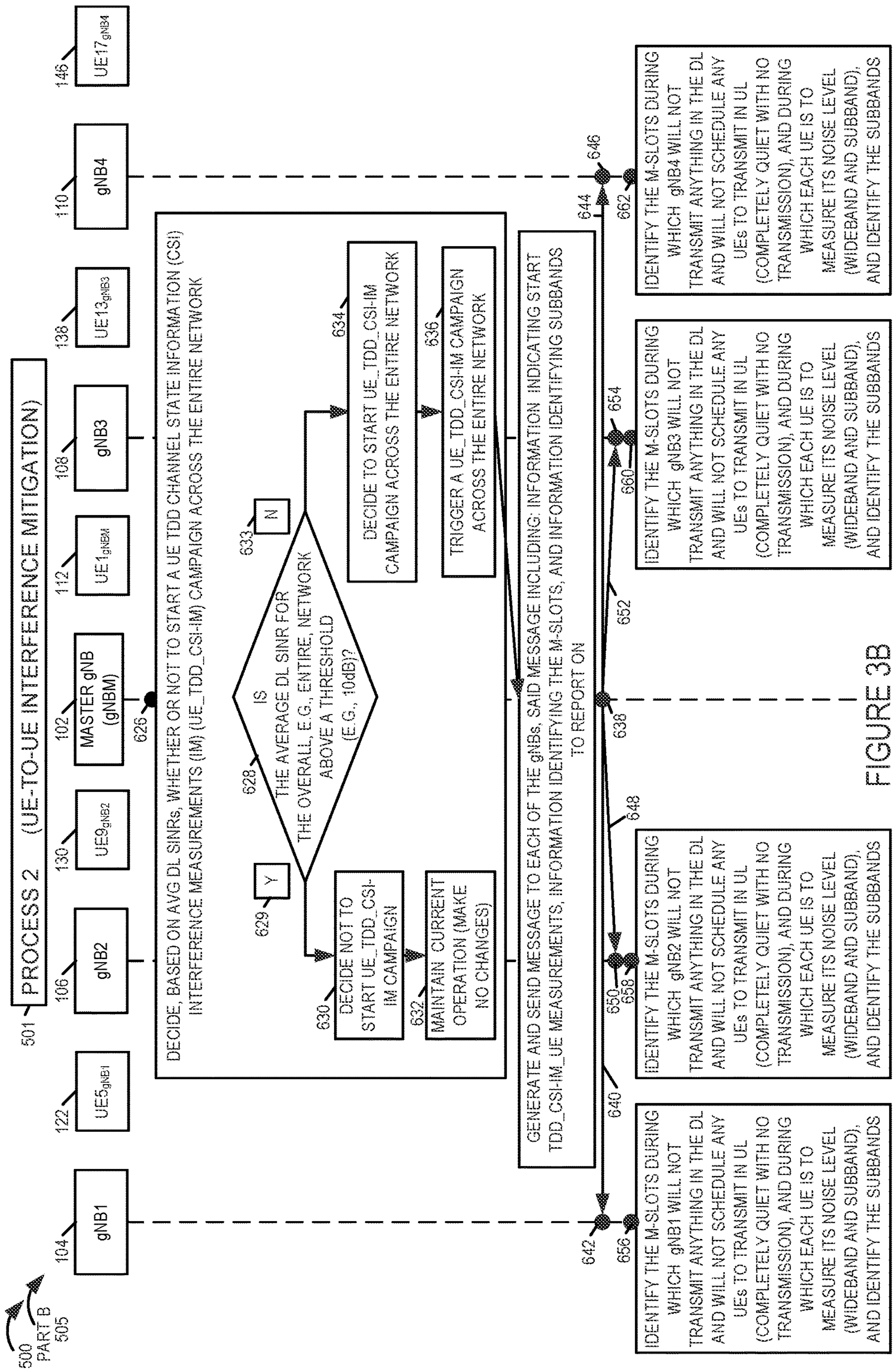
FIG. 3B is a second part of an exemplary signaling diagram of exemplary process 2 for UE-to-UE interference mitigation.
Figure 3D:
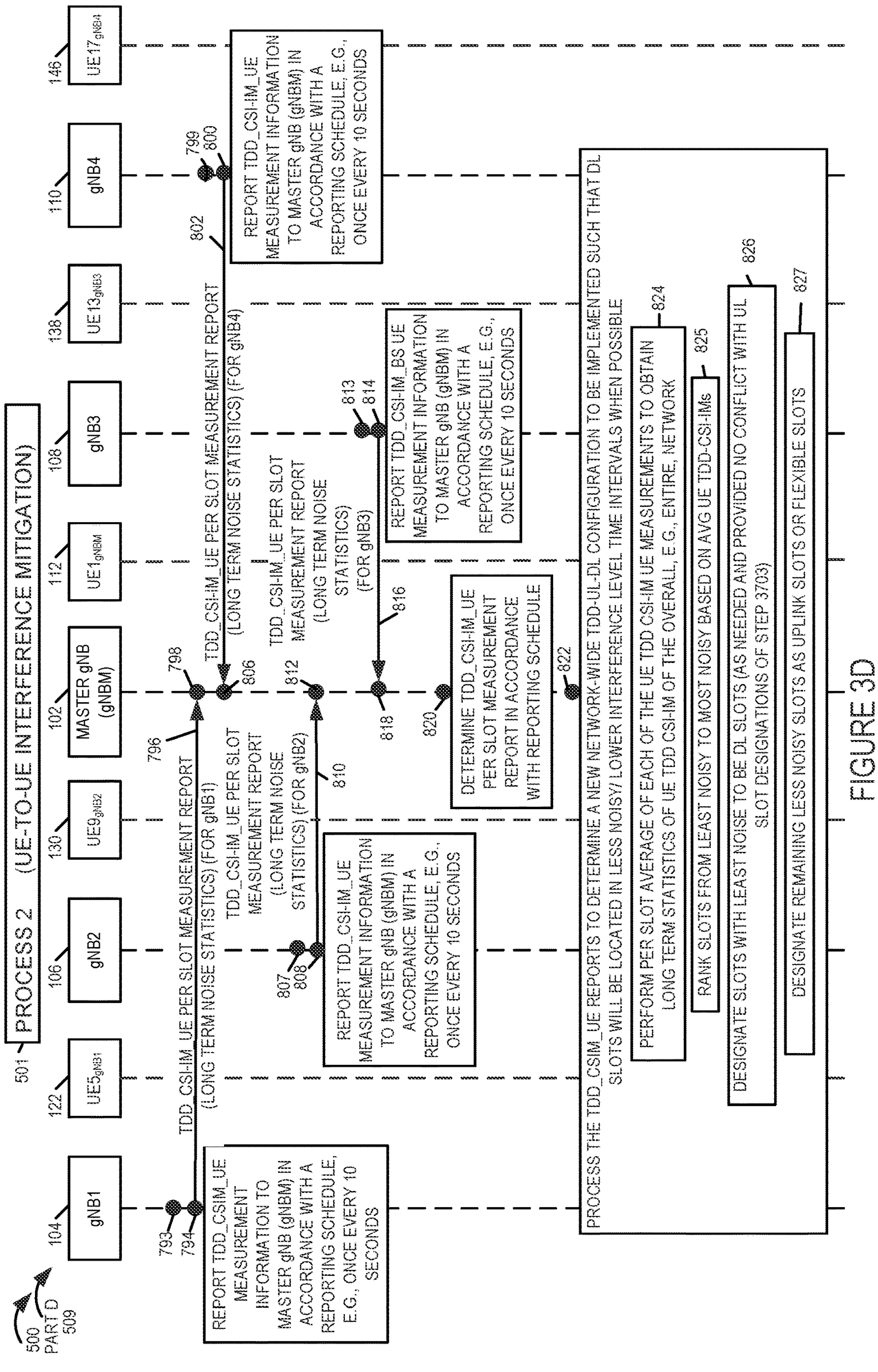
FIG. 3D is a fourth part of an exemplary signaling diagram of exemplary process 2 for UE-to-UE interference mitigation.
Figure 3E:
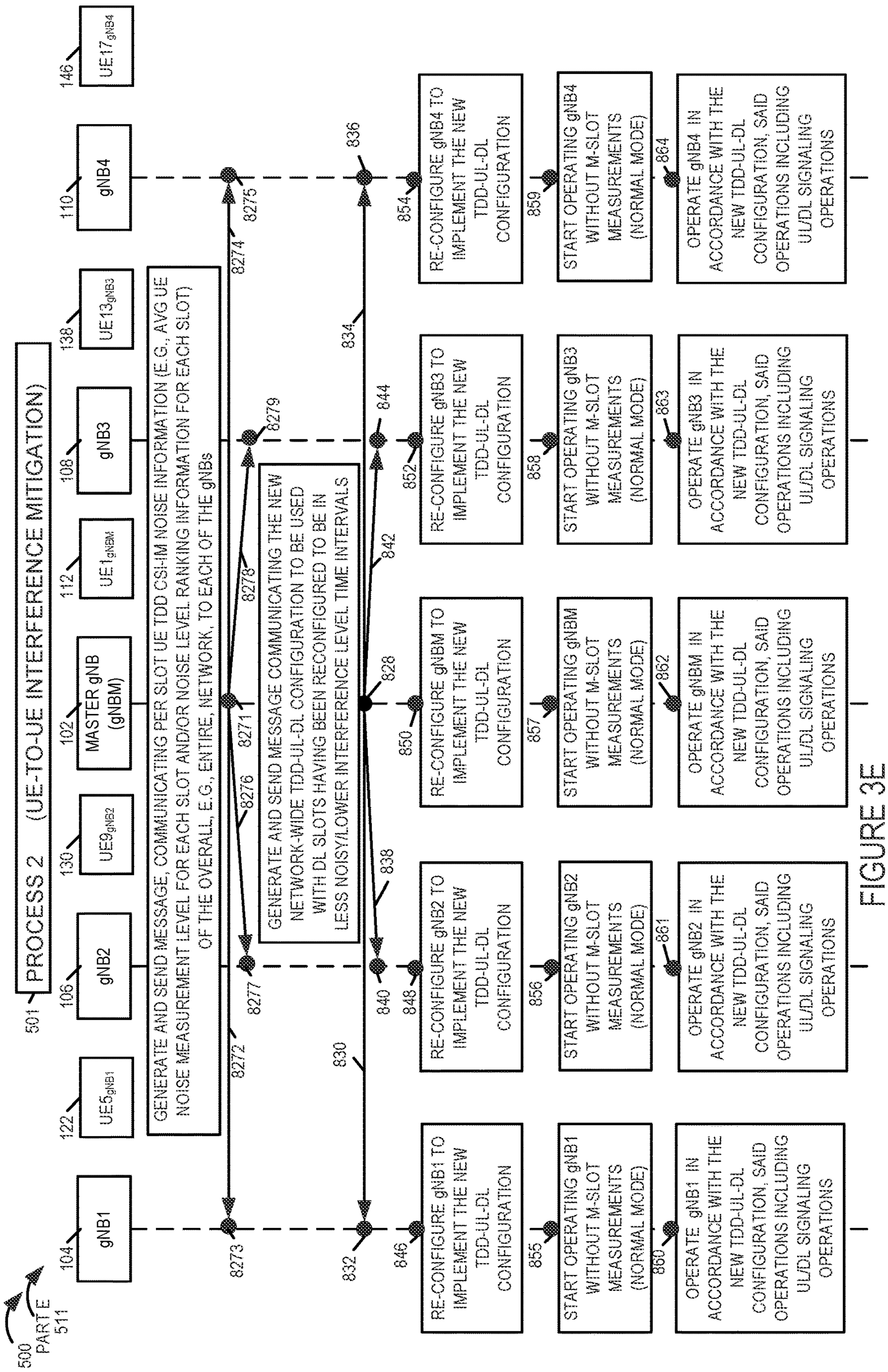
FIG. 3E is a fifth part of an exemplary signaling diagram of exemplary process 2 for UE-to-UE interference mitigation.

Initiation of process 2 occurs in step 1306 and includes starting to perform the steps shown in FIG. 3. The second exemplary process, e.g., process 2, includes steps relating to implementing and/or using UE and/or gNB CSI-IM measurements to determine a new TDD schedule which can then be used by devices, e.g., gNBs and UEs in the network. Process 2, like process 1 involves a network device operating as a master device. Process 2 is well suited for mitigating or avoiding interface that might affect downlink communications. The third exemplary process, e.g., process is initiated by starting to perform the steps of the method shown in FIG. 3. Process 3 involves steps implemented at individual base stations and involves allocation of resources to individual UEs in a manner intended to promote successful communication particularly by UEs located at or near cell edges. Process 3 does not require the presence or use of a master base station but can and often is implemented by base stations, including a master base station. Process 3 involves use of measurements made at an individual base stations and/or by UEs at the individual base station implementing process 3 to control time and/or frequency resources to UEs at the base station performing the steps of process 3.

As noted above, depending on the particular embodiment, one, more than one, or all of processes 1, 2 and/or 3 are implemented. Process 3 when implemented may be performed by some base stations while other base stations may or may not implement the process. The processes, one initiated, may be and sometimes are performed on an ongoing basis as represented by the arrow leaving each of the initiate process steps 1304, 1306, 1308 returning to the top of the initiate process step.

Figure 2:
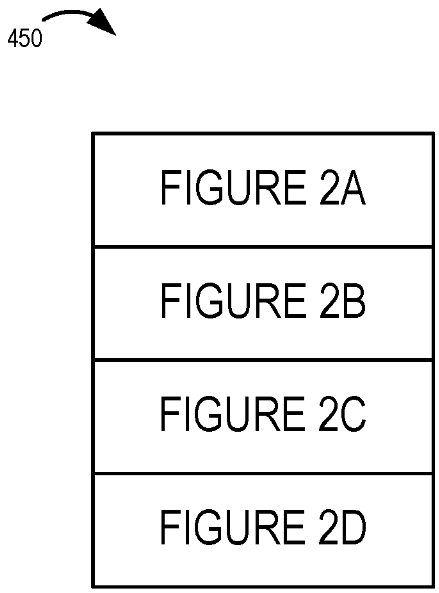
FIG. 2 comprises the combination of FIG. 2A, FIG. 2B, FIG. 2C and FIG. 2D.
Figure 2A:
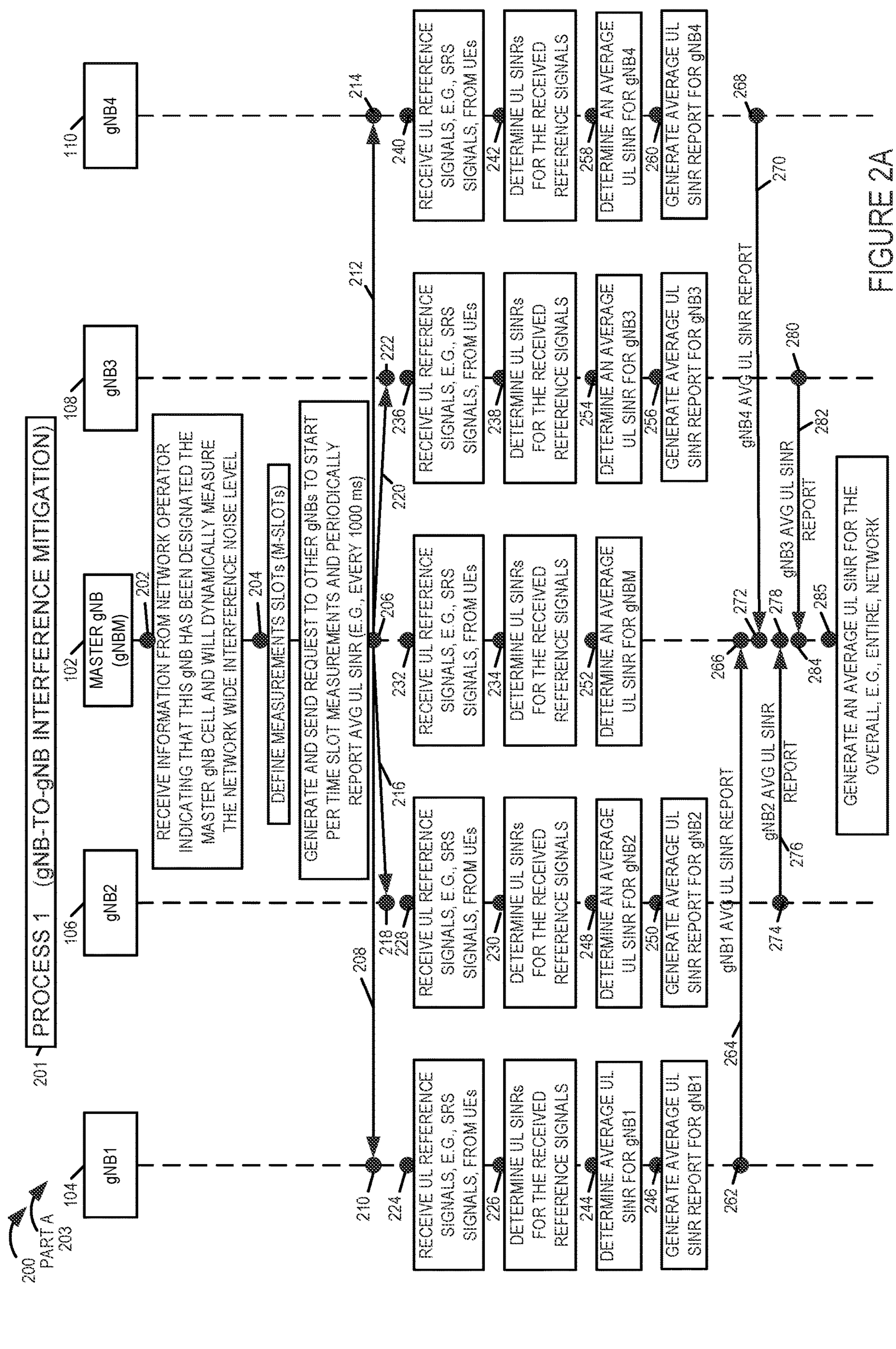
FIG. 2A is a first part of an exemplary signaling diagram of exemplary process 1 for base station-to-base station, e.g., gNB-to-gNB, interference mitigation.
Figure 2B:
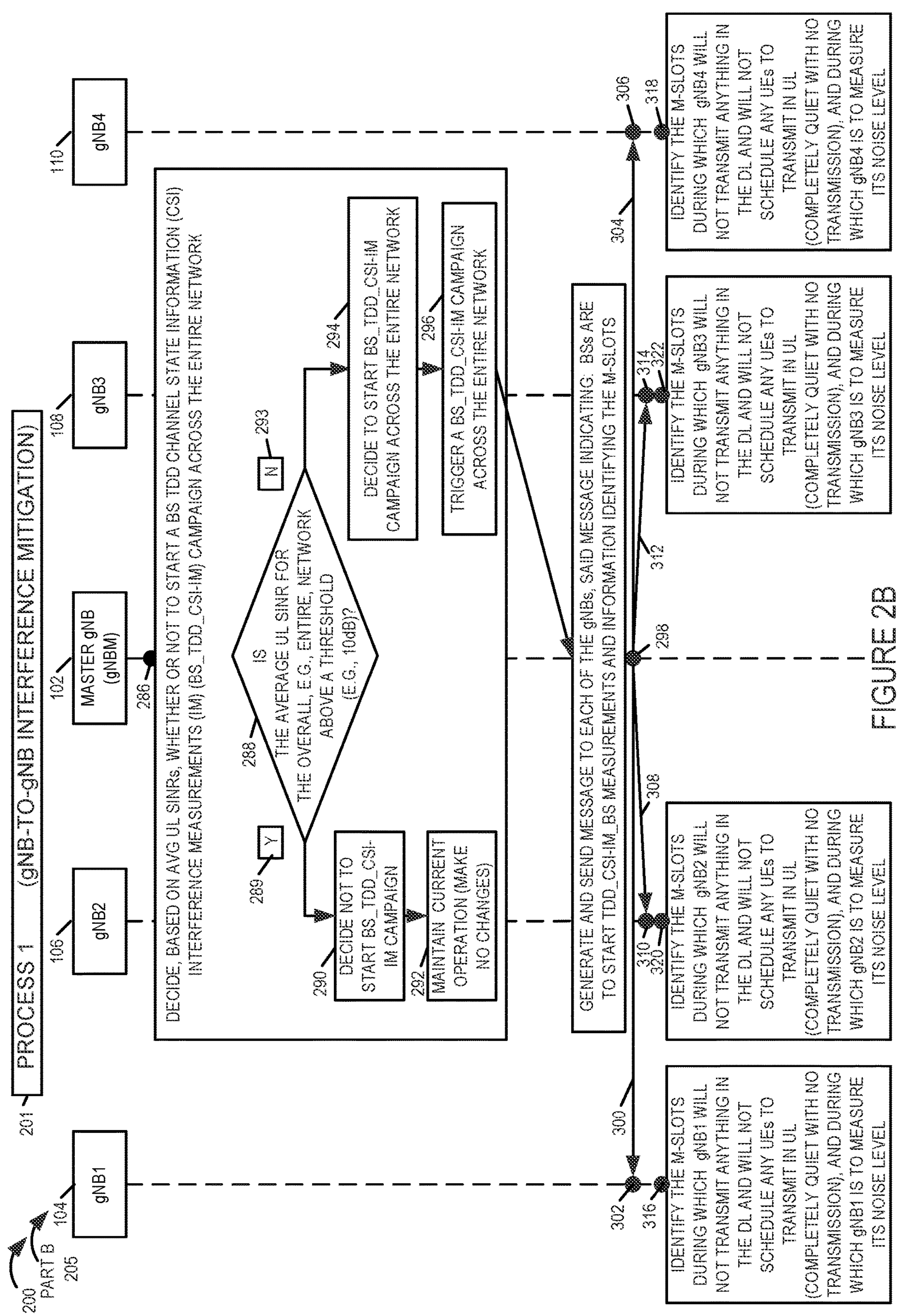
FIG. 2B is a second part of an exemplary signaling diagram of exemplary process 1 for base station-to-base station, e.g., gNB-to-gNB, interference mitigation.
Figure 2C:
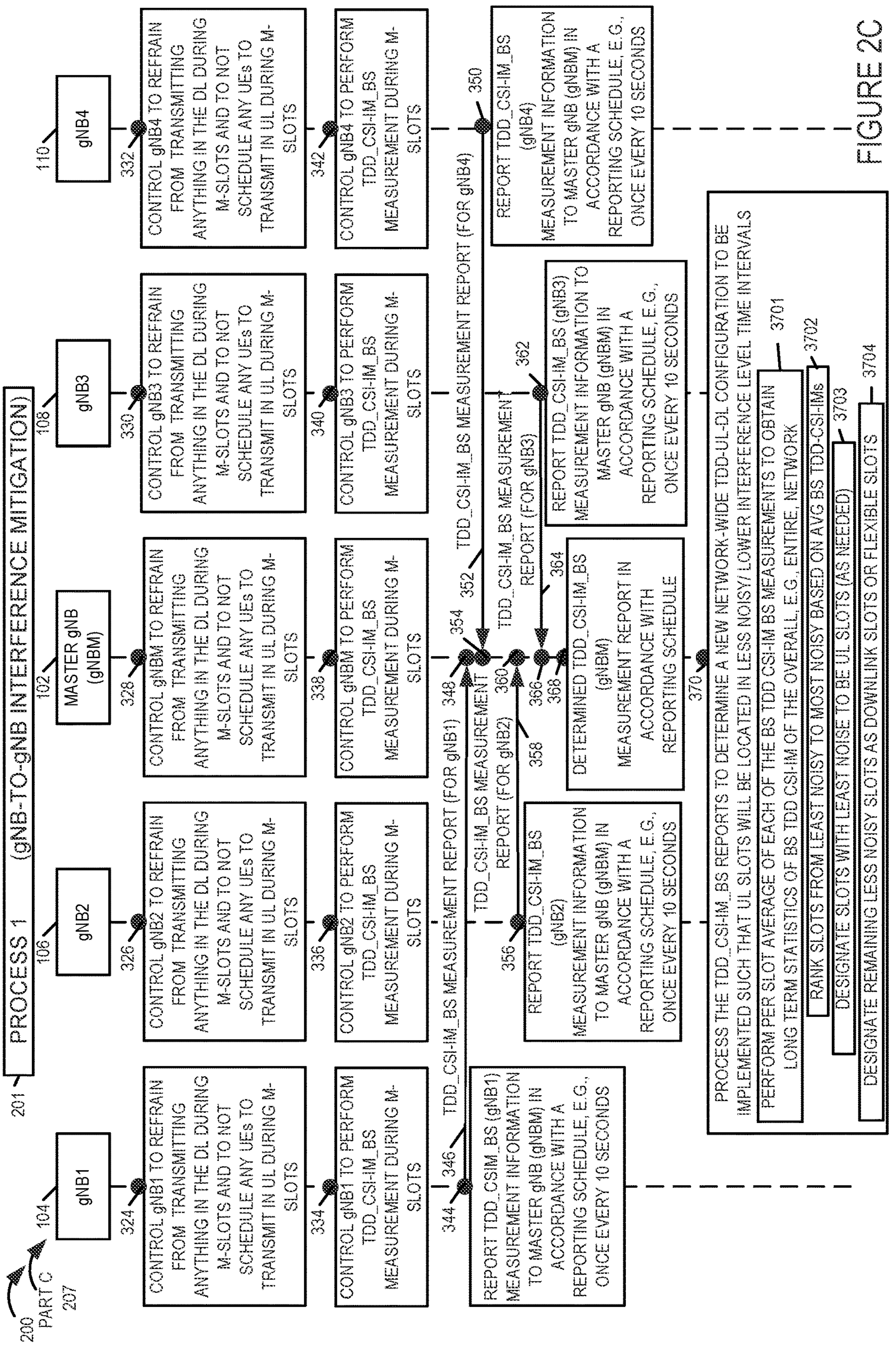
FIG. 2C is a third part of an exemplary signaling diagram of exemplary process 1 for base station-to-base station, e.g., gNB-to-gNB, interference mitigation.
Figure 2D:
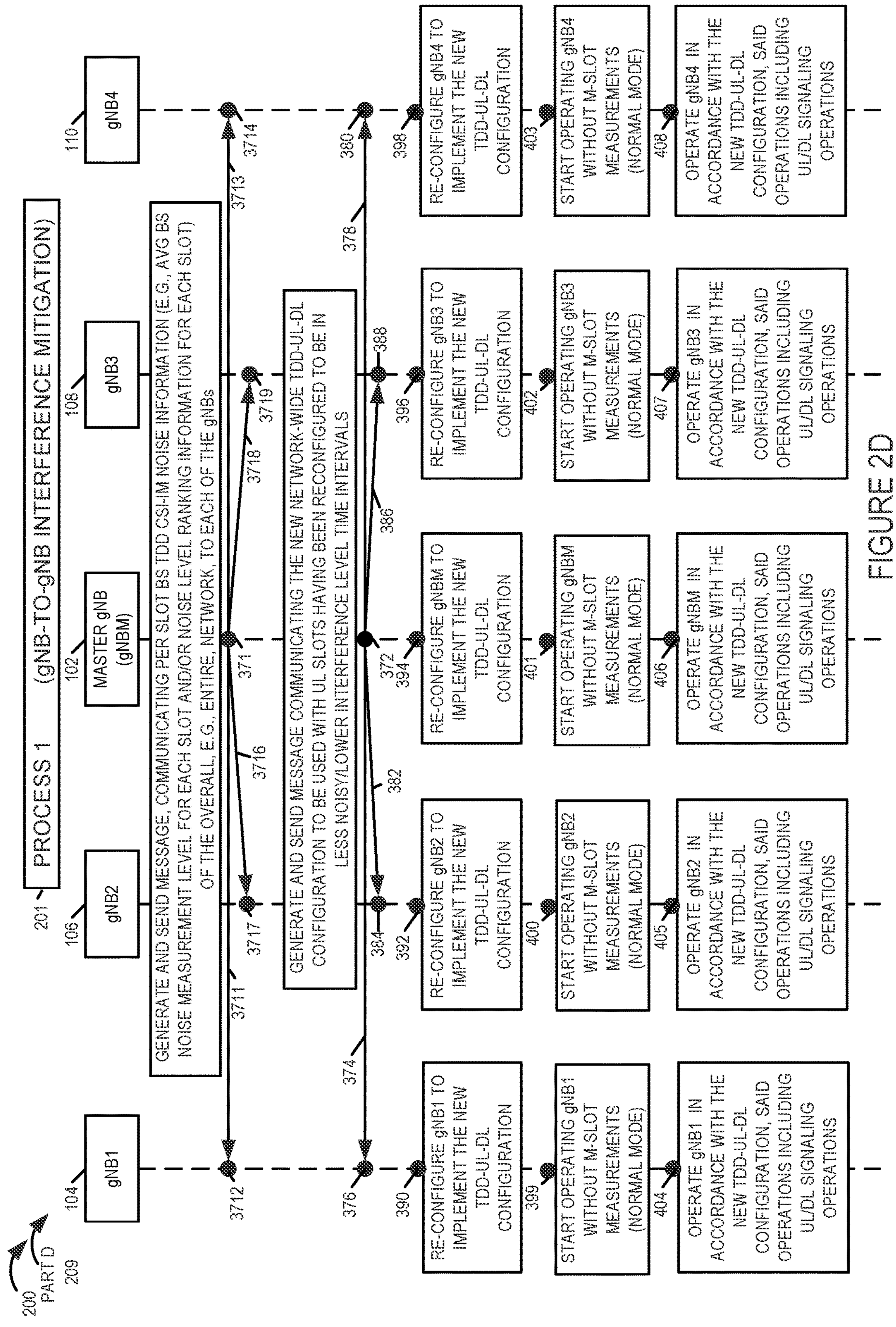
FIG. 2D is a fourth part of an exemplary signaling diagram of exemplary process 1 for base station-to-base station, e.g., gNB-to-gNB, interference mitigation.

Details of exemplary process 1 are shown in FIG. 2. Process 1 is used to mitigate base station to base station (e.g., gNB to gNB) interference. Details of exemplary process 2 will be described below with respect to FIG. 3. Process 2 is used to mitigate UE to UE interference. Details of exemplary process 3 will be described below with respect to FIG. 6. Process 3 is used to mitigate UE interference for edge cell UEs in the victim network 101.

The details of process 1 will now be discussed with reference to FIG. 2. FIG. 2 comprises the combination of FIG. 2A, FIG. 2B, FIG. 2C and FIG. 2D. FIG. 2 is an exemplary signaling diagram 200, including Part A 203, Part B 205, Part C 207, and Part D 209, of exemplary process 1 for gNB-to-gNB interference mitigation, as indicated by title box 201. Signaling diagram 200 is described with respect to devices (master gNBM 102, gNB1 104, gNB2 106, gNB3 108, and gNB4 110) of victim network 101 of FIG. 1.

In step 202, the gNBM 102 receives information from the network operator, e.g. CN1 157, indicating that this gNB has been designated as the master gNB cell and will dynamically measure the network wide interference noise level. Operation proceeds from step 202 to step 204, in which gNBM 102 defines measurement slots (M-slots) within the TDD timing structure implementation being used by the victim network 101. Drawing 900 of FIG. 4 and information 952, 954, 956 and 958 illustrates one example of an exemplary M-slot definition in an exemplary TDD timing structure.

In step 206, gNBM 102 generates and sends a request to the other gNBs in the victim network 101, to start per time slot measurements and periodically report average UL SINR (e.g., every 1000 ms). The request may be sent as an individual request message to each of the gNBs or as a multicast message or as a broadcast message. In step 210 gNB1 104 receives request message 208, which requests UL SINR measurements and reporting. In step 214 gNB4 110 receives request message 212, which requests UL SINR measurements and reporting. In step 218 gNB2 106 receives request message 216, which requests UL SINR measurements and reporting. In step 222 gNB3 108 receives request message 220, which requests UL SINR measurements and reporting.

In step 224 gNB1 104 receives UL reference signals, e.g., sounding reference signals (SRS signals), from UEs (UE5 122, UE6 124, UE7 126, UE8 128). In step 226, gNB1 104 determines UL SINRs for the received reference signals of step 224.

In step 228 gNB2 106 receives UL reference signals, e.g., sounding reference signals (SRS signals), from UEs (UE9 130, UE10 132, UE11 134, UE12 136). In step 230, gNB2 106 determines UL SINRs for the received reference signals of step 228.

In step 232 gNBM 102 receives UL reference signals, e.g., sounding reference signals (SRS signals), from UEs (UE1 112, UE2 114, UE3 116, UE4 118). In step 234, gNBM 102 determines UL SINRs for the received reference signals of step 232.

In step 236 gNB3 106 receives UL reference signals, e.g., sounding reference signals (SRS signals), from UEs (UE13 138, UE14 140, UE15 142, UE16 144). In step 238, gNB3 106 determines UL SINRs for the received reference signals of step 236.

In step 240 gNB4 110 receives UL reference signals, e.g., sounding reference signals (SRS signals), from UEs (UE17 146, UE18 148, UE19 150, UE20 152). In step 242, gNB4 110 determines UL SINRs for the received reference signals of step 240.

Steps 224, 226, 228, 230, 232, 234, 236, 238, 240, 242 are performed multiple times with UL SINR data being collected and stored by the gNBs.

In step 244, gNB1 104 determines an average UL SINR for gNB1 using information gathered from multiple iterations of step 224, 226. In step 248, gNB2 106 determines an average UL SINR for gNB2 using information gathered from multiple iterations of step 228, 230. In step 252, gNBM 102 determines an average UL SINR for gNBM using information gathered from multiple iterations of step 232, 234. In step 254, gNB3 108 determines an average UL SINR for gNB3 using information gathered from multiple iterations of step 236, 238. In step 258, gNB4 110 determines an average UL SINR for gNB4 using information gathered from multiple iterations of step 242, 244.

In step 246 gNB1 104 generates an average UL SINR report 264 for gNB1. In step 250 gNB2 106 generates an average UL SINR report 276 for gNB2. In step 252 gNB3 108 generates an average UL SINR report 282 for gNB3. In step 260 gNB4 110 generates an average UL SINR report 270 for gNB4.

In step 262 gNB1 104 sends gNB1 average UL SINR report 264 to gNBM 102, which receives the report in step 266 and recovers the communicated information. In step 268 gNB4 110 sends gNB4 average UL SINR report 270 to gNBM 102, which receives the report in step 272 and recovers the communicated information. In step 274 gNB2 106 sends gNB2 average UL SINR report 276 to gNBM 102, which receives the report in step 278 and recovers the communicated information. In step 280 gNB3 108 sends gNB3 average UL SNR report 282 to gNBM 102, which receives the report in step 284 and recovers the communicated information.

In step 285 gNBM 102 generates an average UL SINR for the overall, e.g. entire, network based on the average UL SINR values from the received reports 264, 270, 276 and 282 and the determined average UL SINR value 252 for gNBM. In step 286 gNBM 102 decides, based on average UL SINRs, whether or not to start a BS TDD channel state information (CSI) interference measurement (IM) (BS_TDD_CSI-IM) campaign across the entire network. Step 286 includes steps 288, 290, 292, 294 and 296. In step 288 gNBM 102 compares the average UL SINR for the overall, e.g., entire network, (obtained in step 285) to a threshold, e.g. 10 dB, and determines if the average UL SINR for the overall network is above the threshold. If the determination is that the average UL SINR for the overall network is above the threshold, as indicated by Y 289, then operation proceeds from step 288 to step 290 in which gNB 102 decides not to start a BS_TDD_CSI-IM campaign. Operation proceeds from step 290 to step 292, in which gNBM 102 is controlled to maintain current operation, e.g. make no changes. Alternatively, if the determination of step 288 is that the average UL SINR for the overall network is not above the threshold, as indicated by N 293, then operation proceeds from step 288 to step 294 in which gNB 102 decides to start a BS_TDD_CSI-IM campaign across the entire network. Operation proceeds from step 294 to step 296, in which gNBM 102 triggers a BS_TDD_CSI-IM campaign across the entire network. Operation proceeds from step 296 to step 298.

In step 298, gNBM 102 generates and sends a message to each of the gNBs (gNB1 104, gNB2 106, gNB3 108, gNB4 110), said message indicating: BSs are to start TDD_CSI-IM measurements, and information identifying the measurement slots (M-slots). The message may be sent as an individual message to each of the gNBs or as a multicast message or as a broadcast message. In step 302 gNB1 104 receives message 302, which indicates that gNB1 104 is to start TDD_CSI-IM BS measurements and includes information indicating the M-slots, and recovers the communicated information. In step 306 gNB4 110 receives message 304, which indicates that gNB4 110 is to start TDD_CSI-IM BS measurements and includes information indicating the M-slots, and recovers the communicated information. In step 310 gNB2 106 receives message 308, which indicates that gNB2 106 is to start TDD_CSI-IM BS measurements and includes information indicating the M-slots, and recovers the communicated information. In step 314 gNB3 108 receives message 312, which indicates that gNB3 112 is to start TDD_CSI-IM BS measurements and includes information indicating the M-slots, and recovers the communicated information.

In step 316 gNB1 104 identifies the M-slots during which gNB1 104 will not transmit anything and will not schedule any UEs to transmit in UL (completely quiet with no transmission), and during which gNB1 104 is to measure its noise level. In step 320 gNB2 106 identifies the M-slots during which gNB2 106 will not transmit anything and will not schedule any UEs to transmit in UL (completely quiet with no transmission), and during which gNB2 106 is to measure its noise level. In step 322 gNB3 108 identifies the M-slots during which gNB3 108 will not transmit anything and will not schedule any UEs to transmit in UL (completely quiet with no transmission), and during which gNB3 108 is to measure its noise level. In step 318 gNB4 110 identifies the M-slots during which gNB4 110 will not transmit anything and will not schedule any UEs to transmit in UL (completely quiet with no transmission), and during which gNB4 110 is to measure its noise level.

In step 324 gNB1 104 is operated to refrain from transmitting anything in the downlink during the M-slots and does not schedule any UEs to transmit in UL during M-slots. In step 326 gNB2 106 is operated to refrain from transmitting anything in the downlink during the M-slots and does not schedule any UEs to transmit in UL during M-slots. In step 328 gNBM 102 is operated to refrain from transmitting anything in the downlink during the M-slots and does not schedule any UEs to transmit in UL during M-slots. In step 330 gNB3 106 is operated to refrain from transmitting anything in the downlink during the M-slots and does not schedule any UEs to transmit in UL during M-slots. In step 332 gNB4 110 is operated to refrain from transmitting anything in the downlink during the M-slots and does not schedule any UEs to transmit in UL during M-slots.

In step 334, gNB1 104 is operated to perform TDD_CSI-IM_BS measurement during M-slots, and an interference measurement (IM) value is obtained for each M-slot and stored. Different M-slots are associated with different slot positions within a radio frame. In one example measurements are performed for 100 M-slots, which occur within a 10 sec time period, each slot position (0, 1, 2, 3, 4, 5, 6, 7, 8, 9) in the radio frame corresponds to 10 M-slots.

In step 336, gNB2 106 is operated to perform TDD_CSI-IM_BS measurement during M-slots, and an interference measurement (IM) value is obtained for each M-slot and stored. In step 338, gNBM 102 is operated to perform TDD_CSI-IM BS measurement during M-slots, and an interference measurement (IM) value is obtained for each M-slot and stored. In step 340, gNB3 108 is operated to perform TDD_CSI-IM_BS measurement during M-slots, and an interference measurement (IM) value is obtained for each M-slot and stored. In step 342, gNB4 110 is operated to perform TDD_CSI-IM_BS measurement during M-slots, and an interference measurement (IM) value is obtained for each M-slot and stored.

In step 334 gNB1 104 generates a TDD_CSI-IM_BS measurement report (for gNB1) 346 and sends the generated report 346 to gNBM 102, in accordance with a reporting schedule. In step 348 gNBM 102 receives the report 346, recovers the communicated information, and stores the recovered information. In some embodiments, as part of generating the report 346, gNB1 104 determines an average BS measured noise value corresponding to each of the slot positions in the radio frame, e.g., the report includes 10 average noise measurement values, each value corresponding to a different slot position (0, 1, 2, 3, 4, 5, 6, 7, 8, 9) in the radio frame. Drawing 1900 of FIG. 11 illustrates an exemplary TDD_CSI-IM BS per slot measurement report.

In step 350 gNB4 110 generates a TDD_CSI-IM_BS measurement report (for gNB4) 352 and sends the generated report 352 to gNBM 102, in accordance with a reporting schedule. In step 354, gNBM 102 receives the report 352, recovers the communicated information, and stores the recovered information. In some embodiments, as part of generating the report 352, gNB4 110 determines an average BS measured noise value corresponding to each of the slot positions in the radio frame, e.g., the report includes 10 average noise measurement values, each value corresponding to a different slot position (0, 1, 2, 3, 4, 5, 6, 7, 8, 9) in the radio frame.

In step 356 gNB2 104 generates a TDD_CSI-IM_BS measurement report (for gNB2) 358 and sends the generated report 358 to gNBM 102, in accordance with a reporting schedule. In step 360, gNBM 102 receives the report 358, recovers the communicated information, and stores the recovered information. In some embodiments, as part of generating the report 358, gNB2 106 determines an average BS measured noise value corresponding to each of the slot positions in the radio frame, e.g., the report includes 10 average noise measurement values, each value corresponding to a different slot position (0, 1, 2, 3, 4, 5, 6, 7, 8, 9) in the radio frame.

In step 362 gNBM 108 generates a TDD_CSI-IM_BS measurement report (for gNB3) 364 and sends the generated report 364 to gNBM 102, in accordance with a reporting schedule. In step 366, gNBM 102 receives the report 364, recovers the communicated information, and stores the recovered information. In some embodiments, as part of generating the report 364, gNB3 108 determines an average BS measured noise value corresponding to each of the slot positions in the radio frame, e.g., the report includes 10 average noise measurement values, each value corresponding to a different slot position (0, 1, 2, 3, 4, 5, 6, 7, 8, 9) in the radio frame.

In step 368 gNB2 104 determines a TDD_CSI-IM_BS measurement report (for gNBM) in accordance with a schedule, and stores the information included in the report. In some embodiments, as part of generating the report corresponding to gNBM 102 in step 368, gNBM 102 determines an average BS measured noise value corresponding to each of the slot positions in the radio frame, e.g., the report includes 10 average noise measurement values, each value corresponding to a different slot position (0, 1, 2, 3, 4, 5, 6, 7, 8, 9) in the radio frame.

In step 370 gNBM 102 processes the TDD_CSI-IM_BS reports to determine a new network wide TDD-UL-DL configuration to be implemented such that UL slots will be located in less noisy lower interference level time intervals. In some embodiments, the processing including determining an overall average TDD_CSI-IM BS measurement value for each slot position in the radio frame from the information in the received reports (e.g., averaging the set of 5 BS received noise averages for each slot position), ranking each slot position from least noisy to most noisy, and then selecting the least noisy slots to be used for UL slots, with the number of uplink slots being selected being a function of the predicted amount of uplink traffic for the network.

Step 370 includes, in some embodiments, steps 3701, 3702, 3703 and 3704. In step 3701 gNBM 102 performs per slot average of each of the BS TDD CSI-IM measurements to obtain long term statistics of BS TDD CSI-IM of the overall, e.g., entire, network. For example, gNB averages the BS IM noise level values obtained from the five gNB reports for radio frame slot position 0 to obtain an overall network average BS interference measurement (IM) noise value for slot 0. Similar averages are performed for each of the other slots (slot 1, slot 2, . . . , slot 9) in the radio frame of the TDD structure, to obtain other per slot overall network average BS interference measurement noise values.

In step 3702 gNBM 102 ranks the slots from least noisy to most noisy based on the per slot average BS TDD-CSI-IM measurements. In step 3703 gNBM 102 designates slots with the least noise to be UL slots (as needed). Then, in step 3703 gNBN 102 designates remaining less noisy available slots as downlink slots or flexible slots.

In various embodiments, the new network-wide TDD-UL-DL configuration to be implemented of step 370 includes at least one new UL slot, e.g., a slot which was previously not a UL slot which has been reassigned to now be a UL slot. The total number of UL slots in the new TDD-UL-DL configuration may remain the same or may change, e.g. may increase depending on UL traffic needs, with respect to the previous TDD-UL-DL configuration, which was in use during the interference measurements.

In step 371 gNBM 102 generates and sends a message, communicating per slot BS TDD CSI-IM noise information (e.g., an average BS noise measurement level for each slot and/or noise level ranking information for each slot based on the average BS noise measurement) of the overall, e.g., entire, network to each of the gNBs. The message may be sent as an individual message to each of the gNBs or as a multicast message or as a broadcast message. In step 3712 gNB1 104 receives message 3711 communicating the per slot BS TDD CSI-IM noise information of the overall, e.g., entire, network, and recovers the communicated information. In step 3714 gNB4 110 receives message 3713 communicating the per slot BS TDD CSI-IM noise information of the overall, e.g., entire, network, and recovers the communicated information. In step 3717 gNB2 106 receives message 3716 communicating the per slot BS TDD CSI-IM noise information of the overall, e.g., entire, network, and recovers the communicated information. In step 3719 gNB3 106 receives message 3718 communicating the per slot BS TDD CSI-IM noise information of the overall, e.g., entire, network, and recovers the communicated information.

In step 372, gNBM 102 generates and sends a message communicating the new network-wide TDD-UL-DL configuration to be used with UL slots having been reconfigured to be in less noisy/lower interference level time intervals. The message may be sent as an individual message to each of the gNBs or as a multicast message or as a broadcast message. In step 376 gNB1 104 receives message 374, which communicates the new network-wide TDD-UL_DL configuration, and in some embodiments, information indicating a time to switchover to the new configuration. In step 380 gNB4 110 receives message 378, which communicates the new network-wide TDD-UL_DL configuration, and in some embodiments, information indicating a time to switchover to the new configuration. In step 384 gNB2 106 receives message 382, which communicates the new network-wide TDD-UL_DL configuration, and in some embodiments, information indicating a time to switchover to the new configuration. In step 388 gNB3 108 receives message 386, which communicates the new network-wide TDD-UL_DL configuration, and in some embodiments, information indicating a time to switchover to the new configuration.

In step 390 gNB1 104 reconfigures gNB1 104 to implement the new TDD-UL-DL configuration. In step 392 gNB2 106 reconfigures gNB2 106 to implement the new TDD-UL-DL configuration. In step 394 gNBM 102 reconfigures gNBM 102 to implement the new TDD-UL-DL configuration. In step 396 gNB3 108 reconfigures gNB3 108 to implement the new TDD-UL-DL configuration. In step 398 gNB4 110 reconfigures gNB4 110 to implement the new TDD-UL-DL configuration.

In step 399 gNB1 104 starts operating without M-slot measurements, e.g. gNB1 104 starts operating in normal mode. In step 400 gNB2 106 starts operating without M-slot measurements, e.g. gNB2 106 starts operating in normal mode. In step 401 gNBM 102 starts operating without M-slot measurements, e.g. gNBM 102 starts operating in normal mode. In step 402 gNB3 108 starts operating without M-slot measurements, e.g. gNB3 108 starts operating in normal mode. In step 403 gNB4 110 starts operating without M-slot measurements, e.g. gNB4 110 starts operating in normal mode.

In step 404 gNB1 104 operates gNB1 104 in accordance with the new TDD-UL-DL configuration, said operations including UL/DL signaling operations including communicating UL/DL user traffic data. In step 405 gNB2 106 operates gNB2 106 in accordance with the new TDD-UL-DL configuration, said operations including UL/DL signaling operations including communicating UL/DL user traffic data. In step 406 gNBM 102 operates gNBM 102 in accordance with the new TDD-UL-DL configuration, said operations including UL/DL signaling operations including communicating UL/DL user traffic data. In step 407 gNB3 108 operates gNB3 106 in accordance with the new TDD-UL-DL configuration, said operations including UL/DL signaling operations including communicating UL/DL user traffic data. In step 408 gNB4 110 operates gNB4 110 in accordance with the new TDD-UL-DL configuration, said operations including UL/DL signaling operations including communicating UL/DL user traffic data.

FIG. 3, comprising the combination of FIG. 3A, FIG. 3B, FIG. 3C, FIG. 3D and FIG. 3E, is an exemplary signaling diagram 500, including Part A 503, Part B 505, Part C 507, Part D 509 and Part E 511, of exemplary process 2 for UE-to-UE interference mitigation, as indicated by title box 501. Signaling diagram 500 is described with respect to devices (master gNBM 102, gNB1 104, gNB2 106, gNB3 108, gNB4 110, UE5 122 (which is connected to gNB1), UE9 130 (which is connected to gNB2), UE1 112 (which is connected to gNBM), UE13 138 (which is connected to gNB3), and UE 17 147 (which is connected to gNB4) of victim network 101 of FIG. 1. Although described with respect to one UE for each gNB, it should be appreciated that similar operations are performed for the other UEs which are also connected to the gNBs.

In step 502, the gNBM 102 receives information from the network operator, e.g. CN1 157, indicating that this gNB has been designated the master gNB cell and will dynamically measure the network wide interference noise level. Operation proceeds from step 502 to step 504, in which gNBM 102 defines measurement slots (M-slots) within the TDD timing structure implementation being used by the victim network 101. Drawing 900 of FIG. 4 and information 952, 954, 956 and 958 illustrates one example of an exemplary M-slot definition in an exemplary TDD timing structure.

In step 506, gNBM 102 generates and sends a request to the other gNBs in the victim network 101, to start per time slot measurements and periodically report average DL SINR (e.g., every 1000 ms). The request may be sent as an individual request message to each of the gNBs or as a multicast message or as a broadcast message. In step 510 gNB1 104 receives request message 508, which requests DL SINR measurements and reporting. In step 514 gNB4 110 receives request message 512, which requests DL SINR measurements and reporting. In step 518 gNB2 106 receives request message 516, which requests DL SINR measurements and reporting. In step 522 gNB3 108 receives request message 520, which requests DL SINR measurements and reporting.

In step 524 gNB1 104 transmits DL reference signals 526. In step 528, UE5 122 receives and measures the DL reference signals. In step 530 UE5 122 generates and sends DL SINR report 532 to gNB1 104. In step 534 gNB1 104 receives the DL SINR report, recovers the communicated information and stores the recovered information. In step 536 gNB2 106 transmits DL reference signals 538. In step 540, UE9 130 receives and measures the DL reference signals. In step 542 UE9 130 generates and sends DL SINR report 544 to gNB2 106. In step 546 gNB2 106 receives the DL SINR report, recovers the communicated information and stores the recovered information. In step 548 gNBM 102 transmits DL reference signals 550. In step 552, UE1 112 receives and measures the DL reference signals. In step 554 UE1 112 generates and sends DL SINR report 556 to gNBM 102. In step 548 gNBM 102 receives the DL SINR report, recovers the communicated information and stores the recovered information. In step 560 gNB3 108 transmits DL reference signals 562. In step 564, UE13 138 receives and measures the DL reference signals. In step 566 UE13 138 generates and sends DL SINR report 568 to gNB3 108. In step 570 gNB3 108 receives the DL SINR report, recovers the communicated information and stores the recovered information. In step 572 gNB4 110 transmits DL reference signals 574. In step 576, UE17 146 receives and measures the DL reference signals 574. In step 576 UE17 146 generates and sends DL SINR report 580 to gNB4 110. In step 582 gNB4 110 receives the DL SINR report, recovers the communicated information and stores the recovered information.

Steps 524, 528, 530, 534, 536, 540, 542, 546, 548, 552, 554, 558, 560, 564, 566, 570, 572, 576, 578 and 582 are performed multiple times with DL SINR data being collected and stored by the gNBs.

In step 584, gNB1 104 determines an average DL SINR for gNB1 using information gathered from multiple iterations of step 534. In step 586, gNB2 106 determines an average DL SINR for gNB2 using information gathered from multiple iterations of step 546. In step 588, gNBM 102 determines an average DL SINR for gNBM using information gathered from multiple iterations of step 558. In step 590, gNB3 108 determines an average DL SINR for gNB3 using information gathered from multiple iterations of step 570. In step 600, gNB4 110 determines an average DL SINR for gNB4 using information gathered from multiple iterations of step 582.

In step 601 gNB1 104 generates an average DL SINR report 604 for gNB1. In step 613 gNB2 106 generates an average DL SINR report 616 for gNB2. In step 619 gNB3 108 generates an average DL SINR report 622 for gNB3. In step 607 gNB4 110 generates an average DL SINR report 610 for gNB4.

In step 602 gNB1 104 sends gNB1 average UL SINR report 604 to gNBM 102, which receives the report in step 606 and recovers the communicated information. In step 608 gNB4 110 sends gNB4 average DL SINR report 610 to gNBM 102, which receives the report in step 612 and recovers the communicated information. In step 614 gNB2 106 sends gNB2 average DL SINR report 616 to gNBM 102, which receives the report in step 278 618 recovers the communicated information. In step 620 gNB3 108 sends gNB3 average DL SNR report 622 to gNBM 102, which receives the report in step 624 and recovers the communicated information.

In step 625 gNBM 102 generates an average DL SINR for the overall, e.g. entire, network, based on the received average DL SINR values communicated in reports 604, 610, 616 and 620 and the determined average DL SINR value 588 for gNB. In step 626 gNBM 102 decides, based on average DL SINRs, whether or not to start an UL TDD channel state information (CSI) interference measurement (IM) (UE_TDD_CSI-IM) campaign across the entire network. Step 626 includes steps 628, 630, 632, 634 and 636. In step 628 gNBM 102 compares the average DL SINR for the overall, e.g., entire network, (obtained in step 625) to a threshold, e.g. 10 dB, and determines if the average DL SINR for the overall network is above the threshold. If the determination is that the average DL SINR for the overall network is above the threshold, as indicated by Y 629, then operation proceeds from step 628 to step 630, in which gNB1 102 decides not to start a UE_TDD_CSI-IM campaign. Operation proceeds from step 630 to step 632, in which gNBM 102 is controlled to maintain current operation, e.g. make no changes. Alternatively, if the determination of step 628 is that the average DL SINR for the overall network is not above the threshold, as indicated by N 633, then operation proceeds from step 628 to step 634 in which gNB1 102 decides to start a UE_TDD_CSI-IM campaign across the entire network. Operation proceeds from step 634 to step 636, in which gNBM 102 triggers a UE_TDD_CSI-IM campaign across the entire network. Operation proceeds from step 636 to step 638.

In step 638, gNBM 102 generates and sends a message to each of the gNBs (gNB1 104, gNB2 106, gNB3 108, gNB4 110) to start UE measurements, said message including: information indicating start TDD_CSI-IM_UE measurements, information identifying the measurement slots (M-slots), and information identifying subbands to report on. The message may be sent as an individual message to each of the gNBs or as a multicast message or as a broadcast message. In step 642 gNB1 104 receives message 640, which indicates that gNB1 104 is to start TDD CSI-IM UE measurements and includes information indicating the M-slots and information identifying the subbands to report on, and recovers the communicated information. In step 646 gNB4 110 receives message 644, which indicates that gNB4 110 is to start TDD_CSI-IM UE measurements and includes information indicating the M-slots and information identifying subbands to report on, and recovers the communicated information. In step 650 gNB2 106 receives message 648, which indicates that gNB2 106 is to start TDD_CSI-IM UE measurements and includes information indicating the M-slots and information identifying subbands to report on, and recovers the communicated information. In step 654 gNB3 108 receives message 652, which indicates that gNB3 112 is to start TDD_CSI-IM UE measurements and includes information indicating the M-slots and information identifying subbands to report on, and recovers the communicated information.

In step 656 gNB1 104 identifies the M-slots during which gNB1 104 will not transmit anything and will not schedule any UEs to transmit in UL (completely quiet with no transmission) and during which each UE is to measure its noise level (wideband and subbands), and identifies the subbands. In step 658 gNB2 106 identifies the M-slots during which gNB2 106 will not transmit anything and will not schedule any UEs to transmit in UL (completely quiet with no transmission) and during which gNB2 106 is to measure its noise level (wideband and subband), and identifies the subbands. In step 660 gNB3 108 identifies the M-slots during which gNB3 108 will not transmit anything and will not schedule any UEs to transmit in UL (completely quiet with no transmission), and during which gNB3 108 is to measure its noise level (wideband and subband), and identifies the subbands. In step 662 gNB4 110 identifies the M-slots during which gNB4 110 will not transmit anything and will not schedule any UEs to transmit in UL (completely quiet with no transmission), and during which gNB4 110 is to measure its noise level (wideband and subbands), and identifies the subbands.

In step 664 gNB1 104 generates and sends message 666 to UE5 122, said message 666 commanding UE5 122 to perform wideband and subband(s) interference measurements as part of a UE_TDD_CSI-IM measurement campaign during M-slots, said message 666 including information identifying the M-slots, and including information identifying the subband(s) on which interference measurements are to be performed. In 668 UE5 122 receives message 666 and recovers the communicated information. In step 670 gNB2 106 generates and sends message 672 to UE9 130, said message 672 commanding UE9 130 to perform wideband and subband(s) interference measurements as part of a UE_TDD_CSI-IM measurement campaign during M-slots, said message 672 including information identifying the M-slots, and including information identifying the subband(s) on which interference measurements are to be performed. In step 674 UE9 130 receives message 672 and recovers the communicated information. In step 676 gNBM 12 generates and sends message 678 to UE1 112, said message 678 commanding UE1 112 to perform wideband and subband(s) interference measurements as part of a UE_TDD_CSI-IM measurement campaign during M-slots, said message 678 including information identifying the M-slots, and including information identifying the subband(s) on which interference measurements are to be performed. In step 680 UE1 112 receives message 678 and recovers the communicated information. In step 682 gNB3 108 generates and sends message 684 to UE13 138, said message 684 commanding UE13 138 to perform wideband and subband(s) interference measurements as part of a UE_TDD_CSI-IM measurement campaign during M-slots, said message 684 including information identifying the M-slots, and including information identifying the subband(s) on which interference measurements are to be performed. In 686 UE13 138 receives message 684 and recovers the communicated information. In step 688 gNB4 110 generates and sends message 680 to UE17 146, said message 690 commanding UE17 146 to perform wideband and subband(s) interference measurements as part of a UE_TDD_CSI-IM measurement campaign during M-slots, said message 660 including information identifying the M-slots, and including information identifying the subband(s) on which interference measurements are to be performed. In 692 U713 146 receives message 690 and recovers the communicated information.

In step 694 gNB1 104 is operated to refrain from transmitting anything in the DL during the M-slots and is operated to not schedule any UEs to transmit during M-slots. In step 696 gNB2 106 is operated to refrain from transmitting anything in the DL during the M-slots and is operated to not schedule any UEs to transmit during M-slots. In step 698 gNBM 102 is operated to refrain from transmitting anything in the DL during the M-slots and is operated to not schedule any UEs to transmit during M-slots. In step 700 gNB3 108 is operated to refrain from transmitting anything in the DL during the M-slots and is operated to not schedule any UEs to transmit during M-slots. In step 702 gNB4 110 is operated to refrain from transmitting anything in the DL during the M-slots and is operated to not schedule any UEs to transmit during M-slots.

In step 704 UE5 122 is operated to perform wideband and subband interference measurements, as part of a TDD_CSI-IM_UE measurement campaign during M-slots, and to store the measurement data. In step 706 UE9 130 is operated to perform wideband and subband interference measurements, as part of a TDD_CSI-IM_UE measurement campaign during M-slots, and to store the measurement data. In step 708 UE1 112 is operated to perform wideband and subband interference measurements, as part of a TDD_CSI-IM_UE measurement campaign during M-slots, and to store the measurement data. In step 710 UE13 138 is operated to perform wideband and subband interference measurements, as part of a TDD_CSI-IM_UE measurement campaign during M-slots, and to store the measurement data. In step 712 UE17 146 is operated to perform wideband and subband interference measurements, as part of a TDD_CSI-IM_UE measurement campaign during M-slots, and to store the measurement data.

Following UE interference measurements during an M-slot, each UE generates an interference measurement report and sends the report to the gNB to which it is connected, and the gNBs receive the reports and store, aggregate, and/or process the received information. In step 714 UE5 122 generates and sends TDD_CIS-IM-UE report 716, corresponding to a 1st M-slot, to gNB1 104, which receives report 716 in step 718 and recovers and stores the communicated information. In step 720 gNB1 104 processes the received report, e.g. updating an average UE interference measurement value for the M-slot (1st M slot), and/or updating an average UE interference measurement value for the slot position in the radio frame to which the 1st M-slot corresponds. In step 722 UE9 130 generates and sends TDD_CIS-IM-UE report 724, corresponding to a 1st M-slot, to gNB2 106, which receives report 724 in step 726 and recovers and stores the communicated information. In step 728 gNB2 106 processes the received report 724, e.g. updating an average UE interference measurement value for the M-slot (1st M slot), and/or updating an average UE interference measurement value for the slot position in the radio frame to which the 1st M-slot corresponds. In step 730 UE1 102 generates and sends TDD_CIS-IM-UE report 732, corresponding to a 1st M-slot, to gNBM 102, which receives report 732 in step 734 and recovers and stores the communicated information. In step 736 gNBM 102 processes the received report 732, e.g. updating an average UE interference measurement value for the M-slot (1st M slot), and/or updating an average UE interference measurement value for the slot position in the radio frame to which the 1st M-slot corresponds. In step 738 UE13 138 generates and sends TDD_CIS-IM-UE report 740, corresponding to a 1st M-slot, to gNB3 108, which receives report 740 in step 742 and recovers and stores the communicated information. In step 744 gNB3 108 processes the received report 740, e.g. updating an average UE interference measurement value for the M-slot (1st M slot), and/or updating an average UE interference measurement value for the slot position in the radio frame to which the 1st M-slot corresponds. In step 746 UE17 146 generates and sends TDD_CIS-IM-UE report 748, corresponding to a 1st M-slot, to gNB4 110, which receives report 748 in step 750 and recovers and stores the communicated information. In step 752 gNB4 110 processes the received report, e.g. updating an average UE interference measurement value for the M-slot (1st M slot), and/or updating an average UE interference measurement value for the slot position in the radio frame to which the 1st M-slot corresponds.

In step 754 UE5 122 generates and sends TDD_CIS-IM-UE report 756, corresponding to an Nth M-slot, to gNB1 104, which receives report 756 in step 758 and recovers and stores the communicated information. In step 760 gNB1 104 processes the received report 756, e.g. updating an average UE interference measurement value for the M-slot (Nth M slot), and/or updating an average UE interference measurement value for the slot position in the radio frame to which the Nth M-slot corresponds. In step 762 UE9 130 generates and sends TDD_CIS-IM-UE report 764, corresponding to an Nth M-slot, to gNB2 106, which receives report 764 in step 766 and recovers and stores the communicated information. In step 768 gNB2 106 processes the received report 764, e.g. updating an average UE interference measurement value for the M-slot (Nth M slot), and/or updating an average UE interference measurement value for the slot position in the radio frame to which the Nth M-slot corresponds. In step 770 UE1 102 generates and sends TDD_CIS-IM-UE report 772, corresponding to a Nth M-slot, to gNBM 102, which receives report 772 in step 774 and recovers and stores the communicated information. In step 776 gNBM 102 processes the received report 772, e.g. updating an average UE interference measurement value for the M-slot (Nth M slot), and/or updating an average UE interference measurement value for the slot position in the radio frame to which the Nth M-slot corresponds. In step 778 UE13 138 generates and sends TDD_CIS-IM-UE report 780, corresponding to an Nth M-slot, to gNB3 108, which receives report 780 in step 782 and recovers and stores the communicated information. In step 784 gNB3 108 processes the received report 780, e.g. updating an average UE interference measurement value for the M-slot (Nth M slot), and/or updating an average UE interference measurement value for the slot position in the radio frame to which the Nth M-slot corresponds. In step 786 UE17 146 generates and sends TDD_CIS-IM-UE report 788, corresponding to an Nth M-slot, to gNB4 110, which receives report 788 in step 790 and recovers and stores the communicated information. In step 792 gNB4 110 processes the received report, e.g. updating an average UE interference measurement value for the M-slot (Nth M slot), and/or updating an average UE interference measurement value for the slot position in the radio frame to which the Nth M-slot corresponds.

In step 793 gNB1 104 generates a TDD_CSI-IM_UE per slot measurement report 796 for gNB1, based on the received UE interference measurements reports from the UEs, which are connected to gNB1 104 including UE5 122, said measurement report 796 including long term noise statistics (e.g., an average wideband UE measured noise level, and one or more average subband UE measured noise levels), e.g., for each slot position in the radio frame. In step 794 gNB1 104 sends the generated TDD CIS-IM UE per slot measurement report 796 to gNBM 102, which receives the report 796 in step 798 and stores the communicated information. Table 2000 of FIG. 11 illustrates one exemplary TDD_CSI-IM_UE per slot measurement report from gNB1 104 to the master gNB, which is gNBM 102.

In step 799 gNB4 110 generates a TDD_CSI-IM_UE per slot measurement report 802 for gNB4, based on the received UE interference measurements reports from the UEs, which are connected to gNB4 110 including UE17 146, said measurement report 802 including long term noise statistics (e.g., an average wideband UE measured noise level, and one or more average subband UE measured noise levels), e.g., for each slot position in the radio frame. In step 800 gNB4 110 sends the generated TDD CSI-IM UE per slot measurement report 802 to gNBM 102, which receives the report 802 in step 806 and stores the communicated information.

In step 807 gNB2 106 generates a TDD_CSI-IM_UE per slot measurement report 810 for gNB2, based on the received UE interference measurements reports from the UEs, which are connected to gNB2 106 including UE9 130, said measurement report 810 including long term noise statistics (e.g., an average wideband UE measured noise level, and one or more average subband UE measured noise levels), e.g., for each slot position in the radio frame. In step 808 gNB2 106 sends the generated TDD CIS-IM UE per slot measurement report 810 to gNBM 102, which receives the report 810 in step 812 and stores the communicated information.

In step 813 gNB3 108 generates a TDD_CSI-IM_UE per slot measurement report 816 for gNB3, based on the received UE interference measurements reports from the UEs, which are connected to gNB3 108 including UE13 138, said measurement report 816 including long term noise statistics (e.g., an average wideband UE measured noise level, and one or more average subband UE measured noise levels), e.g., for each slot position in the radio frame. In step 814 gNB3 106 sends the generated TDD CIS-IM UE per slot measurement report 816 to gNBM 102, which receives the report 816 in step 818 and stores the communicated information.

In step 820 gNBM 102 determines, e.g., generates, a TDD_CSI-IM_UE per slot measurement report for gNB1, based on the received UE interference measurements reports from the UEs, which are connected to gNBM 102 including UE1 112, said measurement report including long term noise statistics (e.g., an average wideband UE measured noise level, and one or more average subband UE measured noise levels), e.g., for each slot position in the radio frame, and gNBM 102 stores the generated TDD_CSI-IM_UE per slot measurement report for gNB1.

In step 822 gNBM 102 process the TDD_CSI-IM UE reports, which includes the received reports from gNB1, gNB2, gNB3 and gNB4, from steps 798, 812, 818 and 816, its own generated report from step 820, to determine a new network-wide TDD-UL-DL configuration to be implemented such that DL slots will be located in less noisy/lower interference level, time intervals when possible. Step 822 includes step 824 in which gNBM 102 performs per slot average of each of the UE TDD CSI-IM UE measurements to obtain long term statistics of UE TDD CSI-IM of the overall, e.g., entire, network. For example, gNB averages the average UE IM wideband noise level values obtained from the five gNB reports for radio frame slot position 0 to obtain an overall network average wideband UE interference measurement (IM) noise value for slot 0. Similar averages are performed for each of the other slots (slot 1, slot 2, . . . , slot 9) in the radio frame of the TDD structure, to obtain other per slot overall network average wideband UE interference measurement noise values. Similar averages are performed for each of the specified subbands upon which M-slot measurements were performed and reported to obtain overall, e.g., entire, network subband UE average IM noise values for each slot position in the radio frame.

In step 825 gNBM 102 ranks the slots from least noisy to most noisy based on the average UE TDD CSI-IM values. In step 826 gNBM 102 designates slots with the least noise to be DL slots (as needed and provided there is no conflict with UL slot designations of step 3703). If both process 1 and process 2 are performed and each process desires to use the same slot, UL has precedence; remaining slots with the lowest noise, after the UL slots needs are satisfied, may be allocated as DL slots as needed. Then, in step 827 gNBN 102 designates remaining less noisy slots as uplink slots or flexible slots.

In various embodiments, the new network-wide TDD-UL-DL configuration to be implemented of step 822 includes at least one new DL slot, e.g., a slot which was previously not a DL slot which has been reassigned to now be a DL slot. The total number of DL slots in the new TDD-UL-DL configuration may remain the same or may change, e.g. may increase, with respect to the previous TDD-UL-DL configuration, which was in use during the interference measurements.

In step 8271 gNBM 102 generates and sends a message, communicating per slot UE TDD CSI-IM noise information (e.g., an average UE noise measurement level for each slot and/or noise level ranking information for each slot based on the average UE noise measurements) of the overall, e.g., entire, network to each of the gNBs. The message may be sent as an individual message to each of the gNBs or as a multicast message or as a broadcast message. In step 8273 gNB1 104 receives message 8272 communicating the per slot UE TDD CSI-IM noise information of the overall, e.g., entire, network, and recovers the communicated information. In step 8275 gNB4 110 receives message 8274 communicating the per slot UE TDD CSI-IM noise information of the overall, e.g., entire, network, and recovers the communicated information. In step 8277 gNB2 106 receives message 8276 communicating the per slot UE TDD CSI-IM noise information of the overall, e.g., entire, network, and recovers the communicated information. In step 8279 gNB3 106 receives message 8278 communicating the per slot UE TDD CSI-IM noise information of the overall, e.g., entire, network, and recovers the communicated information.

In step 828, gNBM 102 generates and sends a message communicating the new network-wide TDD-UL-DL configuration to be used with DL slots having been reconfigured to be in less noisy/lower interference level time intervals. The message may be sent as an individual message to each of the gNBs or as a multicast message or as a broadcast message. In step 832 gNB1 104 receives message 830, which communicates the new network-wide TDD-UL_DL configuration, and in some embodiments, information indicating a time to switchover to the new configuration. In step 836 gNB4 110 receives message 834, which communicates the new network-wide TDD-UL_DL configuration, and in some embodiments, information indicating a time to switchover to the new configuration. In step 840 gNB2 106 receives message 838, which communicates the new network-wide TDD-UL_DL configuration, and in some embodiments, information indicating a time to switchover to the new configuration. In step 844 gNB3 108 receives message 842, which communicates the new network-wide TDD-UL_DL configuration, and in some embodiments, information indicating a time to switchover to the new configuration.

In step 846 gNB1 104 reconfigures gNB1 104 to implement the new TDD-UL-DL configuration, said re-configuration. In step 848 gNB2 106 reconfigures gNB2 106 to implement the new TDD-UL-DL configuration. In step 850 gNBM 102 reconfigures gNBM 102 to implement the new TDD-UL-DL configuration. In step 852 gNB3 108 reconfigures gNB3 108 to implement the new TDD-UL-DL configuration. In step 854 gNB4 110 reconfigures gNB4 110 to implement the new TDD-UL-DL configuration.

In step 855 gNB1 104 starts operating without M-slot measurements, e.g. gNB1 104 starts operating in normal mode. In step 856 gNB2 106 starts operating without M-slot measurements, e.g. gNB2 106 starts operating in normal mode. In step 857 gNBM 102 starts operating without M-slot measurements, e.g. gNBM 102 starts operating in normal mode. In step 858 gNB3 108 starts operating without M-slot measurements, e.g. gNB3 108 starts operating in normal mode. In step 859 gNB4 110 starts operating without M-slot measurements, e.g. gNB4 110 starts operating in normal mode.

In step 860 gNB1 104 operates gNB1 104 in accordance with the new TDD-UL-DL configuration, said operations including UL/DL signaling operations including communicating UL/DL user traffic data. In step 861 gNB2 106 operates gNB2 106 in accordance with the new TDD-UL-DL configuration, said operations including UL/DL signaling operations including communicating UL/DL user traffic data. In step 862 gNBM 102 operates gNBM 102 in accordance with the new TDD-UL-DL configuration, said operations including UL/DL signaling operations including communicating UL/DL user traffic data. In step 863 gNB3 108 operates gNB3 106 in accordance with the new TDD-UL-DL configuration, said operations including UL/DL signaling operations including communicating UL/DL user traffic data. In step 864 gNB4 110 operates gNB4 110 in accordance with the new TDD-UL-DL configuration, said operations including UL/DL signaling operations including communicating UL/DL user traffic data.

Figure 4:
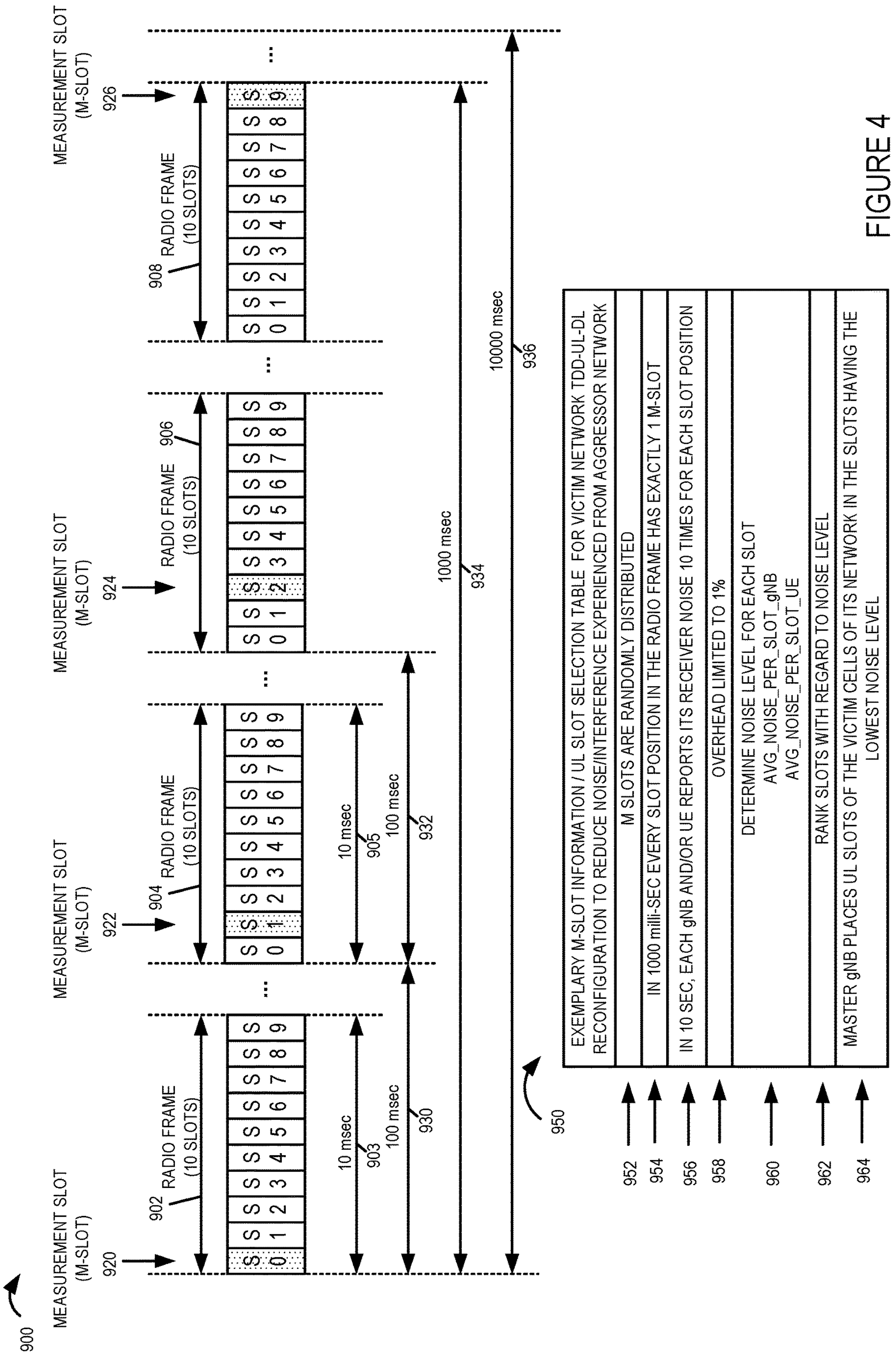
FIG. 4 includes a drawing including exemplary defined measurement slots (M-slots), to be used for interference measurements, in a TDD structure including radio frames, and a table including exemplary M-slot information and exemplary UL slot selection information for a victim network TDD-UL-DL reconfiguration to reduce noise/interference experienced from an aggressor network.

FIG. 4 includes a drawing 900 including exemplary defined measurements slots (M-slots), to be used for interference measurements, in a TDD structure including radio frames, and a table 950 including exemplary M-slot information and exemplary UL slot selection information for a victim network TDD-UL-DL reconfiguration to reduce noise/interference experienced from an aggressor network.

Drawing 900 illustrates exemplary radio frames (902, 904, 906, 908). Each radio frame corresponding to a 10 msec time interval. For example, radio frame 902 corresponds to 10 msec time interval 903. Radio frame 804 corresponds to 10 msec time interval 905. Each radio frame includes 10 slots (slot S0, slot S1, slot S2, slot S3, slot S4, slot S5, slot S6, slot S7, slot S8, slot S9). Radio frame 902 is included in a first 100 msec block 930 of 10 radio frames. Radio frame 904 is included in second 100 msec block 932 of 10 radio frames. There are ten 100 msec blocks in 1000 msec time interval 934. There are 10 1000 msec blocks in 100000 msec time interval 936.

In this example, measurement slot (M-slot 920) is in the S0 slot position of radio frame 902; M-slot 922 is the S1 slot position of radio frame 905. M-slot 922 is the S2 slot position of radio frame 906. M-slot 926 is the S9 slot position of radio frame 908.

Row 952 of information table 950 indicates that M-slots are randomly distributed. Row 954 of information table 950 indicates that in every 1000 msec, e.g. 1000 msec block 934, every slot position in the radio frame has exactly 1 slot designated as an M-slot. Thus in 1000 msec time interval block 934, there are a total of 10 M-slots including M-slot 920 (corresponding to slot position S0), M-slot 922 (corresponding to slot position S1), M-slot 924 (corresponding to slot position S2), an M-slot (corresponding to slot position S3), an M-slot (corresponding to slot position S4), an M-slot (corresponding to slot position S5), an M-slot (corresponding to slot position S6), an M-slot (corresponding to slot position S7), an M-slot (corresponding to slot position S8), and M-slot 926 corresponding to slot position S9.

Row 956 of information table 950 indicates that in 10 sec, e.g. in 10000 msec block 936, each gNB and/or each UE reports its receiver noise 10 times for each slot position. In this example this corresponds to each gNB and/or each UE measuring (and reporting) its noise (an interference measurement noise value) for each of 100 M-slots (10 sets of 10 M-slots, with each set of 10 corresponding to a different slot position in the radio frame).

Row 958 of information table 950 indicates that in this example overhead is limited to 1%, e.g., 1% of the slots in the 10 sec window are designated as M-slots (used as quiet slots for interference measurement purposes) and taken off line in the network with regard to be used for UL or DL signaling.

Row 960 of information table 950 indicates that noise level can be determined for each slot based on the received M-slot measurements. An average noise per slot as measured by the gNB, and an average noise per slot as measured by the UE.

Row 962 indicates that the slots can be ranked with regard to noise level, e.g. from lowest level of noise detected to highest level of noise detected.

Row 964 indicates that the master gNB, which performs the network wide aggregation of measurement data and interference determinations, places UL slots of the victim cells of it network in the slots having the lowest noise level.

Figure 5:
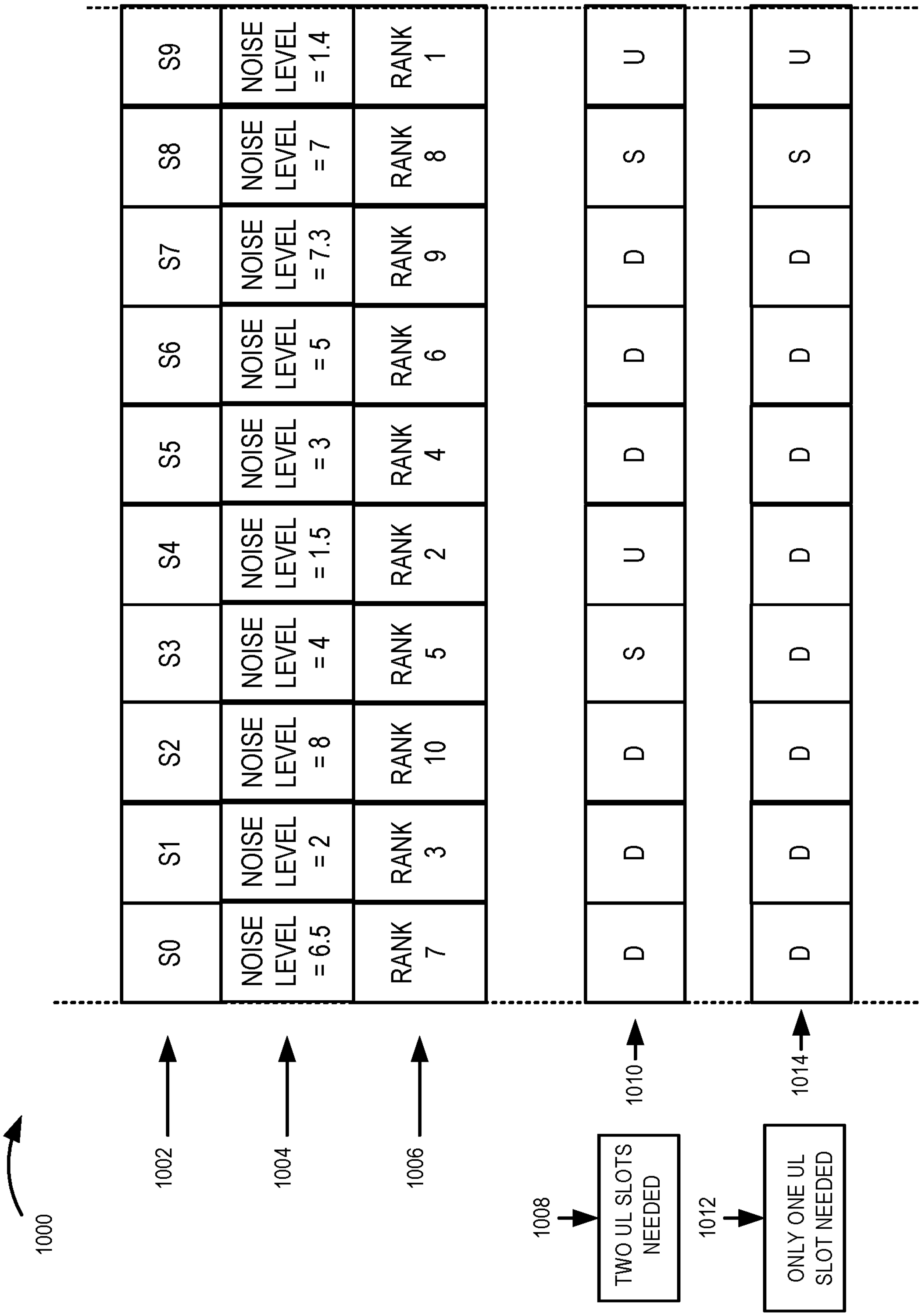
FIG. 5 is a drawing which illustrates exemplary master node processing to determine a new network-wide TDD-UL-DL configuration to implemented e.g., in response to a determination that UL Signal-to-Interference-Plus-Noise Ratio (SINR) in the network was below an acceptable threshold, and using processed interference measurement data collected, e.g., by gNBs, during M-slots as part of a BS CSI-IM campaign.

FIG. 5 is a drawing 1000 which illustrates exemplary master node, e.g. gNBM 102, processing to determine a new network-wide TDD-UL-DL configuration to implemented (e.g., in step 370), e.g., in response to a determination that UL SINR in the network was below an acceptable threshold, and using processed interference measurement data collected, e.g., by gNBs, during M-slots as part of a BS CSI-IM campaign.

Row 1002 lists the 10 different slot positions (S0, S1, S2, S3, S4, S5, S6, S7, S8, S9) in radio frames within the implemented timing structure being used by the network. Row 1004 includes noise level values corresponding to each of the different slots, wherein a noise level value corresponds to an average gNB measured interference measurement corresponding to the slot, and wherein the lower the noise level value, the lower the level of the average gNB measured interference. Row 1006 includes a ranking value corresponding to each of the slots, wherein the lower, the rank value, the lower the level of interference being experienced.

In this example, the S9 and S4 slots are the quietest slots. On average, the S9 slot experienced the lowest level of interference, and the S4 slot experienced the second lowest level of interference. The number of UL slots assigned in the new network-wide TDD-UL-DL configuration to be implemented is a function of the estimated uplink traffic needs of the network. If the estimation is that two UL slots are needed, as indicated by information box 1008, then, the master, e.g., gNBM 102, determines the new network-wide TDD-UL_DL configuration to be implemented to be pattern 1010, which is DDDSUDDDSU, with slots 4 and 9 being assigned to be used for UL. In this example, at least one of slot 4 and slot 9 was previously not assigned to be used for UL.

However, if the estimation is that only 1 UL slot is needed, as indicated by information box 1012, then, the master, e.g., gNBM 102 determines the new network-wide TDD-UL_DL configuration to be implemented to be pattern 1010, which is DDDDDDDDSU, with slot 9 being assigned to be used for UL. In this example, slot 9 was previously not assigned to be used for UL.

In the examples of FIG. 5, D represents a downlink (DL) slot, U represents an uplink (UL) slot and S represents a special slot. The special slot, in these examples, typically includes a mixture of symbol types including one of more downlink symbols, one or more flexible symbols and one or more uplink symbols. A special slot which includes one or more flexible symbols is sometimes referred to as a flexible slot.

Figure 6:
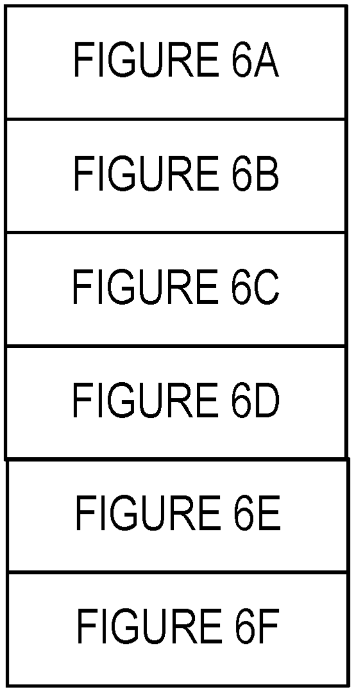
FIG. 6 comprises the combination of FIG. 6A, FIG. 6B, FIG. 6C, FIG. 6D, FIG. 6E and FIG. 6F.
Figure 6A:
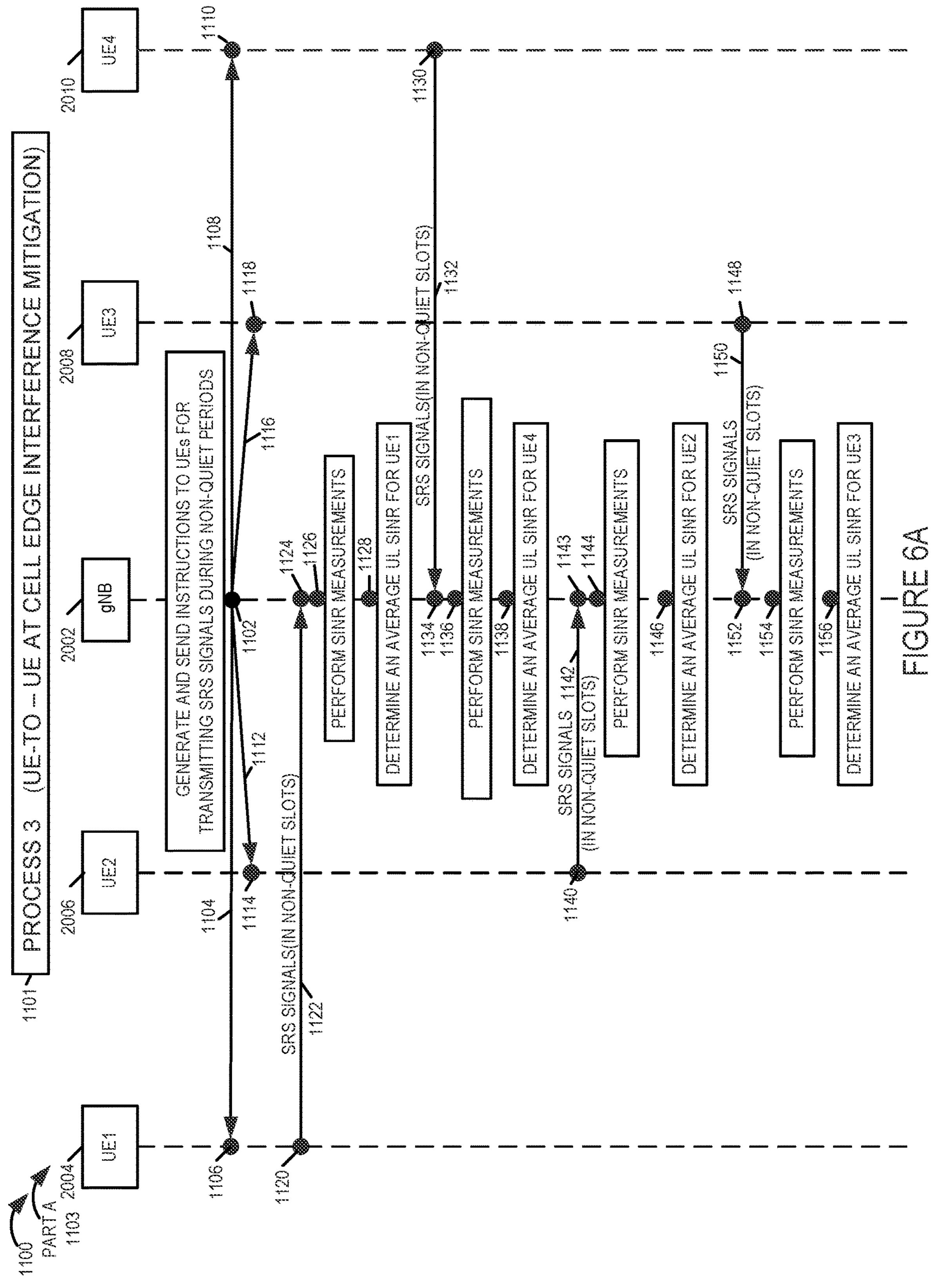
FIG. 6A is a first part of an exemplary signaling diagram of exemplary process 3 for UE-to-UE at cell edge interference mitigation.
Figure 6B:
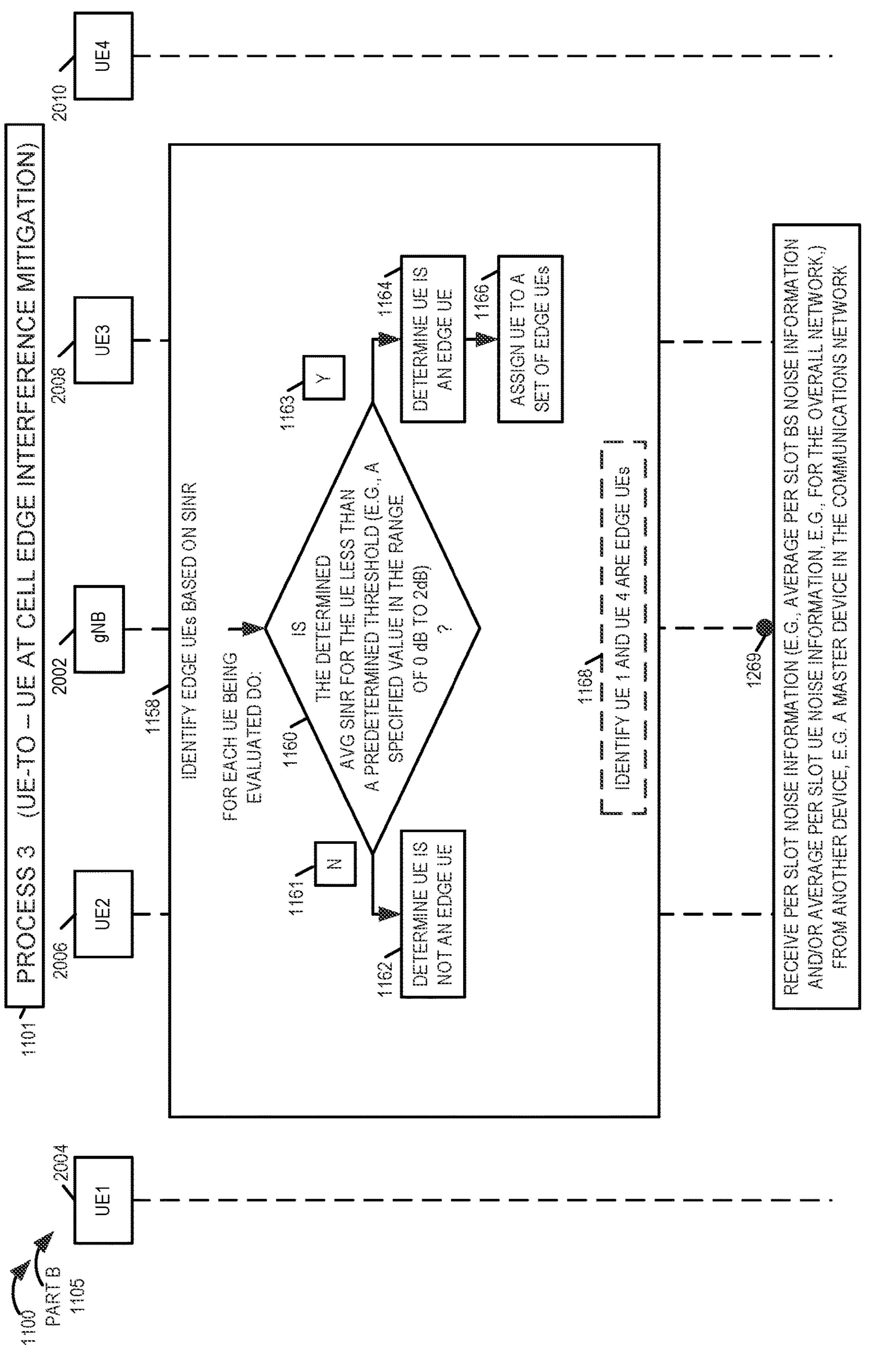
FIG. 6B is a second part of an exemplary signaling diagram of exemplary process 3 for UE-to-UE at cell edge interference mitigation.
Figure 6C:
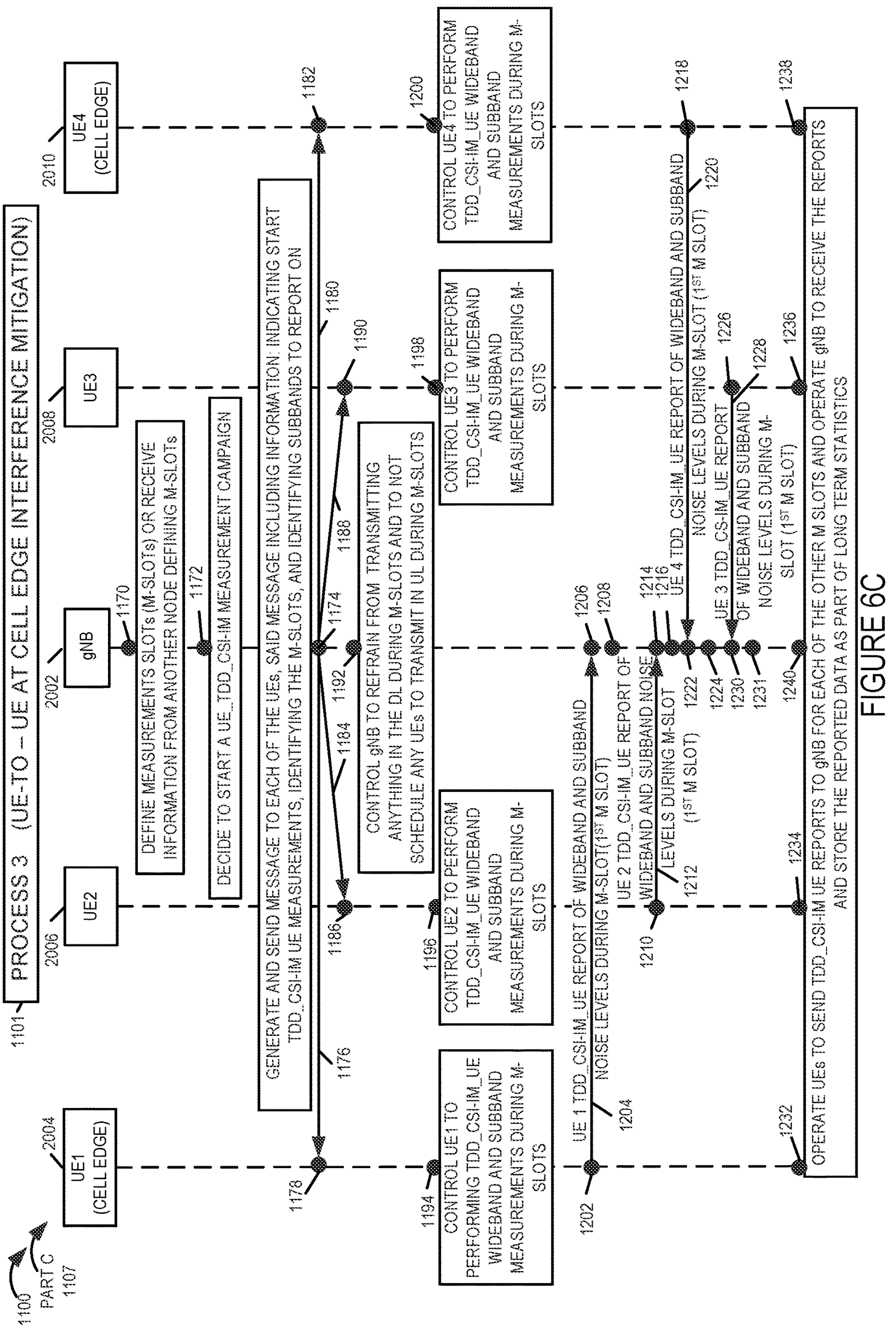
FIG. 6C is a third part of an exemplary signaling diagram of exemplary process 3 for UE-to-UE at cell edge interference mitigation.
Figure 6D:
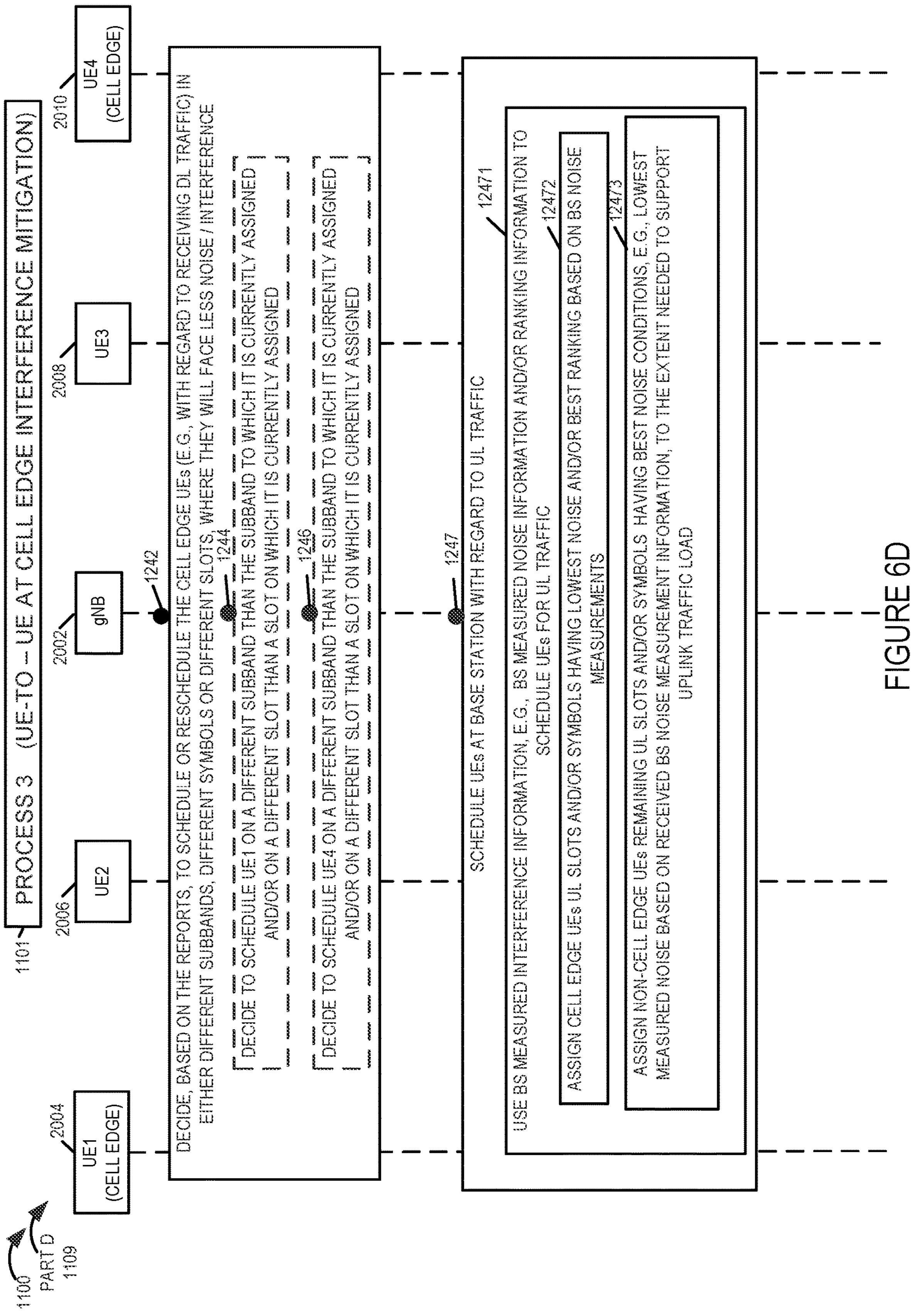
FIG. 6D is a fourth part of an exemplary signaling diagram of exemplary process 3 for UE-to-UE at cell edge interference mitigation.
Figure 6E:
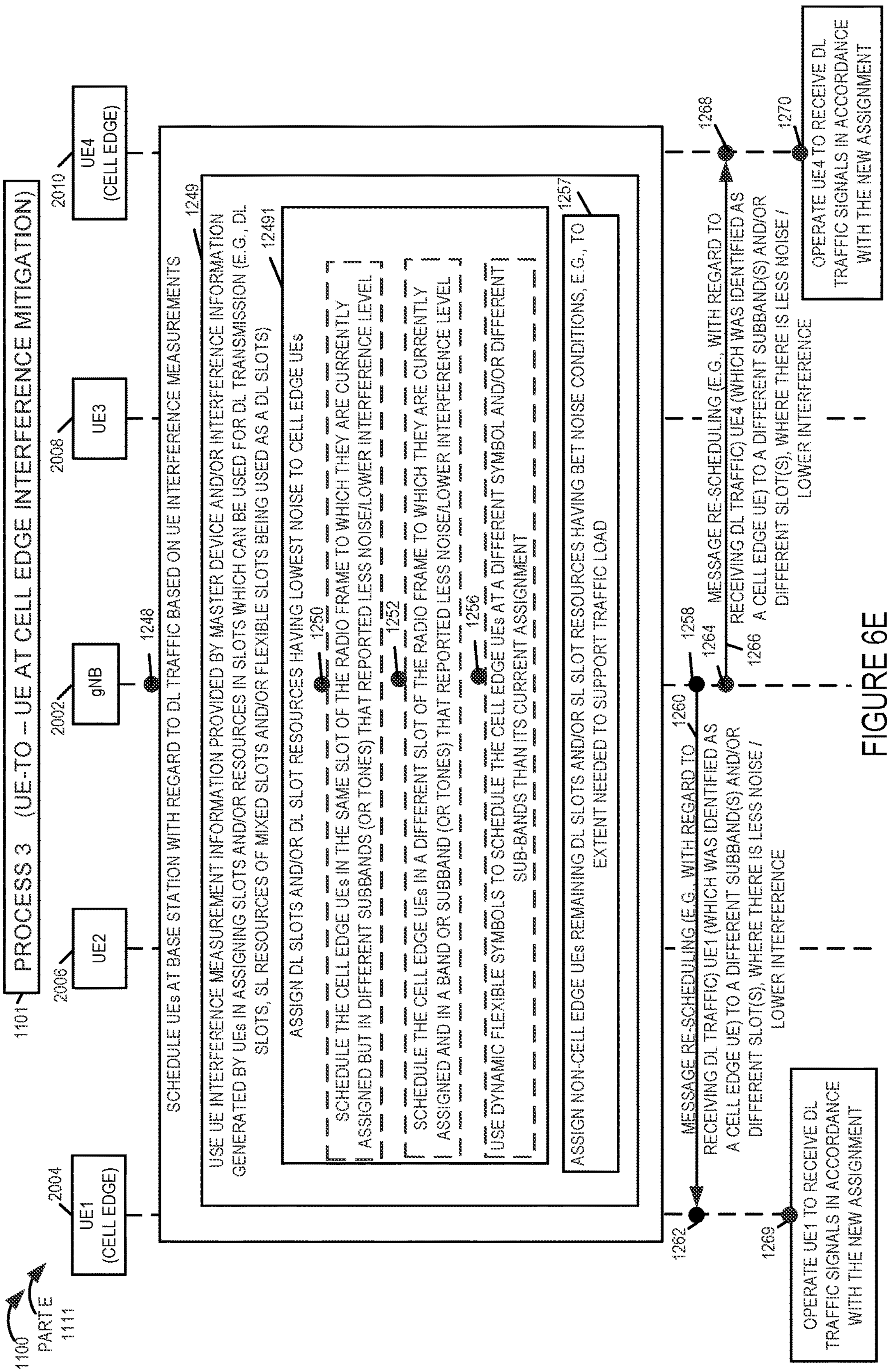
FIG. 6E is a fifth part of an exemplary signaling diagram of exemplary process 3 for UE-to-UE at cell edge interference mitigation.
Figure 6F:
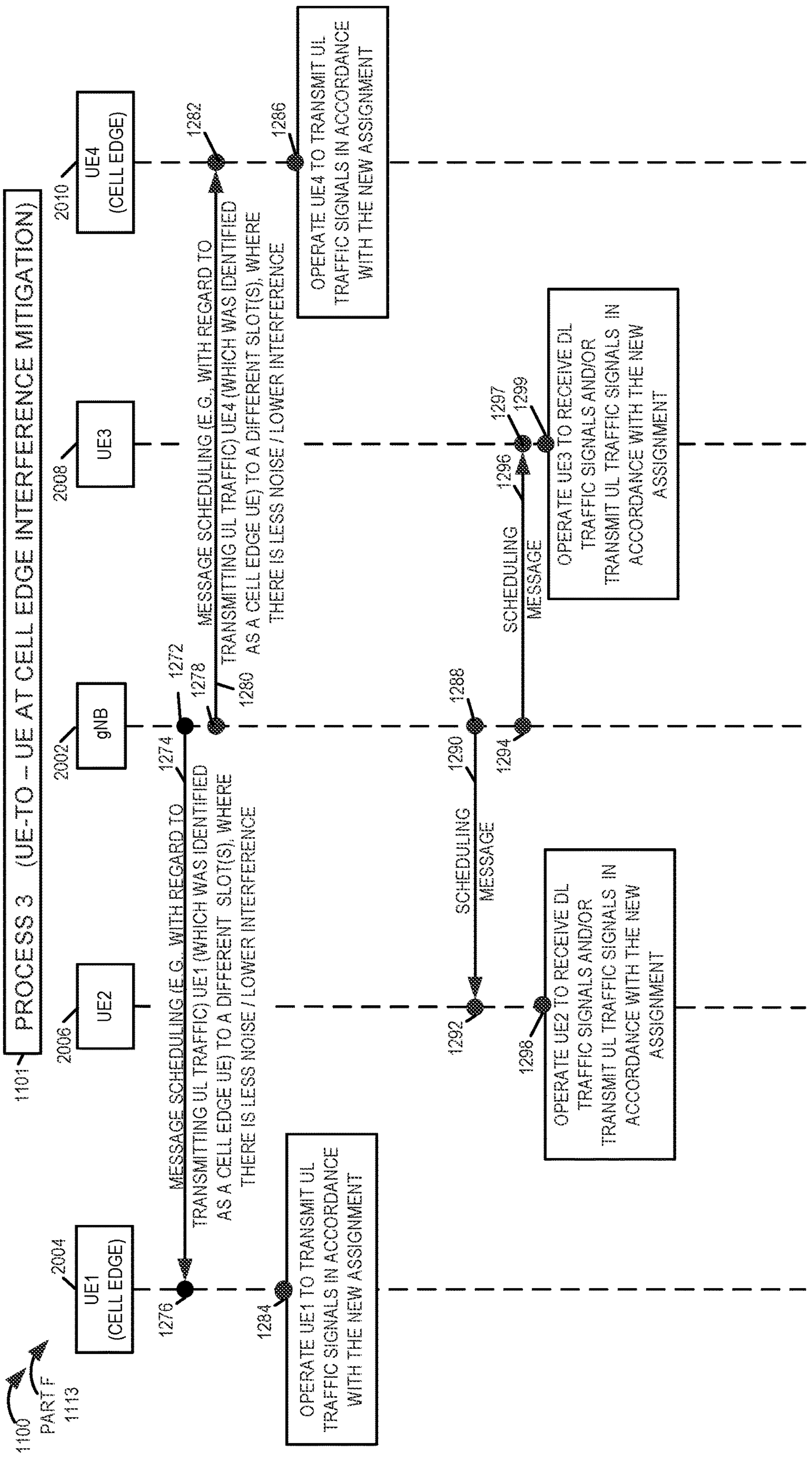
FIG. 6F is a sixth part of an exemplary signaling diagram of exemplary process 3 for UE-to-UE at cell edge interference mitigation.

FIG. 6, comprising the combination of FIG. 6A, FIG. 6B, FIG. 6C, FIG. 6D, FIG. 6E and FIG. 6F, is an exemplary signaling diagram 1100, including Part A 1103, Part B 1105, Part C 1107, Part D 1109, Part E 1011 and Part F 1013 of exemplary process 3 for UE-to-UE at cell edge interference mitigation, as indicated by title box 1101. Signaling diagram 1100 is described with respect to devices (gNB 2002, UE1 2004, UE2 2006, UE3 2008, UE4 2010) of a victim network, e.g., victim network 101 of FIG. 1.

For example, gNB 2002 of FIG. 6 is gNBM 102 of victim network 101, UE1 2004 of FIG. 6 is UE2 114 of network 101 of FIG. 1, UE2 2006 of FIG. 6 is UE1 112 of network 101 of FIG. 1, and UE3 2008 of FIG. 6 is UE3 116 of network 101 of FIG. 1, and UE4 2010 of FIG. 6 is UE4 118 of system 100 of FIG. 1. Alternatively, gNB 2002 of FIG. 6 is gNB1 104 of victim network 101, UE1 2004 of FIG. 6 is UE5 122 of network 101 of FIG. 1, UE2 2006 of FIG. 6 is UE6 124 of network 101 of FIG. 1, and UE3 2008 of FIG. 6 is UE7 126 of network 101 of FIG. 1, and UE4 2010 of FIG. 6 is UE8 128 of network 101 of FIG. 1. Alternatively, gNB 2002 of FIG. 6 is gNB2 106 of victim network 101, UE1 2004 of FIG. 6 is UE9 130 of network 101 of FIG. 1, UE2 2006 of FIG. 6 is UE10 132 of network 101 of FIG. 1, and UE3 2008 of FIG. 6 is UE12 136 of network 101 of FIG. 1, and UE4 2010 of FIG. 6 is UE11 134 of network 101 of FIG. 1. Alternatively, gNB 2002 of FIG. 6 is gNB3 108 of victim network 101, UE1 2004 of FIG. 6 is UE13 138 of network 101 of FIG. 1, UE2 2006 of FIG. 6 is UE14 144 of network 101 of FIG. 1, and UE3 2008 of FIG. 6 is UE14 140 of network 101 of FIG. 1, and UE4 2010 of FIG. 6 is UE15 142 of network 101 of FIG. 1. Alternatively, gNB 2002 of FIG. 6 is gNB4 110 of victim network 101, UE1 2004 of FIG. 6 is UE17 146 of network 101 of FIG. 1, UE2 2006 of FIG. 6 is UE19 150 of network 101 of FIG. 1, and UE3 2008 of FIG. 6 is UE20 152 of network 101 of FIG. 1, and UE4 2010 of FIG. 6 is UE18 148 of network 101 of FIG. 1.

In step 1102, gNB 2002 generates and sends instructions to UEs for transmitting sounding reference signal (SRS) signals during non-quiet periods. The instructions may be sent as an individual request message to each of the UEs or as a multicast message or as a broadcast message. In step 1106 UE1 2004 receives message 1104, communicating the instructions to transmit SRS signals during non-quiet periods, recovers the communicated instructions and identifies the resources to be used by UE1 for its SRS signal. In step 1110 UE4 2010 receives message 1108, communicating the instructions to transmit SRS signals during non-quiet periods, recovers the communicated instructions and identifies the resources to be used by UE4 for its SRS signal. In step 1114 UE2 2006 receives message 1112, communicating the instructions to transmit SRS signals during non-quiet periods, recovers the communicated instructions and identifies the resources to be used by UE2 for its SRS signal. In step 1118 UE3 2008 receives message 1116, communicating the instructions to transmit SRS signals during non-quiet periods, recovers the communicated instructions and identifies the resources to be used by UE3 for its SRS signal.

In step 1120 UE1 2004 generates and transmits SRS signals 1122 to gNB 2002 in non-quiet slots. In step 1124, gNB 2002 receives the SRS signals 1122, and in step 1124 gNB 2002 performs an SINR measurement corresponding to the received SRS signal 1122 and stores the SINR measurement value. Steps 1120, 1124, and 1126 are performed multiple times. In step 1128 gNB 2002 determines an average UL SINR for UE1 2004 based on multiple determined SINR values obtained in multiple iteration of step 1126.

In step 1130 UE4 2010 generates and transmits SRS signals 1132 to gNB 2002 in non-quiet slots. In step 1134, gNB 2002 receives the SRS signals 1132, and in step 1136 gNB 2002 performs an SINR measurement corresponding to the received SRS signal 1132 and stores the SINR measurement value. Steps 1130, 1134, and 1136 are performed multiple times. In step 1138 gNB 2002 determines an average UL SINR for UE4 2010 based on multiple determined SINR values obtained in multiple iteration of step 1136.

In step 1140 UE2 2006 generates and transmits SRS signals 1142 to gNB 2002 in non-quiet slots. In step 1143, gNB 2002 receives the SRS signals 1142, and in step 1144 gNB 2002 performs an SINR measurement corresponding to the received SRS signal 1142 and stores the SINR measurement value. Steps 1140, 1143, and 1144 are performed multiple times. In step 1146 gNB 2002 determines an average UL SINR for UE2 2006 based on multiple determined SINR values obtained in multiple iteration of step 1146.

In step 1148 UE3 2008 generates and transmits SRS signals 1150 to gNB 2002 in non-quiet slots. In step 1152, gNB 2002 receives the SRS signals 1150, and in step 1154 gNB 2002 performs an SINR measurement corresponding to the received SRS signal 1150 and stores the SINR measurement value. Steps 1148, 1152, and 1154 are performed multiple times. In step 1156 gNB 2002 determines an average UL SINR for UE3 2008 based on multiple determined SINR values obtained in multiple iteration of step 1154.

In step 1158 gNB 2002 identifies edge UEs based on SINRs. Step 1158 includes steps 1160, 1162, 1164 and 1166. Step 1160 is performed for each UE (e.g., UE 1 2004, UE2 2006, UE3 2008, and UE4 2010) being evaluated. In step 1160 gNB compares the average UL SINR (e.g., from step 1128, 1138, 1146, or 1156) for the UE being evaluated to a predetermined threshold, e.g., a predetermined value in the range of 0 dB to 2 dB) to determine if the average SINR for the UE is less than the predetermined threshold. If the determination is that the average SINR for the UE is not less than the predetermined threshold, as indicated by N 1161, then operation proceeds from step 1160 to step 1162, in which the gNB determines that the UE being evaluated is not an edge UE. However, if the determination of step 1160 is that the average SINR for the UE is less than the predetermined threshold, as indicated by Y 1163, then operation proceeds from step 1160 to step 1164, in which the gNB determines that the UE being evaluated in an edge UE. Operation proceeds from step 1164 to step 1166 in which gNB 2002 assigns the UE to a set of edge UEs. In this example, consider that gNB 2002 identifies UE1 2004 and UE 4 2010 as edge UEs, as indicated by dashed line box 1668 within step 1158.

In step 1269, gNB 2002 receives per slot noise information (e.g., average per slot BS noise information and/or average per slot UE noise information, e.g., for the overall network) from another device, e.g., a master device in the communications network.

If there is at least one UE identified as an edge UE in step 1158, then operation proceeds from step 1158 to step 1170. In step 1170 gNB 2002 defines measurement slots (M-slots) or receives information from another device, e.g., a master gNB or a core network node, defining measurement slots. In step 1172 gNB 2002 decides to start a UE TDD CSI-IM measurement campaign.

In step 1174, gNB 2002 generates and sends a message to each of the UEs (UE1 2004, UE2 2006, UE3 2008, UE4 2010), said message including information: indicating start TDD CSI-IM UE measurements, identifying the measurement slots (M-slots), and identifying subbands to report on. The message may be sent as an individual message to each of the UEs or as a multicast message or as a broadcast message. In step 1176 UE1 2004 receives message 1176, which indicates that UE1 2004 is to start TDD CSI-IM UE measurements and includes information indicating the M-slots and information identifying the subbands to report on, and recovers the communicated information. In step 1182 UE4 2010 receives message 1180, which indicates that UE4 2010 is to start TDD CSI-IM UE measurements and includes information indicating the M-slots and information identifying subbands to report on, and recovers the communicated information. In step 1186 UE2 2006 receives message 1148, which indicates that UE2 2006 is to start TDD CSI-IM UE measurements and includes information indicating the M-slots and information identifying subbands to report on, and recovers the communicated information. In step 1190 UE3 2008 receives message 1188, which indicates that UE3 2008 is to start TDD CSI-IM UE measurements and includes information indicating the M-slots and information identifying subbands to report on, and recovers the communicated information.

In step 1192 gNB 2002 is operated to refrain from transmitting anything in DL during M-slots and is operated not to schedule any UEs to transmit in UL during M-slots.

In step 1194 UE1 2004 performs TDD CSI-IM UE wideband and subband measurements during M-slots, e.g. obtaining a wideband interference measurement value (which is a wideband noise level value) and one or more subband interference measurement values (which are subband noise level value(s)) for each M-slot. In step 1196 UE2 2006 performs TDD CSI-IM UE wideband and subband measurements during M-slots, e.g. obtaining a wideband interference measurement value (which is a wideband noise level value) and one or more subband interference measurement values (which are subband noise level value(s)) for each M-slot. In step 1198 UE3 2008 performs TDD CSI-IM UE wideband and subband measurements during M-slots, e.g. obtaining a wideband interference measurement value (which is a wideband noise level value) and one or more subband interference measurement values (which are subband noise level value(s)) for each M-slot. In step 1200 UE4 20010 performs TDD CSI-IM UE wideband and subband measurements during M-slots, e.g. obtaining a wideband interference measurement value (which is a wideband noise level value) and one or more subband interference measurement values (which are subband noise level value(s)) for each M-slot.

After each UE performs interference measurements during an M-slots, the UE generates and sends a report to gNB 2002 which communicates the measured noise levels detected at the UE to gNB 2002 for storage and processing. In step 1202 UE1 2004 generates and sends UE1 TDD_CSI-IM_UE report 1204 of wideband and subband noise levels during the M-slot (1st M-slot) to gNB 2002. In step 1206, gNB 2002 receives the report 1204 and recovers the communicated information. In step 1208, gNB 2002 updates UE1 report information, e.g., storing the information and processing the information with regard to long term statistics, e.g., updating noise averages associated with UE1 with regard to the particular slot position in the radio frame to which the report corresponds.

In step 1210 UE2 2006 generates and sends UE2 TDD_CSI-IM UE report 1212 of wideband and subband noise levels during the M-slot (1st M-slot) to gNB 2002. In step 1214, gNB 2002 receives the report 1212 and recovers the communicated information. In step 1216, gNB 2002 updates UE2 report information, e.g., storing the information and processing the information with regard to long term statistics, e.g., updating noise averages associated with UE2 with regard to the particular slot position in the radio frame to which the report corresponds.

In step 1218 UE4 2010 generates and sends UE4 TDD_CSI-IM UE report 1220 of wideband and subband noise levels during the M-slot (1st M-slot) to gNB 2002. In step 1222, gNB 2002 receives the report 1220 and recovers the communicated information. In step 1224, gNB 2002 updates UE4 report information, e.g., storing the information and processing the information with regard to long term statistics, e.g., updating noise averages associated with UE4 with regard to the particular slot position in the radio frame to which the report corresponds.

In step 1226 UE3 2008 generates and sends UE3 TDD_CSI-IM_UE report 1228 of wideband and subband noise levels during the M-slot (1st M-slot) to gNB 2002. In step 1230, gNB 2002 receives the report 1228 and recovers the communicated information. In step 1231, gNB 2002 updates UE3 report information, e.g., storing the information and processing the information with regard to long term statistics, e.g., updating noise averages associated with UE3 with regard to the particular slot position in the radio frame to which the report corresponds.

In steps 1232, 1234, 1236, and 1238, the UEs (UE1 2004, UE2 2006, UE3 2008, and UE4 2010) are operated to generate and send reports to the gNB 2002 for each of the other M slots for which they measure interference. In step 1240 gNB is operated to receive the additional reports from the UEs (UE1 2004, UE2 2006, UE3 2008, UE4 2010) corresponding to the additional M-slots, store the received information, process the received information, e.g. updating averages corresponding to combination of UE, slot position, and interference measurement type (wideband, subband(s)), and store the processed results as part of long term statistics. Thus, gNB 2002 after receiving and processing the reports corresponding to the UEs from the large set of M-slots, is able to characterize noise levels being experienced at its UEs with regard to slots in the radio frame and with regard to wideband and with regard to sub-bands. The gNB may, and sometimes does, also combine information corresponding to multiple, e.g., the full set of UEs, to characterize overall UE interference being experienced by its UEs, e.g., and identify particular slots and/or particular subbands within slots of low noise/low interference levels.

In step 1242 gNB 2002 decides, based on the reports, to reschedule the cell edge UEs (e.g., UE1 2004 and UE4 2010), e.g., with regard to receiving downlink traffic, in either different subbands or different slots, where they will face less noise/lower levels of interference than they are currently experiencing. Step 1242 may, and sometimes does include step 1244 in which gNB 2002 decides to schedule UE1 2004 (which has been classified as a cell edge UE) on a different subband than the subband to which it is currently assigned and/or on a different slot than a slot on which it is currently assigned. Step 1242 may, and sometimes does include step 1246 in which gNB 2002 decides to schedule UE4 2004 (which has been classified as a cell edge UE) on a different subband than the subband to which it is currently assigned and/or on a different slot than a slot on which it is currently assigned.

In step 1247, gNB 2002 schedules UEs at the base station with regard to UL traffic. Step 1247 includes step 12471, in which the gNB 2002 uses BS measured interference information, e.g. BS measured noise information and/or ranking information to schedule UEs for UL traffic. Step 12471 includes step 12472 and 12473. In step 12472 gNB 2002 assigns cell edge UEs UL slots having the lowest noise and/or best ranking based on BS noise measurements. In step 12472 gNB 2002 assigns non-cell edge UEs remaining UL slots having best noise conditions, e.g., lowest measured noise based on received BS noise measurement information, to the extent needed to support uplink traffic load.

In step 1248 gNB 2002 schedules UEs at the base station with regard to DL traffic based on UE interference measurements. Step 1248 includes step 1249 and 1257.

In step 1249 gNB 2002 uses UE interference measurement information provided by the master device and/or interference information generated by UEs in assigning slots and/or resources in slots which can be used for SLOT transmission (e.g., DL slots, DL resources of mixed slots and/or flexible slots being used as DL slots. Step 1249 incudes step 12491. Step 12491 may and sometimes does includes step 1250, in which gNB 2002 schedules one or more of the cell edge UEs in the same slot of the radio frame to which they are currently assigned but in different subbands (or tones) that reported less noise/lower interference level. Step 12491 may, and sometimes does, includes step 1252, in which gNB 2002 schedules one or more of the cell edge UEs in a different slot of the radio frame to which they are currently assigned and in a band or subband (or tones) that reported less noise/lower interference. In some embodiments, step 12491 includes step 1256 in which gNB 2002 uses dynamic flexible symbols to schedule one or more cell edge UEs at a different symbol and/or different subbands than its current assignment.

In step 1257 gNB 2002 assigns non-cell edge UEs remaining DL slots and/or DL slot resources having best noise conditions, e.g. to the extent needed to support traffic load.

In step 1258 gNB 2002 generates and sends message 1260 re-scheduling (e.g., with regard to DL traffic) UE1 2004, which was identified as a cell edge UE, to a different subband(s) and/or different slot(s), where there is less noise/lower interference. In step 1262 UE 1 2004 receives the reassignment message 1260 and recovers the communicated information.

In step 1264 gNB 2002 generates and sends message 1264 re-scheduling (e.g., with regard to DL traffic) UE4 2010, which was identified as a cell edge UE, to a different subband(s) and/or different slot(s), where there is less noise/lower interference. In step 1268 UE4 2010 receives the reassignment message 1266 and recovers the communicated information.

In step 1269 UE1 2004 is operated to receive DL traffic signals in accordance with the new assignment. In step 1270 UE4 2010 is operated to receive DL traffic signals in accordance with the new assignment.

In step 1272 gNB 2002 generates and sends message 1274 scheduling (e.g., with regard to UL traffic) UE1 2004, which was identified as a cell edge UE, to a different slot(s), where there is less noise/lower interference. In step 1276 UE 1 2004 receives the assignment message 1276 and recovers the communicated information.

In step 1278 gNB 2002 generates and sends message 1280 scheduling (e.g., with regard to UL traffic) UE4 2010, which was identified as a cell edge UE, to a different slot(s), where there is less noise/lower interference. In step 1282 UE 4 2010 receives the assignment message 1280 and recovers the communicated information.

In step 1282 UE1 2004 is operated to transmit UL traffic signals in accordance with the new assignment. In step 1286 UE4 2010 is operated to transmit UL traffic signals in accordance with the new assignment.

In step 1288 gNB 2002 generates and sends scheduling message 1290 to UE2 2006, which receives message 1280 in step 1292 and recovers the communicated information, e.g., a DL and/or UL scheduling assignment. In step 1294 gNB 2002 generates and sends scheduling message 1296 to UE3 2008, which receives message 1296 in step 1297 and recovers the communicated information, e.g., a DL and/or UL scheduling assignment. In step 1298 UE2 2006 is operated to received SLOT traffic signals and/or to transmit UL traffic signals in accordance with the received assignment(s). In step 1299 UE3 2008 is operated to received DL traffic signals and/or to transmit UL traffic signals in accordance with the received assignment(s).

Figure 8:
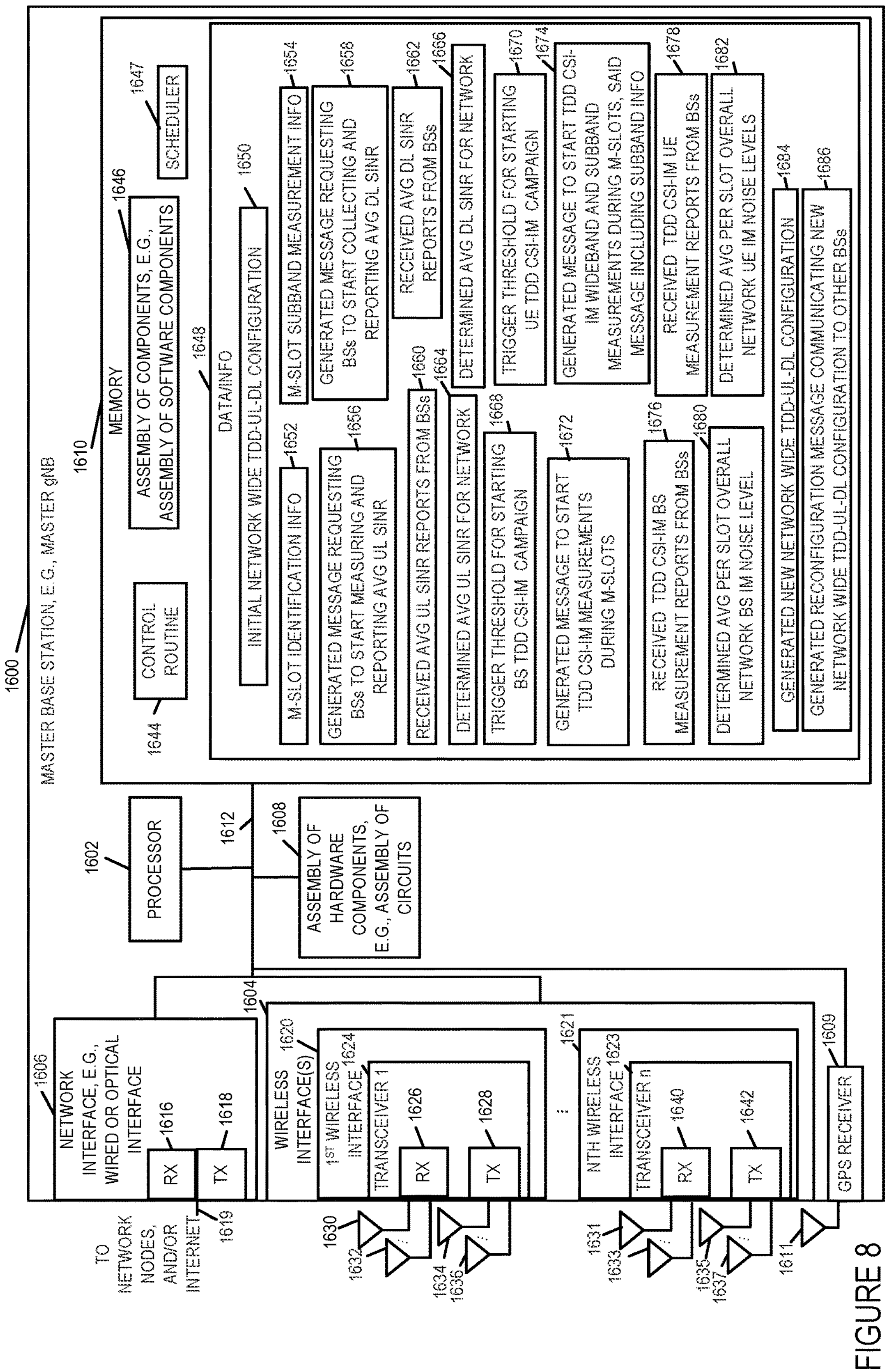
FIG. 8 is a drawing of an exemplary master base station, e.g. a master gNB, in accordance with an exemplary embodiment.

FIG. 8 is a drawing of an exemplary master base station (BS) 1600, e.g. a master gNB 1600, in accordance with an exemplary embodiment. Master base station 1600 is, e.g., any of master base station BS M 102 of victim network 101 of FIG. 1, gNBM 102 of FIG. 2, gNBM 102 of FIG. 3, or gNB 2002 of FIG. 6.

Master base station 1600 includes a processor 1602, e.g., a CPU, wireless interfaces 1604, a network interface 1606, e.g., a wired or optical interface, an assembly of hardware components 1608, e.g., an assembly of circuits, a GPS receiver 1609, and memory 1610 coupled together via a bus 1612 over which the various elements may interchange data and information.

Wireless interfaces 1604 includes a plurality of wireless interfaces (1st wireless interface 1620, . . . , Nth wireless interface 1621). 1st wireless interface 1620 includes transceiver 1 1624 which includes wireless receiver 1626 and wireless transmitter 1628. Wireless receiver 1626 is coupled to a plurality of receive antennas or receive antenna elements (1630, . . . , 1632) via which the wireless receiver 1626 receives wireless signals, e.g., UL wireless signals from UEs being served by the master base station 1600 and/or interference signals from devices of an aggressor network. Wireless transmitter 1628 is coupled to a plurality of transmit antennas or transmit antenna elements (1634, . . . , 1636) via which the wireless transmitter 1628 transmits wireless signals, e.g., to UEs being served by the master base station 1600. Nth wireless interface 1621 includes transceiver n 1623 which includes wireless receiver 1640 and wireless transmitter 1642. Wireless receiver 1640 is coupled to a plurality of receive antennas or receive antenna elements (1631, . . . , 1633) via which the wireless receiver 1640 receives wireless signals, e.g., wireless UL signals from UEs being served by the master base station 1600 and/or interference signals from devices of an aggressor network. Wireless transmitter 1642 is coupled to a plurality of transmit antennas or transmit antenna elements (1635, . . . , 1637) via which the wireless transmitter 1642 transmits wireless signals, e.g., to UEs being served by the master base station 1600.

Network interface 1606 includes receiver 1616, transmitter 1618 and connector 1619. Network interface 1606 couples the master base station 1600 to other network nodes, e.g. other base stations, core network nodes, etc., and/or the Internet. Master base station 1600 sends commands and/or requests and/or information to other base stations in its network regarding interference management, e.g., commands to start performing SINR UL and/or SINR DL measurements and start measurement reporting, commands to start a TDD CSI-IM BS and/or UE measurement campaign, information identifying designated M-slots, and/or information identifying subbands on which noise is to be measured, via transmitter 1618 and connector 1619 of network interface 1606. Master base station 1600 also sends TDD-UL-DL reconfiguration information to base stations, e.g., in response to a determination to reconfigure based on results of the interference measurement reports. Master base station 1600 receives SINR reports and/or TDD CSI-IM BS and/or UE reports from other base stations in its network via receiver 1616 and connector 1619 of its network interface 1606.

GPS receiver 1609 is coupled to GPS antenna 1611 via which receiver 1609 receives GPS signals from satellites. The received GPS signals are processed by the GPS receiver 1609 to determine accurate time and the location of master base station 1600. The determined time information is used by base station 1600 to determine a reference time for when a TDD timing structure, being used by the network to which master base station belongs, should start. This timing reference is used to maintain accurate, e.g., very highly accurate, start time synchronization with respect to other base stations within its network. This timing reference is used to maintain approximate start time synchronization with respect to another network, e.g., an aggressor network operating in its vicinity.

Memory 1610 includes control routine 1644, a scheduler 1647, an assembly of components 1646, e.g., an assembly of software components, and data/information 1648. Control routine 1644 includes machine executable instructions, which when executed by processor 1602 control the master base station 1600 to perform basic operations including read to memory, write to memory, operate an interface, etc. Assembly of software components 1646 includes machine executable instructions, which when executed by processor 1602 controls the master base station 1600 to perform steps of an exemplary method in accordance with the present invention, e.g., steps of the method of FIG. 7 including steps of process 1 of signaling diagram 200 of FIG. 2 and/or steps of process 2 of the signaling diagram 500 of FIG. 3, and/or steps of process 3 of signaling diagram 1100 of FIG. 6, which are performed by a master base station.

The scheduler 1647 is responsible for assigning slots and/or symbols in slots to individual UEs for their use. In various embodiments the scheduler 1746 assigns slots and/or symbols with lower noise on a preferential basis to cell edge UEs with more noisy slots and/or symbols being assigned to non-cell edge UEs. Different UEs can and sometimes are assigned different symbols of a slot with in some cases a non-cell edge UE being assigned a low noise symbol in a UL or DL slot with non-cell edge UE being assigned a noisier symbol in the same slot. Noise information used in making slot and/or symbol assignments can be and sometimes is received from multiple base stations and combined at the master base station 1600 with locally measured interference information. Or used in combination with locally measured interference information. The master device 1600 in some embodiments generates average per slot and/or per symbol noise information from the received and/or locally measured noise information. The scheduler 1647 is sometimes implemented as a software routine and in other embodiments is implemented as a hardware circuit. The illustration of the scheduler 1647 in memory 1610 represents the case where it is implemented as a software routine.

Data/information 1648 includes an initial network-wide TDD-UL-DL configuration 1650, measurement slot (M-slot) identification information 1652, M-slot subband measurement information 1654, a generated message 1656 requesting base stations to start measuring and reporting average UL SINR, a generated message 1658 requesting base stations to start collecting and reporting average DL SINR, received average UL SINR reports 1660 from base stations, received average DL SINR reports 1662 from base stations, a determined average UL SINR for the network 1664, a determined average slot SINR for the network 1666, a determined per slot per symbol SINR, a trigger threshold for starting a BS TDD CSI-IM campaign 1668, and a trigger threshold for starting a UE TDD CSI-IM campaign 1670. Data/information 1648 further includes a generated message 1672 to be sent to base stations to start TDD CSI-IM measurements during M-slots as part of a BS TDD CSI-IM campaign, said message including information identifying the M-slots, a generated message 1674 to be sent to base stations to start TDD CSI-IM wideband and subband measurements, by UEs, during M-slots as part of a UE TDD CSI-IM campaign, said message including information identifying the M-slots, and information identifying the subbands, received TDD CSI-IM BS measurements reports 1676 from base stations, wherein a received measurement report includes per slot average noise level information, received TDD CSI-IM UE measurement reports 1678 from base stations, wherein a received measurement report includes per slot average wideband noise level information and per slot average subband noise level information, determined average per slot overall network BS IM noise level information 1680, and determined average per slot overall network UE IM noise level information 1682. Data/information 1648 further includes a generated new network-wide TDD-UL-DL configuration 1684, and a message 1686 to be sent to the other base stations in the network, said message communicating the new network-wide TDD-UL-DL configuration, which is to be implemented by the base stations, e.g. at a point in time indicated in the message.

Figure 9:
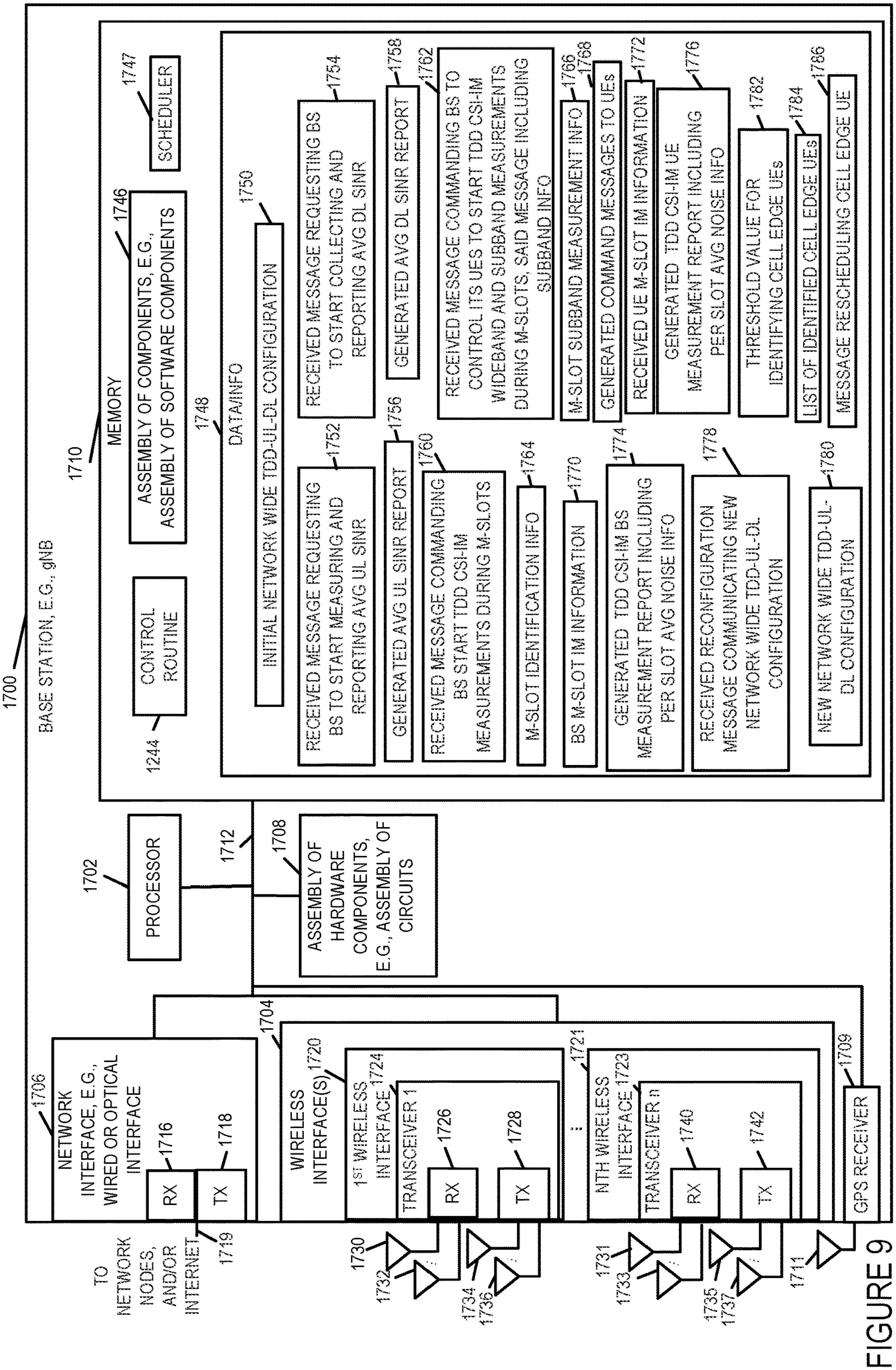
FIG. 9 is a drawing of an exemplary base station, e.g. a gNB, in accordance with an exemplary embodiment.

FIG. 9 is a drawing of an exemplary base station (BS) 1700, e.g. a gNB, in accordance with an exemplary embodiment. Base station 1700 is, e.g., any of the base stations BS1 104, BS2 106, BS3 108, or BS4 110 of victim network 101 of FIG. 1, gNB1 104 of FIG. 2 or FIG. 3, gNB2 106 of FIG. 2 or FIG. 3, gNB3 108 of FIG. 2 or FIG. 3, gNB4 110 of FIG. 2 or FIG. 3, or gNB 2002 of FIG. 6.

Exemplary base station 1700 includes a processor 1702, e.g., a CPU, wireless interfaces 1704, a network interface 1706, e.g., a wired or optical interface, an assembly of hardware components 1708, e.g., an assembly of circuits, a GPS receiver 1709, and memory 1710 coupled together via a bus 1712 over which the various elements may interchange data and information.

Wireless interfaces 1704 includes a plurality of wireless interfaces (1st wireless interface 1720, . . . , Nth wireless interface 1721). 1st wireless interface 1720 includes transceiver 1 1724 which includes wireless receiver 1726 and wireless transmitter 1728. Wireless receiver 1726 is coupled to a plurality of receive antennas or receive antenna elements (1730, . . . , 1732) via which the wireless receiver 1726 receives wireless signals, e.g., UL wireless signals from UEs being served by the base station 1700 and/or interference signals from devices of an aggressor network. Wireless transmitter 1728 is coupled to a plurality of transmit antennas or transmit antenna elements (1734, . . . , 1736) via which the wireless transmitter 1728 transmits wireless signals, e.g., to UEs being served by the base station 1700. Nth wireless interface 1721 includes transceiver n 1723 which includes wireless receiver 1740 and wireless transmitter 1742. Wireless receiver 1740 is coupled to a plurality of receive antennas or receive antenna elements (1731, . . . , 1733) via which the wireless receiver 1740 receives wireless signals, e.g., wireless UL signals from UEs being served by the base station 1700 and/or interference signals from devices of an aggressor network. Wireless transmitter 1742 is coupled to a plurality of transmit antennas or transmit antenna elements (1735, . . . , 1737) via which the wireless transmitter 1742 transmits wireless signals, e.g., to UEs being served by the base station 1700.

Network interface 1706 includes receiver 1716, transmitter 1718 and connector 1719. Network interface 1706 couples the base station 1700 to other network nodes, e.g. to a master base station, to core network nodes, etc., and/or to the Internet. Base station 1700 receives commands and/or requests and/or information from a master base station in its network regarding interference management, e.g., commands to start performing SINR UL and/or SINR DL measurements and start measurement reporting, commands to start a TDD CSI-IM BS and/or UE measurement campaign, information identifying designated M-slots, and/or information identifying subbands on which noise is to be measured, via receiver 1616 and connector 1619 of network interface 1606. Base station 1700 also receives TDD-UL-DL reconfiguration information to base stations, e.g., in response to a determination to reconfigure based on results of the interference measurement reports, via receiver 1616 and connector 1619. Base station 1700 transmits SINR reports and/or TDD CSI-IM BS and/or UE reports to the master base station in its network via transmitter 1618 and connector 1619 of its network interface 1606.

GPS receiver 1709 is coupled to GPS antenna 1711, via which receiver 1709 receives GPS signals from satellites. The received GPS signals are processed by the GPS receiver 1709 to determine accurate time and the location of base station 1700. The determined time information is used by base station 1700 to determine a reference time for when a TDD timing structure, being used by the network to which the base station belongs should start. This timing reference is used to maintain accurate, e.g., very highly accurate, start time synchronization with respect to other base stations within its network.

Memory 1710 includes control routine 1744, a scheduler 1747, assembly of components 1746, e.g., an assembly of software components, and data/information 1748. Control routine 1744 includes machine executable instructions, which when executed by processor 1702 control the base station 1700 to perform basic operations including read to memory, write to memory, operate an interface, etc. Assembly of software components 1746 includes machine executable instructions, which when executed by processor 1702 controls the base station 1700 to perform steps of an exemplary method in accordance with the present invention, e.g., steps of the method of FIG. 7 including steps of process 1 of signaling diagram 200 of FIG. 2 and/or steps of process 2 of the signaling diagram 500 of FIG. 3, and/or steps of process 3 of signaling diagram 1100 of FIG. 6, which are performed by a base station.

The scheduler 1747 is responsible for assigning slots and/or symbols in slots to individual UEs for their use. In various embodiments the scheduler 1747 assigns slots and/or symbols with lower noise on a preferential basis to cell edge UEs with more noisy slots and/or symbols being assigned to non-cell edge UEs. This increases the chance of successful communication with cell edge UEs as compared to the case where they might be assigned noisier slots. Different UEs can and sometimes are assigned different symbols of a slot with in some cases a non-cell edge UE being assigned a noiser symbol in a UL or DL slot with a non-cell edge UE being assigned a lower noise symbol in the same slot. Noise information used in making slot and/or symbol assignments can be and sometimes is received from a master device, e.g., master base station, and/or measured locally. When obtained from the master device the noise information often includes average per slot and/or per symbol noise information. The scheduler 1747 is sometimes implemented as a software routine and in other embodiments is implemented as a hardware circuit. The illustration of the scheduler 1747 in memory represents the case where it is implemented as a software routine.

Data/information 1748 includes an initial network-wide TDD-UL-DL configuration 1750, a received message 1752 from a master base station requesting the base station 1700 to start measuring UL SINR and reporting average UL SINR to the master base station, a received message 1754 from a master base station requesting the base station 1700 to start collecting DL SINR and reporting average DL SINR to the master base station, a generated average UL SINR report 1756 to be sent to the master base station, a generated average DL SINR report 1758 to be sent to the master base station, a received message1760 commanding the BS 1700 to start TDD CSI-IM measurements during M-slots as part of a BS TDD CSI-IM campaign, said message including information identifying the M-slots, a received message 1762 commanding the BS 1700 to control its UEs to start TDD CSI-IM measurements during M-slots as part of a UE TDD CSI-IM campaign, said message including information identifying the M-slots and information identifying subbands on which interference is to be measured in addition to wideband measurements which are also to be performed by the UEs, M-slot identification information 1764 recovered from message 1760 or 1762, M-slot subband identification information 1766 recovered from message 1762, base station M-slot interference measurement information 1770, generated command messages 1768 to be sent to UEs, which are connected to BS 1700, commanding the UEs to perform wideband and subband interference measurements during M-slots, received UE M-slot interference measurement information 1772, a generated TDD CSI-IM BS measurement report 1774 to be sent to the master base station, said report including per slot average noise information, a generated TDD CSI-IM UE measurement report 1776 to be sent to the master base station, said report including per slot average wideband and subband(s) noise information, a received reconfiguration message 1778, from the master base station, said message communicating a new network-wide TDD-UL-DL configuration to be implemented by base station 1700, e.g., at a time indicated in the received message, and the recovered new network-wide TDD-UL-DL configuration 1780, which is to be used by base station 1700. Subband noise information may and sometimes does include per symbol noise information. Data/information 1748 further includes a threshold value 1782 for identifying cell edge UEs, a list 1784 of identified cell edge UEs, and a generated message 1786 to be communicated to a cell edge UE, said message rescheduling the cell edge UE, e.g., with regard to DL traffic signals. Noise information received from the master device and/or measured at the base station performing the schuling can be and sometimes is used for scheduling of UEs with regard to UL slots and/or symbols of UL slots.

Figure 10:
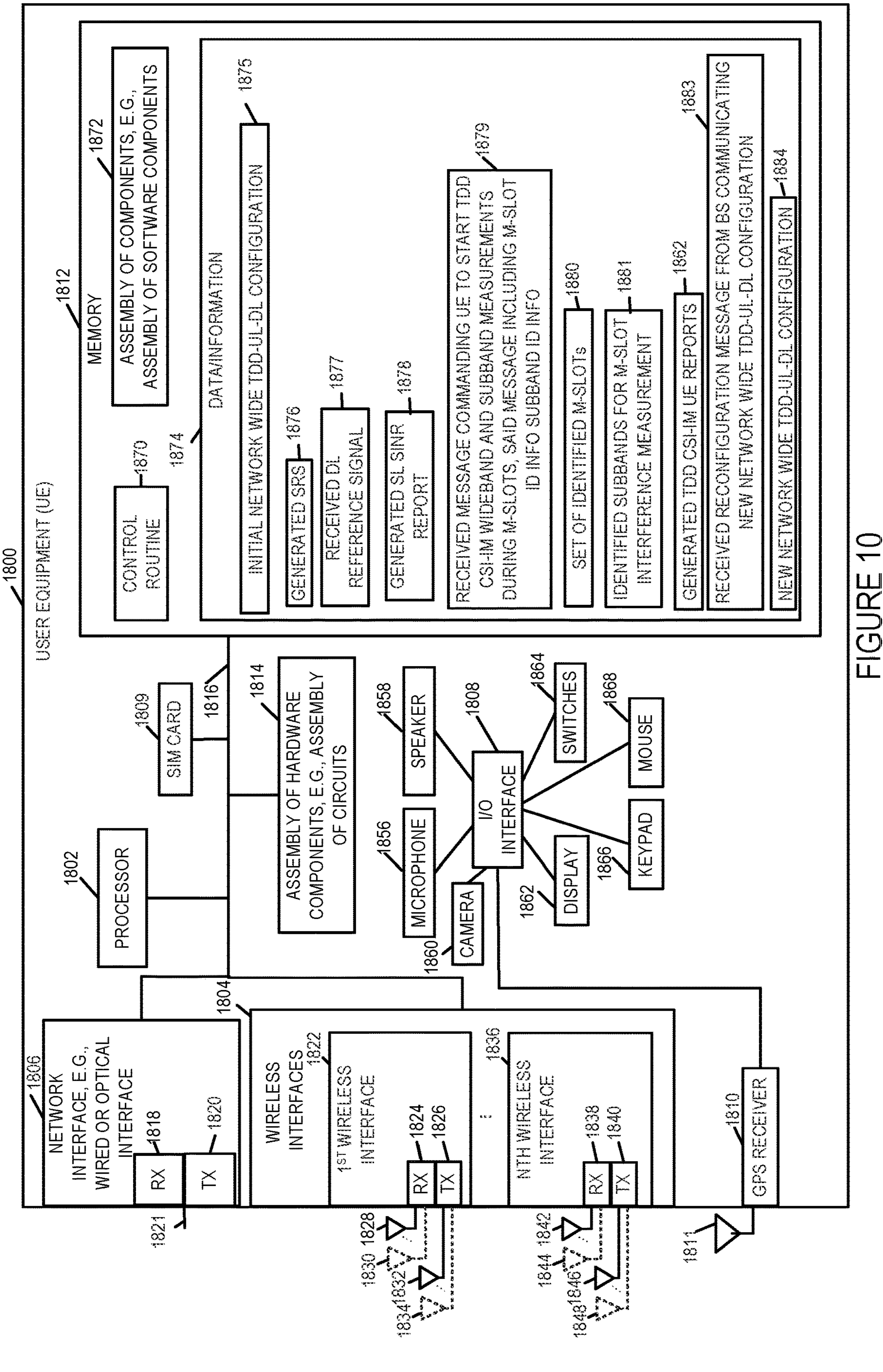
FIG. 10 is a drawing of an exemplary user equipment (UE) in accordance with an exemplary embodiment.

FIG. 10 is a drawing of an exemplary user equipment (UE) 1800 in accordance with an exemplary embodiment. UE 1800 is, e.g., any of the UEs (112, 114, 116, 118, 120, 122, 124, 126, 128, 130, 132, 134, 136, 138, 140, 142, 144, 146, 148, 150, 152) of victim network 101 of FIG. 1 and/or of FIGS. 2 and/or FIG. 3, or any of the UEs (UE1 2004, UE2 2006, UE3 2008, UE4 2010) of FIG. 6.

Exemplary UE 1800 includes a processor 1802, e.g., a CPU, wireless interfaces 1804, network interface 1806, I/O interface 1808, SIM card 1809, GPS receiver 1810, memory 1812, and assembly of hardware components 1814, e.g., an assembly of circuits, coupled together via a bus 1816 over which the various elements may interchange data and information. Wireless interfaces 1804 include a plurality of wireless interfaces (1st wireless interface 1822, . . . , Nth wireless interface 1836). 1st wireless interface 1822 includes wireless receiver 1824 and wireless transmitter 1826. Wireless receiver 1824 is coupled to one or more receive antennas or receive antenna elements (1828, . . . , 1830) via which the wireless receiver 1824 receives wireless signals, e.g., DL wireless signals from a base station or sidelink wireless signals from another UE, and/or interference signals from devices of an aggressor network. Wireless transmitter 1826 is coupled to one or more transmit antennas or transmit antenna elements (1832, . . . , 1834) via which the wireless transmitter 1826 transmits wireless signals, e.g., to a base station or to another UE. Nth wireless interface 1836 includes wireless receiver 1838 and wireless transmitter 1840. Wireless receiver 1838 is coupled to one or more receive antennas or receive antenna elements (1842, . . . , 1844) via which the wireless receiver 1838 receives wireless signals, e.g., DL wireless signals from a base station, sidelink wireless signals from another UE, and/or interference wireless signals from devices of an aggressor network. Wireless transmitter 1840 is coupled to one or more transmit antennas or transmit antenna elements (1846, . . . , 1848) via which the wireless transmitter 1840 transmits wireless signals, e.g., to a base station or to another UE. Network interface 1806 includes receiver 1818, transmitter 1820 and connector 1821. Network interface 1806 may be, and sometimes is, used by UE 1800 when the UE 1800 is stationary and located at a site where a wired or optical connection is available.

GPS receiver 1810 is coupled to GPS antenna 1811, via which the UE 1800 receives GPS signals. The GPS receiver 1810 processes the received GPS signals to determine time, UE 1300 position, e.g., latitude, longitude and altitude, UE velocity information, and/or UE navigation information.

UE 1800 further includes a plurality of I/O devices (microphone 1856, speaker 1858, camera 1860, display 1862, e.g., a touch screen display, switches 1864, keypad 1866 and mouse 1868, coupled to I/O interface 1808 via which the various I/O devices may communicate with other elements within UE 1800.

Memory 1812 includes control routine 1870, assembly of components 1872, e.g., an assembly of software components, and data/information 1874. Control routine 1870 includes machine executable instructions, which when executed by processor 1802 control the UE 1800 to perform basic operations including read to memory, write to memory, operate an interface, etc. Assembly of software components 1872 includes machine executable instructions, which when executed by processor 1802 control the UE 1800 to perform steps of an exemplary method in accordance with the present invention, e.g., steps of the method of the flowchart of FIG. 7 including steps of process 1 of signaling diagram 200 of FIG. 2 and/or steps of process 2 of signaling diagram 500 of FIG. 3, and/or steps of signaling diagram 1100 of FIG. 6, which are performed by a UE.

Data/information 1874 includes an initial network wide TDD-UL-DL configuration 1875, a generated sounding reference signal (SRS) 1876 to be transmitted to the base station to which UE 1800 is connected, a received DL reference signal 1877 received from the base station to which UE 1800 is connected, and a generated DL SINR report 1878 corresponding to a received DL reference signal, which was measured by UE 1800, said generated SINR report 1878 to be communicated to the base station. Data/information 1874 further includes a received message 1879, from the BS to which UE 1800 is connected, said message 1879 commanding UE 1800 to start TDD CSI-IM wideband and subband measurements during M-slots, said message 1879 including information identifying the M-slots and information identifying subbands on which interference noise is to be measured during the M-slots, in addition to measuring wideband interference noise during the M-slots. Data information 1874 further includes a set of identified M-slots 1880 and identified subband for M-slot interference measurements, said information 1880 and 1881 recovered from command message 1879. Data/information 1874 further includes generated TDD CSI-IM UE reports 1862 to be sent to the base station to which UE 1800 is connected, a received reconfiguration message 1883 from the base station communicating a new network-wide TDD-UL-DL configuration to be implemented by UE 1800, and the new network-wide TDD-UL-DL configuration 1884, recovered from reconfiguration message 1883.

FIG. 11 is a drawing of a table 1900 including exemplary TDD CSI-IM BS per slot measurement report information, in accordance with an exemplary embodiment. First column 1902 includes information identifying slot number in radio frame, where 0 represents slot S0 in the radio frame, 1 represents slot S1 in the radio frame, etc. Second column 1904 includes average BS measured noise value information corresponding to each slot number.

FIG. 12 is a drawing of a table 2000 including exemplary TDD CSI-IM UE per slot measurement report information, in accordance with an exemplary embodiment. First column 2002 includes information identifying slot number in radio frame, where 0 represents slot S0 in the radio frame, 1 represents slot S1 in the radio frame, etc. Second column 2004 includes average UE wideband measured noise value information corresponding to each slot number. Third column 2006 includes average UE subband 1 measured noise value information corresponding to each slot number. Column 2008 includes average UE subband n measured noise value information corresponding to each slot number.

FIG. 13 is a drawing of a table 2100 including exemplary TDD CSI-IM BS per M slot measurement report information, in accordance with an exemplary embodiment. FIG. 13 illustrates an alternative reporting format to the reporting format of FIG. 11. First column 2102 includes information identifying the M-slot number, where 1 represents the 1st designated M-slot, where 2 represents the 2nd designated M-slot, . . . , where 100 represents the 100th designated M-slot, e.g. in a 10 sec window used for the interference measurement campaign. Second column 2104 includes the BS measured noise value (IM) information corresponding to each M slot number. In the reporting approach of FIG. 13, the master gNB receives data for each of the M-slots, and the master gNB, which has knowledge of which M-slots map to which slots positions (S0, S1, S2, S3, . . . , S9) in the radio frame, groups received data and averages data to obtain average gNB interference noise levels for each of the slots positions (S0, S1, S2, S3, . . . , S9) in the radio frame. The approach of FIG. 13 requires more signaling between the gNBs and the master gNB; however, the master gNB can obtain a more precise view of the overall interference in the network over shorter time intervals with the approach of FIG. 13.

FIG. 14 is a drawing of a table 2100 including exemplary TDD CSI-IM UE per M slot measurement report information, in accordance with an exemplary embodiment. FIG. 14 illustrates an alternative reporting format to the reporting format of FIG. 12. First column 2202 includes information identifying the M-slot number, where 1 represents the 1st designated M-slot, where 2 represents the 2nd designated M-slot, . . . , where 100 represents the 100th designated M-slot, e.g. in a 10 sec window used for the IM campaign. Second column 2104 includes average UE wideband measured noise value information corresponding to each M-slot number. Third column 2206 includes average UE subband 1 measured noise value information corresponding to each M-slot number. Column 2208 includes average UE subband n measured noise value information corresponding to each M-slot number. In the reporting approach of FIG. 14, the master gNB receives data for each of the M-slots, and the master gNB, which has knowledge of which M-slots map to which slots positions (S0, S1, S2, S3, . . . , S9) in the radio frame, groups received data and averages data to obtain average UE interference noise levels for each of the slots positions (S0, S1, S2, S3, . . . , S9) in the radio frame. The approach of FIG. 14 requires more signaling between the gNBs and the master gNB; however, the master gNB can obtain a more precise view of the overall interference in the network over shorter time intervals with the approach of FIG. 14.

In another alternative approach to reporting TDD CSI-IM UE measurement information from a gNB to a master gNB, the result of each individual wideband and subband interference measurement performed by a UE during an M-slot and reported to the gNB is forwarded to the master gNB, which performs correlation to radio slot positions and averaging.

Figure 15:
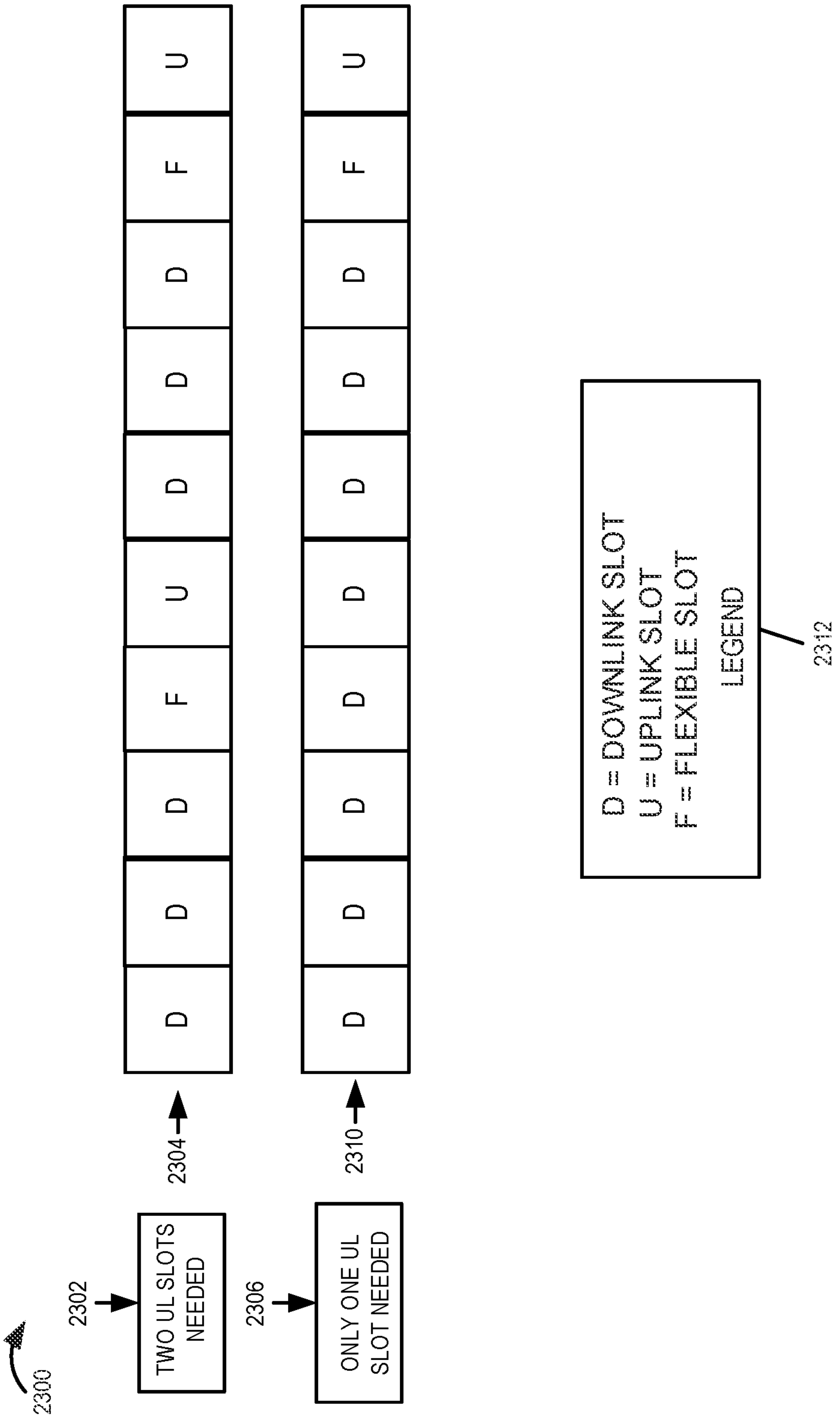
FIG. 15 is a drawing illustrating two exemplary TDD-UL-DL configurations, each TDD_UL-DL configuration including one or more downlink slots, one or more flexible slots and one or more uplink slots.

FIG. 15 is a drawing 2300 illustrating two exemplary TDD-UL-DL configurations (2304, 2306), and legend 2313. Legend 2312 indicates the D=downlink slot, U=uplink slot, and F=flexible slot. TDD-UL-DL configuration 2304 corresponds to an example where two UL slots were determined to be needed, as indicated in information box 2302, and the UL slots were selected based on network wide interference measurements during M-slots. TDD-UL-DL configuration 2310 corresponds to an example where one UL slot were determined to be needed, as indicated in information box 2306, and the UL slot was selected based on network wide interference measurements during M-slots.

FIG. 16 is a drawing which includes table 2400 which illustrates exemplary slot formats for a special slot. Column 2402 includes format indicator values. Columns (2404, 2406, 2408, 2410, 2412, 2414, 2416, 2418, 2420, 2422, 2424, 2426, 2428, 2430) includes information identifying the symbol designation for each symbol number (0, 1, 2, 3, 4, 5, 6, 7, 8, 9, 10, 11, 12, 13), respectively, of the slot for each of the identified slot format.

Row 2432 corresponds to slot format 0, in which each symbol of the slot is a DL symbol, and this slot format is sometimes referred to as a DL only slot or DL slot. Row 2434 corresponds to slot format 1, in which each symbol of the slot is an UL symbol, and this slot format is sometimes referred to as an UL only slot or UL slot. Row 2436 corresponds to slot format 2, in which each symbol of the slot is a flexible symbol, and this slot format is sometimes referred to as an flexible only slot. Row 2438 corresponds to slot format 3, which includes 13 DL symbols and one flexible symbol. Row 2440 corresponds to slot format 8, which includes 13 flexible symbols and one UL symbol. Row 2442 corresponds to slot format 19, which includes one DL slot, 12 flexible symbols and one UL symbol. Row 2444 correspond to slot format 55 which includes two DL symbols, followed by three flexible symbols, followed by three UL symbols, followed by six DL symbols.

Slot formats ranging from slot format 3 to slot format 55 are considered mixed slots, as they each include more than one different type of symbol in the slot. Slot formats 2 to slot formats 55 are considered to be flexible slots as each of these slots include at least one flexible symbol.

Row 2446 indicates that slot formats numbers 56-254 are reserved, e.g., for future use. Row 228 corresponds to slot format 255, in which the UE determines the format for the slot based on tdd-UL-DL-ConfigurationCommonDedicated and, if any, detected DCI formats.

Information box 2450 indicates: that each 1 msec slot has 14 symbols numbered (0, 1, 2, . . . , 12); each symbol can be UL, DL, or Flexible; D=downlink (DL) symbol; U=uplink (UL) symbol; F=flexible symbol; and each flexible symbol can be idle (used as guard symbol or reserved), used as an UL symbol or used as a DL symbol.

Various processes and exemplary embodiments will now be discussed further. Process 1 relates to gNB-to-gNB interference mitigation. Some exemplary implementations of process 1 include the following operations discussed below. In process 1 (e.g., procedure 1) the interference in a victim cell caused by the aggressor networks is periodically measured and a master device, e.g., base station, tries to reduce the gNB-to-gNB interference in the network by coordinating the UL slots of the victim network to align with the aggressor UL slots. In some embodiments, a victim network operator or device in the victim network designates a MASTER gNB cell which will dynamically determine the network-wide interference noise level. To make this determination the master gNB directs other cells in the network to start a per time-slot measurement. As a result of these measurements and associated reporting the master gNB will get periodic reports (e.g., every 1000 mSec) of the average UL SINR from reporting devices, e.g., base stations. If the average UL SINR of the overall network, e.g., entire network, is above a certain threshold (e.g., 10 dB) then the master gNB will do nothing to change the current operation.

However, if the average UL SINR for the overall network is below or equal to the overall network SINR threshold, the master gNB will trigger a "BS TDD configuration Channel State Information (CSI) Interference Measurement (IM) (BS_TDD_CSI-IM) campaign across the entire network. The campaign triggers a mode of operation in which some transmission slots will be intentionally left unused by BSs and UEs, allowing for measurements of interference from other sources, e.g., an aggressor network, to be made. BS_TDD_CSI-IM measurements are made at the base stations with the measurements measuring the noise plus interference per slot, but without any signals from device in the victim network. Since devices in the victim network remain quiet when the BS_TDD_CSI-IM measurements are made such measurement are sometimes referred to as a quiet test. The results of the measurements by the base stations, e.g., gNBs, are reported to the master gNB as individual measurements or average measured results. The master gNB also performs such interference measurements and averages its results. The average UL SINR for the overall network is determined by the master gNB from the received measurement information plus the results of the measurements made at the master gNB.

To minimize the impact of making the measurements as part of the measurement campaign on the serving network traffic, only a small portion, M slots of the N total slots (e.g., 1% of N slots) will be selected for TDD_CSIM_BS measurements. Thus, during the measurement mode of operation, a small fraction of transmission slots will intentionally go unused to allow the measurements to be made during a quiet period. The measurement campaign has a small impact on available resources as compared to normal mode of operation but does not significantly reduce network communications capacity and the measurement mode is not used all the time, e.g., it is triggered when it is likely to provide useful benefits with the trigger being based on the detection of poor or unsatisfactory UL SINR at one, more than one, or all the base stations in the network. The M slots selected as quiet measurement slots are, in some embodiments, randomly spaced in time to measure the CSI-IM in the network in such a way that it will guarantee or likely ensure that different time slots in a radio frame are included in the sample, e.g., the generated measurements will intentionally correspond to different time slots at different points in time.

During a measurement slot (interference measurement slot) sometimes referred to as an M slot, the master gNB will direct all the gNBs to not schedule any UL or DL activity i.e., no UE or gNB is scheduled to transmit during that slot. This is called "quiet" measurement, because the base stations will then only measure the background noise level, which is considered an aggressor interference noise. These M-slots are identified, e.g., communicated from the master gNB, to all the gNBs either via an algorithm or specific identification of the slots in a message. In at least one embodiment, during an M slot, all the gNBs in the network will perform "BS_TDD_CSI-IM" measurements. gNBs then transfer these per slots long and short-term BS_TDD_CSI-IM measurements to the Master gNB, where a record is kept to identify the TDD_CSIM per slot across the entire network including the BS_TDD_CSI-IM per slot of each cell. The master gNB uses these long-term statistics to modify the current TDD configuration pattern such that it will minimize the interference in its UL slots. This is achieved in some embodiments by reallocating the UL slots into the slot positions that are reporting the minimum BS_TDD_CSI-IM levels.

In some embodiments the master gNB generates a per slot average of all the gNB BS_TDD_CSI-IM measurements to get the long-term statistics of BS_TDD_CSI-IM of the entire network-wide. This is used in some embodiments as the overall average TDD_CSI-IM of the network. Once determined the master gNB conveys the new TDD pattern, e.g., the TDD re-configuration pattern, to the gNBs, e.g., all the gNBs, in the network to coordinate the TDD configurations in such a way that the UL slots are protected against the DL transmissions or other transmissions of the aggressor network(s) causing interference to the network, e.g., victim network, in which the master gNB is located.

In some embodiments the master gNB stops the BS_TDD_CSI-IM measurement, e.g., network operation in the measurement mode of operation returning operation to normal mode operation thereby maximizing use of transmission slots. The master gNB will trigger the measurement campaign and switch to the measurement mode of operation if the overall UL SINR of the network drops below the threshold as discussed above so that information can be collected to facilitate revision of the TDD schedule to take into consideration the effects of interference from an aggressor network causing information to the victim network in which the master gNB is located. The first procedure mitigates against TDD, Dynamic TDD as well as SBFD aggressors.

An example of time slot sampling used during a measurement mode of network operation, e.g., as part of procedure 1 (process 1) in one particular exemplary embodiment, will now be discussed.

Using GPS timing to synchronize to the radio frame, the M-slots are randomly distributed. For example, S0 in the first 10 mSec radio frame is an M-slot, then, after 100 mSec S1, then S2 after another 100 mSec, and so on. In 1000 msec every slot position in the radio frame has exactly 1 M-slot. In 10 second we can collect enough statistics from all the network, where each gNB and each UE has reported its receiver noise level 10 times. This way we limit our overhead to 1%. In this example, every 10 seconds a new decision about the frame configuration is sent to the network, and this means that the victim can configure its TDD pattern to protect against the aggressor, within a very short time. The above procedure provides the master gNB in the victim network important information in the form of: (1) Avg_Noise_per_slotgNB, the victim's gNB average noise per slot. Procedure 2 provides Avg_Noise_per_slotUE, the victim's UE average noise per slot. Both these pieces of information are available when procedures 1 and 2 are implemented. The master gNB decides to place the UL slots of the victim cells of its network in the slots having the lowest noise level. As an example, a master gNB may find that Slot 4 (S4) and slot 9 (S9) have the lowest noise level. The master gNB in generating a new TDD schedule then places the UL slot(s) of the victim gNBs in S4 and/or S9 slots to achieve a pattern of DDDSUDDDSU in one exemplary embodiment (if two UL slots are needed) or DDDDDDDDSU if a single UL slot is needed. In some embodiments, each local gNB scheduler will assign the two UL slots (in this example) by using this sorting priority: The less noisy to the cell edge users, and the more noisy to the better channel-condition users.

A second procedure, procedure 2 (process 2), which may be, and sometimes is, implemented alone or in combination with procedure 1 (process 1), will now be discussed. In procedure 2 the interference in a victim cell caused by the aggressor UE(s) is periodically measured and the master base station, e.g., master gNB, tries to reduce the UE-to-UE interference with the help of UEs in the victim network in which the master gNB is located. In procedure 2, like procedure 1, the victim network operator designates a master gNb cell. In the case where procedure 1 and 2 are used in combination the master gNB will be the same for both procedures. The master gNB then directs other cells in the victim network to start a per time-slot measurement. The Master gNB will get periodic reports (e.g., every 1000 mSec) of the average DL SINR. If the average DL SINR of the entire network is above a certain threshold (e.g., 10 dB) then the Master gNB will do nothing to change the current operation when procedure 2 is used as a standalone procedure. When Procedure 1 is also used in combination with procedure 2, and also reports "nothing" then it is a final "nothing" and the master gNB will not change the current operation. Otherwise, e.g., if the average DL SINR of the overall network is below or equal the DL SINR trigger threshold, the master gNB will trigger a "UE TDD configuration CSI-IM measurement (UE_TDD_CSI-IM)" campaign, e.g., operation network operation in a measurement mode of operation, across the entire network. UE_TDD_CSI-IM measures the noise plus interference per slot, but without any signal. Accordingly, this is a quiet test. UE_TDD_CSI-IM measurement includes, in some embodiments, wideband noise measurements on per slot basis as well as a sub-band noise measurements on a per slot pre symbol basis. That is sub-bands will be indicated to all the UEs by the gNBs and noise measurements per slot made for the sub-bands in addition to the noise measurements per slot for the wideband. To minimize the impact on the serving network traffic, only a small portion, M of the N total slots (e.g., 1% of N slots) are selected for UE_TDD_CSI-IM measurement. These M slots will be, in some embodiments, randomly spaced in time to measure the CSI in the network in such a way that it is likely to, or will, guarantee that different time slots in a radio frame are included in the sample, i.e., in the measurement which are made. During an M slot, the master gNB directs all the gNBs to not schedule any UL or DL activity i.e., no UE or gNB is scheduled to transmit during that slot. This is called "quiet" measurement, because only measures the background noise level which is considered an aggressor interference noise. The gNBs, e.g., all the gNBs in the victim network, indicate to the UEs attached to the gNBs, which slots are the "UE_TDD_CSI-IM slots". UEs will use those slots to perform UE_TDD_CSI-IM measurements. The UEs send their UE TDD_CSI-IM measurements back to their respective serving gNBs where long-term UE_TDD_CSI-IM statistics are kept for each cell of the serving gNBs. This makes procedure 2 different than procedure 1 in two ways: (a) procedure 2 measures DL instead of UL and (b) procedure 2 uses UEs reporting instead of gNBs. Therefore procedure 1 and procedure 2 provide different information which can be useful depending on the assignment being made.

Each serving gNB transfers these per slot long and short-term UE_TDD_CSI-IM measurements to the Master gNB, where a record is kept to identify the UE_TDD_CSI-IM per slot across the entire network including the UE_TDD_CSI-IM per slot of each cell. The Master gNB performs per slot averaging of the UE_TDD_CSI-IM_UE measurements to get the long-term statistics of UE_TDD_CSI-IM of the overall, e.g., entire, network. The master gNB uses these statistics to designate the slots. In some embodiments as part of procedure 2 or based on information collected in procedure 2, each local gNB scheduler will, and sometimes does, assign the different DL symbols to individual UEs by using this sorting method: The less DL noisy slots to the cell edge UEs, and the more noisy DL slots to the better channel-condition UEs.

In embodiments where procedure 1 and 2 are both used, procedure 1 is given priority in determining what slots are to be used for UL slots. In one such embodiment, slots remaining after allocation to satisfy uplink slot needs and UL slots have been allocated based on procedure 1, remaining slots are available for DL and/or flexible assignment via procedure 2. Given priority to UL slots is based on the fact that 3GPP studies show that the victim UL slots are severely interfered by an aggressor gNB much more than the victim DL slots which are interfered by the UEs of the aggressor network. This is due in large part to the fact that gNBs tend to transmit at higher power than UEs. For this reason, the Master gNB gives the UL slots higher priority than the DL slots allowing slots determined to be low noise by procedure 1 to be assigned as UL slots to the extent needed based on system UL slot requirements. Slots available for assignment are prioritized based on the interference determinations made in procedure 2 with the slots subject to lower noise then being assigned as DL slots prior to remaining available slots with higher noise being assigned for other slots such as for flexible slots. In this way UL slots will tend to be prioritized over DL slots since they are the slots most likely to be adversely impacted by interference from the aggressor network. Using procedure 1 and 2 together is going to mitigate both gNB-to-gNB interference as well as UE-to-UE interference. Using procedure 1 only, is recommended if UE-to-UE interference is not an issue, while, procedure 2 can be used as standalone if gNB-to-gNB interference is not an issue. Process 1 involves determining uplink SINR and/or noise affecting the uplink. Thus process 1 is normally used to determine which slots should be assigned to an UL.

Process 2 can be used to obtain information on DL noise/DL SINR which can be taken into consideration when assigning resources and/or DL slots to UEs.

When process 2 is used with process 1, UL slots will be given priority over DL slots with the less noisy UL slots identified via process 1. In these cases less noisy UL slots from process 1 will first be allocated as UL slots as needed, with remaining less noisy DL slots from process 2 then being allocated as DL slots to the extent needed and then any remaining slots allocated as flexible. Process 2 when used by itself can be used to select the DL slots as its high priority, and then the UL slots, and finally the flexible. It can also help in the assignment of resources to UEs at local gNBs, by providing the measurements results.

Process 2 is used in most embodiments in combination with process 1 so that UL slots will be given priority over DL slot assignments in many embodiments due to the use of both processes. Thus, when process 1 and process 2 are used UL slots are intentionally given priority in terms of being assigned to less noisy slots prior to downlink slot assignment when developing a network wide TDD assignment.

In embodiments where flexible slots are included in the network-wide TDD assignment after needed UL symbols and DL symbols are assigned, the rest of the symbols are left as flexible, which means the lowest priority.

However, in other cases flexible slots are not given priority over downlink slots in terms of priority in terms of being assigned to less noisy slots with the slots remaining after assignment of the less noisy slots for uplink use, being assigned as either DL or Flexible slots to the extent a schedule includes such slots.

In some embodiments in addition to communicating the overall TDD schedule to base stations, the master communicates information about the noise level and/or ranked noise ordering (e.g. low noise to high noise) of the UL/DL slots. The communication of UL and/or DL interference information provided by the master device is particularly useful to a base station for scheduling UEs and/or assigning resources. As will be discussed below in some embodiments process 3 is used by individual base stations to identify UEs likely to suffer from interference, e.g., UEs at the edge of the cell to which the base station corresponds, and then to use slot interference information obtained from the master device or measured at the base station when making resource and/or slot assignments. The measurements made in process 1 and 2 are made when devices in the network using the information are not transmitting and thus reflect interference from an aggressor network. Such information can be useful and is different than the interference information obtained by a base station which makes measures while other devices in the network to which the base station belongs are transmitting in which case the measured interference is a combination of interference from devices in the victim network as well as interference from the aggressor network.

Thus, the bases stations in the network, e.g., victim network implementing processes 1, 2 and/or 3, can and sometimes do take this noise related information into account when scheduling (e.g., assigning slots to UEs) UL/DL. In various embodiments, a base station, e.g., gNB scheduler, will give priority to cell edge UEs by assigning them the less noisy DL slots and/or resources.

Even in the case where the cell does not include cell edge UEs, interference information can be and sometimes is taken into consideration. During periods of light traffic load, slots may go unused because the total UL and/or DL traffic to be communicated is less than the available UL and/or DL capacity at the base station. In at least some such cases, the base station will can still use the supplied interference information (e.g., noise level and/or slot ranking information) provided by the master when assigning slots for use. When some slots will go unused due to lack of traffic, in some embodiments slots known to have lower interference will be assigned for use prior to slots having higher interference. This increases the chance of successful communication and also allows less interference to be created since fewer retransmissions and/or lower power can be used based on the use of slots which are likely to be subject to lower interference from aggressor networks with such information being based on the interference information communicated to the base station from the master device.

This second procedure mitigates against TDD, Dynamic TDD as well as SBFD aggressors.

A third procedure (process 3), which can be implemented by gNBs, and which is used in combination with procedures 1 and/or 2 or by itself in some embodiments will now be discussed. In procedure 3 the interference in a victim cell in the victim network caused by the aggressor network(s) is periodically measured and the gNB in the victim network then tries to reduce the UE-to-UE interference at the cell edge, e.g., interference encountered by cell edge UEs, with the help of UEs in the victim network. In accordance with procedure 3 each gNB may, and sometimes does, direct its connected UEs, to start "UE TDD configuration CSI-IM measurement (UE_TDD_CSI-IM)" campaign. UE_TDD_CSI-IM measurement will include wideband noise measurements per slots as well as sub-band (sub-bands will be indicated to all the UEs by the gNBs) noise measurements per slot. As in other measurement modes of operation, to minimize the impact on the serving network traffic, only a small portion of the N total slots (e.g., 1% of N slots) will be selected for UE_TDD_CSI-IM measurement. These M slots will be randomly spaced in time to measure the CSI-IM in the network in such a way that it will guarantee that different time slots in a radio frame are included in the sample, e.g., in the measurements. During an M slot, a gNB will not schedule any UL or DL activity. This is called "quiet" measurement, because we only measure the background noise level, which is considered an aggressor interference noise. All the gNBs will indicate to the UEs attached to it, which slots are the "UE_TDD_CSI-IM slots". UEs will use those slots to perform UE_TDD_CSI-IM" measurements. All the UEs will report their UE_TDD_CSI-IM measurements back to the serving gNB, where long-term UE_TDD_CSI-IM statistics is kept for each UE attached to the serving gNB. In the non-quiet periods gNBs will ask the UEs to transmit SRS signals. These signals will be used by the gNBs to perform SINR measurements. If the measured SINRs per UE at the gNB is below a certain threshold (e.g., 0 dB to 2 dB) then those UEs will be termed as cell edge UEs by the serving gNB. Based on the UE_TDD_CSI-IM measurements statistics, gNB will employ any of the following for the cell edge UEs to receive DL traffic. An individual gNB will schedule the UEs it is providing service to in the same slot of the radio frame but in different sub-bands (or tones) that reported less noise/interference level. The gNB will schedule the UEs in a different slot of the radio frames and in a sub-band (or tones) that reported less noise/interference level. The gNB may, and sometimes does, use dynamic flexible symbols to schedule the UEs at a different symbol and/or sub-bands. Since procedure 3 is performed at individual gNBs the interference measured and used for the UE assignments at the different gNBs will vary. The third procedure mitigates against TDD, Dynamic TDD as well as SBFD aggressors.

In various embodiments the master base station 1600 schedules UEs to which it provides service in the same or similar manner that other gNBs 1700 schedule their UEs but the master device uses the interference information that it receives from the other device along with its own interference measurements. The the master device 1600 assigns UEs to which it provides service slots and/or symbols of slots in the same or similar manner other devices perform the scheduling but without having to receive the interference information from a master device since it is the master device. In essence the scheduler 1647 of the master base station 1600 receives the average interference information generated by the processor 1602 of the master base station directly without the need for it to be communicated outside the master base station 1600 for the master base station to use such information. The master base station 1600 like the other base stations 1700 will give preference to cell edge UEs and provide them less noisy slots (UL and/or DL) as part of the scheduling process with non-cell edge UEs being assigned more noisy slots and/or symbols than were assigned to cell edge UEs.

Various features and embodiments will now be presented as sets of numbered embodiments. Reference to a preceding numbered embodiment in the below sets refers to the preceding numbered embodiment in the same set.

Numbered Method Embodiments Set 1

Numbered method embodiment 1. A method of operating a master device (e.g., gNB 102 designated as a master) in a communications network (101) comprising:

comparing an average SINR (step 288 UL SINR in case of embodiment 1 or step 628 in case of embodiment 2) for the overall network to a channel state information interference measurement (CSI-IM) trigger threshold; in response to said comparing determining that the average SINR for the overall network is below the CSI-IM trigger threshold, initiating (296 or 636) (e.g., triggering) a time division duplex (TDD) channel state information interference measurement mode of operation to be implemented by multiple network devices in the communications network (gNBs in the case of embodiment 1 and gNBs and UEs in the case of embodiment 2); and controlling (298 and/or 638) (e.g., by sending a command or request in a message to cause the measurements to be made) multiple network devices (e.g., gNBs 104, 106, 102, 108, 110 and/or UEs 122, 130, 112, 138, 146)) to perform multiple CSI-IM measurements (334, 336, 338, 340, 342 and/or 704, 706, 708, 710, 712) while operating in said CSI-IM mode of operation.

Numbered method embodiment 1D. The method of Numbered method embodiment 1, wherein the master device is a base station (1600), the method further comprising: identifying (1158) cell edge UEs receiving service from the master device; scheduling (1247) UEs receiving service from the master device (e.g. UEs in the cell corresponding to the master device which is a base station) for UL transmission, scheduling UEs for UL transmission including assigning less noisy UL slots to cell edge UEs, and assigning more noisy (e.g., slots which are noiser than the slots assigned to the cell edge users UL slots to non-cell edge UEs (e.g., UEs with better UL channel-conditions than cell edge UEs).

Numbered method embodiment 1E. The method of Numbered method embodiment 1D, further comprising: scheduling (1247) UEs receiving service from the master device for DL transmission, scheduling UEs for DL transmission including assigning less noisy DL slots to cell edge UEs, and assigning more noisy DL slots to non-cell edge UEs (e.g., UEs with better DL channel-conditions than cell edge UEs are assigned noisier DL slots than the DL slots which were assigned to the cell edge UEs).

Numbered method embodiment 1F. The method of Numbered method embodiment 1, further comprising: scheduling (1247) UEs receiving service from the master device for DL transmission, scheduling UEs for DL transmission including assigning less noisy DL slots to cell edge UEs, and assigning more noisy DL slots to non-cell edge UEs (e.g., non-cell edge UEs are assigned slots which are noisier than the DL slots assigned to cell edge UEs).

Numbered method embodiment 1G. The method of Numbered method embodiment 1, further comprising: scheduling (1247) UEs receiving service from the master device (e.g. UEs in the cell corresponding to the master device which is a base station) for UL transmission, scheduling UEs for UL transmission including assigning less symbols of UL slots to cell edge UEs, and assigning more noisy symbols of UL slots to non-cell edge UEs thereby giving cell edge UEs preferential treatment with regard to symbols of uplink slots so that they will get assigned symbols of UL slots which on average have been determined to be less noisy than the symbols assigned to non-cell edge UES (e.g., symbols in uplink slots which are noisier than the slots assigned to the cell edge UE will be assigned to non-cell edge UEs).

Numbered method embodiment 2. The method of Numbered method embodiment 1, wherein controlling the multiple network devices to perform multiple CSI-IM measurements while operating in said CSI-IM mode of operation includes controlling base stations (gNBs 104, 106, 102, 108, 110) to make interference measurements (334, 336, 338, 340, 342) during measurement (M) slots in which base stations and UEs in the communications network (101) do not transmit.

Numbered method embodiment 3. The method of Numbered method embodiment 2, wherein said M slots occupy less than 2% (e.g., approximately 1%) of available slots in a TDD timing structure used by said communications network during the measurement mode of operation.

Numbered method embodiment 3A. The method of Numbered method embodiment 3, wherein slots used as measurement slots during said measurement mode of operation are used as normal communications slots on which signals are transmitted by one or more devices in the communications network during the normal mode of operation.

Numbered method embodiment 3B. The method of Numbered method embodiment 1, further comprising: receiving (266, 272, 278, 284) average UL SINR reports from multiple gNBs in said network; generating (285) an average UL SINR for the overall (e.g., entire) network based on the received average UL SINR reports received from the multiple gNBs.

Numbered method embodiment 3C. The method of Numbered method embodiment 3B, wherein the master device is a base station; and wherein generating (285) an average UL SINR for the overall (e.g., entire) network further includes further basing the average UL SINR for the overall network on UL SINR reports corresponding to the master device (e.g., SINR reports generated by the base station which is the master device) or an average UL SINR report corresponding to the master device (e.g., an average UL SINR report for the base station which is the master device).

Numbered method embodiment 3D. The method of Numbered method embodiment 3B, wherein said average SINR reports from the multiple gNBs are reports corresponding to a normal mode of operation (e.g., a mode in which a larger portion of slots are allocated for communications of data between UEs and gNBs than during the CSI-IM mode of operation in which at least some slots are intentionally left unused to support CSI-IM measurements).

Numbered method embodiment 4. The method of Numbered method embodiment 1, further comprising: receiving (606, 612, 618, 624) average DL SINR reports from multiple gNBs in said network; generating (625) an average DL SINR for the overall (e.g., entire) network based on received average DL SINR reports received from the multiple gNBs.

Numbered method embodiment 5. The Numbered method embodiment of claim 4, wherein said average DL SINR reports from the multiple gNBs are reports corresponding to a normal mode of operation (e.g., a mode in which a larger portion of slots are allocated for communications of data between UEs and gNBs than during the CSI-IM mode of operation in which at least some slots are intentionally left unused to support CSI-IM measurements).

Numbered method embodiment 5A. The method of Numbered method embodiment 1, wherein controlling (638) the multiple network devices to perform multiple CSI-IM measurements while operating in said CSI-IM mode of operation includes controlling (e.g., by sending a request to other gNBs to start UE per slot measurements and reporting) user equipments (UEs) (122, 130, 112, 138, 146) to make interference measurements (704, 706, 708, 710, 712) during measurement (M) slots in which base stations and UEs in the communications network (101) do not transmit.

Numbered method embodiment 5B. The method of Numbered method embodiment 1, wherein said controlling the multiple network devices to perform multiple CSI-IM measurements while operating in said CSI-IM mode of operation controls UEs to perform TDD_CSI-IM wideband and subband measurement during M slots.

Numbered method embodiment 6. The method of Numbered method embodiment 1, further comprising: receiving, (348, 354, 360, 366 in process 1 or 798, 806, 812, 818 in process 2) at the master device, TDD_CSI-IM measurement reports (TDD_CSI-IM_BS per slot measurement reports in the case of process 1 and TDD_CSI-IM_UE per slot measurement reports in the case of process 2).

Numbered method embodiment 7. The method of Numbered method embodiment 6, further comprising: determining (370 or 822) a new network wide TDD configuration to be implemented based on the received TDD_CSI-IM measurement reports.

Numbered method embodiment 8. The method of Numbered method embodiment 7, wherein determining (370) a new network wide TDD configuration to be implemented based on the received TDD_CSI-IM measurement reports includes generating a TDD-UL-DL configuration by assigning UL slots to time intervals determined to have the lowest interference levels.

Numbered method embodiment 8A. The method of Numbered method embodiment 8, wherein determining (370) a new network wide TDD configuration to be implemented based on the received TDD_CSI-IM measurement reports includes: generating (3701) a per slot average for TDD CSI-IM measurements to obtain long term statistics in the form of an average BS TDD CSI-IM for the overall network on a per slot basis, different average overall BS TDD CSI-IM values being generated for each slot used in the network.

Numbered method embodiment 8A1. The method of Numbered method embodiment 8A, further comprising: communicating (371), from the master device (master gNBM 102), to one or more base stations (104, 106, 108, 110) in the communications network (101) per slot BS interference information (e.g., per slot average noise information which the receiving base station can take into account when assigning slots to UEs and/or when assigning resources within a slot to a UE).

Numbered method embodiment 8A2. The method of Numbered method embodiment 8A1, wherein said per slot BS interference information includes one or both of i) per slot noise information or ii) slot ranking information where the slot ranking indicates a ranked order of slots based on measured noise.

Numbered method embodiment 8B. The method of Numbered method embodiment 8, further comprising: designating (3702) slots with the lowest noise as uplink (UL) slots in the network wide TDD configuration (e.g., network wide TDD schedule being generated) up to the number of UL slots to be included in the network wide TDD configuration (as needed); and designating (3703) the remaining slots available in the network wide TDD configuration as downlink (DL) slots or flexible slots.

Numbered method embodiment 9. The method of Numbered method embodiment 7, wherein determining (822) a new network wide TDD configuration to be implemented based on the received TDD_CSI-IM measurement reports includes: generating (824) a per slot average for TDD CSI-IM measurements to obtain long term statistics in the form of an average UE TDD CSI-IM for the overall network on a per slot basis, different average overall UE TDD CSI-IM values being generated for each slot used in the network.

Numbered method embodiment 10. The method of Numbered method embodiment 9, further comprising: communicating (8271), from the master device (master gNBM 102), to one or more base stations (104, 106, 108, 110) in the communications network (101) per slot UE interference information (e.g., per slot average noise information which the receiving base station can take into account when assigning slots to UEs and/or when assigning resources within a slot to a UE).

Numbered method embodiment 10AA. The method of Numbered method embodiment 9, wherein said per slot UE interference information includes one or both of i) per slot noise information or ii) slot ranking information where the slot ranking indicates a ranked order of slots based on measured noise.

Numbered method embodiment 10B. The method of Numbered method embodiment 9, further comprising: designating (826) slots with the lowest noise as downlink (DL) slots in the network wide TDD configuration (e.g., network wide TDD schedule being generated) up to the number of DL slots to be included in the network wide TDD configuration; and designating (827) the remaining slots available in the network wide TDD configuration as uplink (UL) slots.

Numbered method embodiment 11. The method of Numbered method embodiment 7, further comprising: communicating the new network wide TDD configuration to devices (e.g., gNBs which then communicate it to UEs) in said communications network (step 372 in embodiment 1 and step 828 in embodiment 2).

Numbered method embodiment 12. The method of Numbered method embodiment 11, further comprising: operating (404, 405, 406, 407, 408 or 860, 861, 862, 863, 864) devices (e.g., gNBs 102, 104, 106, 108, 110 and UEs) in said communications network (101) in the normal mode operation using the new network wide TDD configuration.

Numbered Apparatus Embodiment Set 1

Numbered apparatus embodiment 1. A master device (e.g., gNB 1600 designated as a master) in a communications network (101) comprising: a wireless interface 1604; and a processor (1602) configured to control the master device to: compare an average SINR (step 288 UL SINR in case of embodiment 1 or step 628 in case of embodiment 2) for the overall network to a channel state information interference measurement (CSI-IM) trigger threshold; initiate (296 or 636), in response to said comparing determining that the average SINR for the overall network is below the CSI-IM trigger threshold, a time division duplex (TDD) channel state information interference measurement mode of operation to be implemented by multiple network devices in the communications network (gNBs in the case of embodiment 1 and gNBs and UEs in the case of embodiment 2); and control (298 and/or 638) (e.g., by causing command or request messages to be transmitted to cause the measurements to be made) multiple network devices (e.g., gNBs 104, 106, 102, 108, 110 and/or UEs 122, 130, 112, 138, 146)) to perform multiple CSI-IM measurements (334, 336, 338, 340, 342 and/or 704, 706, 708, 710, 712) while operating in said CSI-IM mode of operation.

Numbered apparatus embodiment 2. The master device of Numbered apparatus embodiment 1, wherein the processor is further configured to control an interface (1606) of the master device to: send messages to the multiple network devices to control them to perform multiple CSI-IM measurements while operating in said CSI-IM mode of operation includes controlling base stations (gNBs 104, 106, 102, 108, 110) to make interference measurements (334, 336, 338, 340, 342) during measurement (M) slots in which base stations and UEs in the communications network (101) do not transmit.

Numbered apparatus embodiment 2A. The master device of Numbered apparatus embodiment 2, wherein said interface (1606) includes an Xn or F1 interface used to communicate with one or more other base stations in the communications network (101).

Numbered apparatus embodiment 3. The master device of Numbered apparatus embodiment 1, wherein said M slots occupy less than 2% (e.g., approximately 1%) of available slots in a TDD timing structure used by said communications network during the measurement mode of operation.

Numbered apparatus embodiment 3A. The master device of Numbered apparatus embodiment 3, wherein slots used as measurement slots during said measurement mode of operation are used as normal communications slots on which signals are transmitted by one or more devices in the communications network during the normal mode of operation.

Numbered apparatus embodiment 3B. The master device of Numbered apparatus embodiment 1, The master device of claim 1, wherein the processor (1602) is further configured to control the master device (1600) to: receive (266, 272, 278, 284) average UL SINR reports from multiple gNBs in said network; and generate (285) an average UL SINR for the overall (e.g., entire) network based on the received average UL SINR reports received from the multiple gNBs.

Numbered apparatus embodiment 3C. The master device of Numbered apparatus embodiment 3B, wherein the master device (1600) is a base station; and wherein the processor (1602) is configured to control the master device to: base the average UL SINR for the overall network on UL SINR reports corresponding to the master device (e.g., SINR reports generated by the base station which is the master device) or an average UL SINR report corresponding to the master device (e.g., an average UL SINR report for the base station which is the master device).

Numbered apparatus embodiment 3D. The master device of Numbered apparatus embodiment 3B, wherein said average SINR reports from the multiple gNBs are reports corresponding to a normal mode of operation (e.g., a mode in which a larger portion of slots are allocated for communications of data between UEs and gNBs than during the CSI-IM mode of operation in which at least some slots are intentionally left unused to support CSI-IM measurements).

Numbered apparatus embodiment 4. The master device of Numbered apparatus embodiment 1, wherein the processor is further configured to control the master device to: receive (606, 612, 618, 624) average DL SINR reports from multiple gNBs in said network; and generate (625) an average DL SINR for the overall (e.g., entire) network based on received average DL SINR reports received from the multiple gNBs.

Numbered apparatus embodiment 5. The master device of Numbered apparatus embodiment 4, wherein said average DL SINR reports from the multiple gNBs are reports corresponding to a normal mode of operation (e.g., a mode in which a larger portion of slots are allocated for communications of data between UEs and gNBs than during the CSI-IM mode of operation in which at least some slots are intentionally left unused to support CSI-IM measurements).

Numbered apparatus embodiment 6. The master device of Numbered apparatus embodiment 1, wherein the processor is further configured to control the master device to: receive, (348, 354, 360, 366 in process 1 or 798, 806, 812, 818 in process 2) at the master device, TDD_CSI-IM measurement reports (TDD_CSI-IM_BS per slot measurement reports in the case of process 1 and TDD_CSI-IM_UE per slot measurement reports in the case of process 2).

Numbered apparatus embodiment 7. The master device (1600) of Numbered apparatus embodiment 6, wherein the processor (1602) is further configured to control the master device (1600) to: determine (370 or 822) a new network wide TDD configuration to be implemented based on the received TDD_CSI-IM measurement reports.

Numbered apparatus embodiment 8. The master device (1600) of Numbered apparatus embodiment 7, wherein the processor (1602) is configured, as part of being configured to control the master device to determine (370) the new network wide TDD configuration to be implemented based on the received TDD_CSI-IM measurement reports, generate a TDD-UL-DL configuration by assigning UL slots to time intervals determined to have the lowest interference levels.

Numbered apparatus embodiment 8A. The master device (1600) of Numbered apparatus embodiment 8, wherein as part of being configured to control the master device to determine (370) the new network wide TDD configuration to be implemented based on the received TDD_CSI-IM measurement reports, the processor (1602) is configured to: generate (3701) a per slot average for TDD CSI-IM measurements to obtain long term statistics in the form of an average BS TDD CSI-IM for the overall network on a per slot basis, different average overall BS TDD CSI-IM values being generated for each slot used in the network.

Numbered apparatus embodiment 8B. The master device (1600) of Numbered apparatus embodiment 8, wherein the processor (1602) is further configured to: designate (3702) slots with the lowest noise as uplink (UL) slots in the network wide TDD configuration (e.g., network wide TDD schedule being generated) up to the number of UL slots to be included in the network wide TDD configuration (as needed); and designate (3703) the remaining slots available in the network wide TDD configuration as downlink (DL) slots or flexible slots.

Numbered apparatus embodiment 9. The master device (1600) of Numbered apparatus embodiment 7, wherein as part of being configured to control the master device to determine (822) a new network wide TDD configuration to be implemented based on the received TDD_CSI-IM measurement reports, the processor is configured to control the master device to: generate (824) a per slot average for TDD CSI-IM measurements to obtain long term statistics in the form of an average UE TDD CSI-IM for the overall network on a per slot basis, different average overall UE TDD CSI-IM values being generated for each slot used in the network.

Numbered apparatus embodiment 10. The master device (1600) of Numbered apparatus embodiment 9, wherein the processor (1602) is further configured to control the master device (1600) to: designate (826) slots with the lowest noise as downlink (DL) slots in the network wide TDD configuration (e.g., network wide TDD schedule being generated) up to the number of DL slots to be included in the network wide TDD configuration; and designate (827) the remaining slots available in the network wide TDD configuration as uplink (UL) slots.

Numbered apparatus embodiment 11. The master device (1600) of Numbered apparatus embodiment 7, wherein the processor (1602) of the master device is further configured to control the master device (1600) to: communicate the new network wide TDD configuration to devices (e.g., gNBs which then communicate it to UEs) in said communications network (step 372 in embodiment 1 and step 828 in embodiment 2).

Numbered apparatus embodiment 12. The master device (1600) of Numbered apparatus embodiment 11, wherein the processor (1602) is further configured to control the master device (1600) to: control devices (e.g., gNBs 102, 104, 106, 108, 110 and UEs) in said communications network (101) to operate in the normal mode operation using the new network wide TDD configuration.

Non-Transitory Computer Readable Embodiments Set 1

Embodiment 1. A non-transitory computer readable medium including processor executable instructions which when executed by a processor of a master device in a communications network controls the master device to perform the steps of: comparing an average SINR for the overall network to a channel state information interference measurement (CSI-IM) trigger threshold; in response to said comparing determining that the average SINR for the overall network is below the CSI-IM trigger threshold, initiating a time division duplex (TDD) channel state information interference measurement mode of operation to be implemented by multiple network devices in the communications network; and controlling multiple network devices to perform multiple CSI-IM measurements while operating in said CSI-IM mode of operation.

Numbered Method Embodiment Set 2

Numbered method embodiment 1. A method of operating a base station (e.g., gNB 2002, 1600 or 1700), comprising: instructing (1174) user equipments UEs (2004, 2006, 2008, 2010) receiving service from the base station (2002) to start performing TDD_CSI-IM measurements in slots (e.g., M slots) in which the base station (2002) does not transmit; receiving (1206, 1214, 1222, 1230, 1240) noise reports from UEs indicating detected per slot noise levels; deciding (1242), based on the received noise reports, to reschedule downlink traffic to at least some UEs (e.g., cell edge UEs) based on the received noise reports; and scheduling (12491), as part of a rescheduling operation, the first UE to receive downlink (DL) traffic on a different subband than a first subband to which the first UE is assigned, or on a different slot than a slot on which the first UE was assigned or on both the different subband and the different slot.

Numbered method embodiment 1AA. The method of Numbered method embodiment 1, wherein said base station (e.g., gNB 2002, 1600 or 1700) does not schedule any UE to transmit during the slots (M-slots) which are used to perform TDD CSI-IM measurements.

Numbered method embodiment 1A. The method of Numbered method embodiment 1, further comprising: deciding (1172), based on UE SINR values, to initiate a UE TDD_CSI-IM measurement campaign.

Numbered method embodiment 1B. The method of Numbered method embodiment 1A, wherein deciding to initiate a UE TDD_CSI-IM measurement campaign is in response to determining that a UE (2004) receiving service from the base station (2002) has an average SINR below a cell edge threshold level.

Numbered method embodiment 2. The method of Numbered method embodiment 1, wherein instructing (1174) user equipments UEs (2004, 2006, 2008, 2010) receiving service from the base station (e.g., gNB 2002, 1600 or 1700) to start performing TDD_CSI-IM measurements in slots (e.g., M slots) in which the base station (2002) does not transmit includes: indicating to the UEs identifying measurement slots in which the base station will not transmit.

Numbered method embodiment 3. The method of Numbered method embodiment 2, wherein instructing (1174) user equipments UEs (2004, 2006, 2008, 2010) receiving service from the base station (2002) to start performing TDD_CSI-IM measurements in slots (e.g., M slots) in which the base station (2002) does not transmit further includes: identifying frequency subbands on which the UEs are to measure interference and report the results of the interference measurements.

Numbered method embodiment 4. The method of Numbered method embodiment 1, further comprising: communicating (1258) the different subband, different slot, or different subband and different slot to the first UE in a scheduling message.

Numbered method embodiment 5. The method of Numbered method embodiment 4, further comprising: determining (1128, 1138, 1146, 1156) average uplink SINR values corresponding to UEs receiving service from the base station; and identifying (1158) edge UEs based on the determined SINR values corresponding to individual UEs, the first UE being a UE that is identified as an edge UE.

Numbered method embodiment 6. The method of Numbered method embodiment 5, wherein the at least some UEs for which DL traffic rescheduling is decided to be implemented are UEs which were identified as edge UEs.

Numbered method embodiment 6A. The method of Numbered method embodiment 6 wherein downlink traffic rescheduling is not performed for one or more non-edge cell UEs (e.g., UEs receiving from the base station but which were not identified as cell edge UEs).

Numbered method embodiment 7. The method of Numbered method embodiment 6, wherein scheduling (12491) the first UE includes assigning the first UE a DL slot having the lowest reported noise, said DL slot being from a set of DL slots being used by the base station.

Numbered method embodiment 8. The method of Numbered method embodiment 7, wherein scheduling (12491) the first UE includes assigning the first UE a frequency subband for DL communications having the lowest reported noise, said assigned frequency subband being from a set of frequency subbands being used by the base station.

Numbered method embodiment 9. The method of Numbered method embodiment 1, further comprising: receiving (1269) per slot noise information (e.g., average BS measured and/or UE measured per slot noise information with, in some embodiments, per symbol noise information being included with the per slot noise information, provided by a master device in process 1 or 2) from another device (e.g., the master device) in the communications network; and using the average per slot noise information when making assignments of slots or resources within slots to UEs.

Numbered method embodiment 10. The method of Numbered method embodiment 9, wherein the average per slot noise information includes average per slot UE measured noise information; and wherein the method incudes: operating a scheduler (1746 or 1747) in the base station (e.g., gNB 2002, 1600 or 1700) to assign DL slots having lower average per slot noise levels to cell edge UEs with non-cell edge UEs being assigned DL slots having higher average per slot noise levels.

Numbered method embodiment 11. The method of Numbered method embodiment 10 wherein the received per slot noise information ranks slots in order based on per slot noise; and wherein assigning DL slots includes assigning the slots corresponding to a lower noise ranking to cell edge UEs before assigning other slots to non-cell edge UEs.

Numbered method embodiment 12. The method of Numbered method embodiment 9, wherein the average per slot noise information includes average per slot BS measured noise information.

Numbered method embodiment 13. The method of Numbered method embodiment 12 wherein the method further incudes: operating a scheduler (1647 or 1747) in the base station (e.g., gNB 2002, 1600 or 1700) to assign UL slots having lower average per slot noise BS measured noise levels to cell edge UEs with non-cell edge UEs being assigned UL slots having higher average per slot BS measured noise levels.

Numbered method embodiment 14. The method of Numbered method embodiment 13 wherein the received per slot noise information ranks slots in order based on per slot noise; and wherein operating a scheduler (1646 or 1647) (in the base station (e.g., gNB 2002, 1600 or 1700) to assign UL slots includes assigning the slots corresponding to a lower noise ranking to cell edge UEs before assigning other slots to non-cell edge UEs.

Numbered method embodiment 15. The method of Numbered method embodiment 9, wherein the average per slot noise information includes average per symbol UE measured noise information; and wherein the method incudes: operating a scheduler (1647 or 1747) in the base station (e.g., gNB 2002, 1600 or 1700) to assign symbols in DL slots having lower average UE measured per slot noise levels to cell edge UEs with non-cell edge UEs being assigned DL slots having higher average per slot UE measured noise levels.

Numbered method embodiment 16. The method of Numbered method embodiment 15 wherein the received per slot noise information ranks symbols in DL slots in order based on per slot noise; and wherein operating a scheduler (1646 or 1747) in the base station (e.g., gNB 2002, 1600 or 1700) to assign symbols in DL slots includes assigning symbols in DL slots that correspond to a lower (e.g., first) noise ranking to cell edge UEs before assigning other symbols in DL slots that correspond to a higher (e.g., second) noise ranking to non-cell edge UEs.

Numbered method embodiment 17. The method of Numbered method embodiment 9, wherein the average per slot noise information includes average per symbol BS measured noise information; and wherein the method incudes: operating a scheduler in the base station to assign UL symbols of uplink slots that have lower average per slot noise BS measured noise levels to cell edge UEs with non-cell edge UEs being assigned symbols of UL slots that have higher average per slot BS measured noise levels.

Numbered method embodiment 18. The method of Numbered method embodiment 9, wherein the received per slot BS measured noise information ranks symbols in order based on per symbol noise; and wherein operating a scheduler in the base station to assign symbols of UL slots includes assigning the symbols of uplink slots, corresponding to lower BS measured noise rankings (e.g., noise rankings of symbols based on BS noise measurements communicated from the master device), to cell edge UEs before assigning other symbols having higher noise rankings (i.e., nosier slots) to non-cell edge UEs.

Numbered Apparatus Embodiments Set 2

Numbered apparatus embodiment 1. A base station (e.g., gNB 2002 or 1600 or 1700), comprising: a wireless interface (1604 or 1704); and a processor (1602 or 1702) configured to control the base station to: instruct (1174) user equipments UEs (2004, 2006, 2008, 2010) receiving service from the base station (2002) to start performing TDD_CSI-IM measurements in slots (e.g., M slots) in which the base station (2002) does not transmit; receive (1206, 1214, 1222, 1230, 1240) noise reports from UEs indicating detected per slot noise levels; decide (1242), based on the received noise reports, to reschedule downlink traffic to at least some UEs (e.g., cell edge UEs) based on the received noise reports; and schedule (1248), as part of a rescheduling operation, the first UE to receive downlink (DL) traffic on a different subband than a first subband to which the first UE is assigned, or on a different slot than a slot on which the first UE was assigned, or on both the different subband and the different slot.

Numbered apparatus embodiment 1AA. The base station (2002 or 1600 or 1700) of Numbered apparatus embodiment 1, wherein said base station does not schedule any UEs to transmit during the slots (M-slots) which are used to perform TDD CSI-IM measurements.

Numbered apparatus embodiment 1A. The base station (2002 or 1600 or 1700) of Numbered apparatus embodiment 1, wherein the processor is further configured to control the base station to: decide (1172), based on UE SINR values, to initiate a UE TDD_CSI-IM measurement campaign.

Numbered apparatus embodiment 1B. The base station (2002 or 1600 or 1700) of Numbered apparatus embodiment 1, wherein the processor is further configured to control the base station to: wherein as part of being configured to decide to initiate a UE TDD_CSI-IM measurement campaign the processor is configured to: make said decision to initiate a UE TDD_CSI-IM measurement campaign in response to determining that a UE (2004) receiving service from the base station (2002) has an average SINR below a cell edge threshold level.

Numbered apparatus embodiment 2. The base station (2002 or 1600 or 1700) of Numbered apparatus embodiment 1, wherein the processor us configured to control the base station to: indicate to the UEs identifying measurement slots in which the base station will not transmit as part of instructing (1174) user equipments UEs (2004, 2006, 2008, 2010) to start performing TDD_CSI-IM measurements in slots.

Numbered apparatus embodiment 3. The base station (2002 or 1600 or 1700) of Numbered apparatus embodiment 1, wherein the processor is further configured to control the base station to: indicate to the UEs identifying measurement slots in which the base station will not transmit as part of instructing (1174) user equipments UEs (2004, 2006, 2008, 2010) to start performing TDD_CSI-IM measurements in slots; and identifying frequency subbands on which the UEs are to measure interference and report the results of the interference measurements as part of instructing (1174) user equipments UEs (2004, 2006, 2008, 2010) to start performing TDD_CSI-IM measurements in slots.

Numbered apparatus embodiment 4. The base station (2002 or 1600 or 1700) of Numbered apparatus embodiment 1, wherein the processor is further configured to control the base station to: communicate (1258) the different subband, different slot, or different subband and different slot to the first UE in a scheduling message as part of instructing (1174) user equipments UEs (2004, 2006, 2008, 2010) to start performing TDD_CSI-IM measurements in slots.

Numbered apparatus embodiment 5. The base station (2002 or 1600 or 1700) of Numbered apparatus embodiment 1, wherein the processor is further configured to control the base station to: determine (1128, 1138, 1146, 1156) average uplink SINR values corresponding to UEs receiving service from the base station; and identify (1158) edge UEs based on the determined SINR values corresponding to individual UEs, the first UE being a UE that is identified as an edge UE.

Numbered apparatus embodiment 6. The base station (2002 or 1600 or 1700) of Numbered apparatus embodiment 1, wherein the at least some UEs for which DL traffic rescheduling is decided to be implemented are UEs which were identified as edge UEs.

Numbered apparatus embodiment 6A. The base station (2002 or 1600 or 1700) of Numbered apparatus embodiment 1, wherein downlink traffic rescheduling is not performed for one or more non-edge cell UEs (e.g., UEs receiving from the base station but which were not identified as cell edge UEs).

Numbered apparatus embodiment 7. The base station (2002 or 1600 or 1700) of Numbered apparatus embodiment 1, wherein the processor is further configured, as part of being configured to control the base station to schedule (1248) the first UE, to control the base station to: assign the first UE a DL slot having the lowest reported noise, said DL slot being from a set of DL slots being used by the base station.

Numbered apparatus embodiment 8. The base station (2002 or 1600 or 1700) of Numbered apparatus embodiment 1, wherein the processor is further configured, as part of being configured to control the base station to schedule (1248) the first UE, to control the base station to: assign the first UE a frequency subband for DL communications having the lowest reported noise, said assigned frequency subband being from a set of frequency subbands being used by the base station.

Numbered Non-Transitory Computer Readable Medium Embodiment Set 2

1. A non-transitory computer readable medium including processor executable instructions which when executed by a processor of a base station in a communications network controls the base station to perform the steps of: instructing user equipments (UEs) receiving service from the base station to start performing TDD_CSI-IM measurements in slots in which the base station does not transmit; receiving noise reports from UEs indicating detected per slot noise levels; deciding, based on the received noise reports, to reschedule downlink traffic to at least some UEs based on the received noise reports; and scheduling, as part of a rescheduling operation, the first UE to receive downlink (DL) traffic on a different subband than a first subband to which the first UE is assigned, or on a different slot than a slot on which the first UE was assigned or on both the different subband and the different slot.

Numbered Method Embodiment Set 3

Numbered method embodiment 1. A method of operating a base station (BS) (e.g., gNB 2002, 1600 or 1700), comprising: identifying (step 1158) cell edge UEs based on signal to interference noise measurements; receiving (step 1269) per slot noise information from another device (e.g., a master base station where the per slot noise information may include information on per symbol noise in each slot and may include noise information measured by one or more base stations (BS noise information which can be provided in some cases as an average and/or UE measured noise information which in some cases is provided as an average or from other base stations); and operating a scheduler (1646 or 1647) in the base station (2002) to schedule UEs for UL transmission, scheduling UEs for UL transmission including i) assigning less noisy UL slots to cell edge UEs and assigning more noisy UL slots to non-cell edge UEs (e.g. UEs with better UL channel-conditions than cell edge UEs), ii) assigning less noisy symbols of UL slots to cell edge UEs and assigning more noisy symbols of UL slots to non-cell edge UEs (e.g. UEs with better UL channel-conditions than cell edge UEs) or iii) prioritizing non-cell UEs with regard to both less noisy slots and less noisy symbols over non-cell UEs when assigning UL slots or symbols to UEs.

Numbered method embodiment 2. The method of Numbered method embodiment 1, wherein the received per slot noise information include BS measured noise information (e.g., average per slot BS noise information communicated to the BS from the master device); and wherein operating the scheduler (1647 or 1747) in the base station (e.g., gNB 2002, 1600 or 1700), to schedule UEs for UL transmission comprises: assigning less noisy UL slots (e.g., as determined based on the received per slot noise information), to cell edge UEs, and assigning more noisy UL slots to non-cell edge UEs (e.g., UEs with better DL channel-conditions than cell edge UEs).

Numbered method embodiment 3. The method of Numbered method embodiment 1, wherein the received per slot noise information include BS measured noise information on a per symbol basis for uplink slots (e.g., average per symbol per slot BS measured noise information for slots which are to be used as uplink slots that was communicated to the BS from the master device); and wherein operating the scheduler (1647 or 1747) in the base station (e.g., gNB 2002, 1600 or 1700) to schedule UEs for UL transmission comprises: assigning less noisy symbols of UL slots (e.g., as determined based on the received per symbol per slot noise information), to cell edge UEs, and assigning more noisy symbols of UL slots to non-cell edge UEs (e.g., UEs with better DL channel-conditions than cell edge UEs).

Numbered method embodiment 4. The method of Numbered method embodiment 1, wherein the received per slot noise information include UE measured noise information (e.g., average per slot UE noise information corresponding to slots to be used as DL slots, communicated to the BS from the master device); and wherein operating the scheduler further comprises: operating the scheduler (1647 or 1747) in the base station (e.g., gNB 2002, 1600 or 1700) to schedule UEs for DL transmission, scheduling UEs for DL transmission including assigning less noisy DL slots (e.g., as determined based on the received UE measured per slot noise information corresponding to DL slots), to cell edge UEs, and assigning more noisy DL slots to non-cell edge UEs (e.g., UEs with better DL channel-conditions than cell edge UEs).

Numbered method embodiment 5. The method of Numbered method embodiment 1, wherein the received per slot noise information includes UE measured noise information on a per symbol basis for downlink slots (e.g., average per symbol per slot UE measured noise information for slots which are to be used as downlink slots with the noise information having been communicated to the BS from the master device); and wherein operating the scheduler (1647 or 1747) in the base station (e.g., gNB 2002, 1600 or 1700) to schedule UEs for DL transmission comprises: assigning less noisy symbols of DL slots (e.g., as determined based on the received per symbol per slot noise information), to cell edge UEs, and assigning more noisy symbols of DL slots to non-cell edge UEs (e.g., UEs with better DL channel-conditions than cell edge UEs).

Numbered method embodiment 6. The method of Numbered method embodiment 1, wherein said another device is a master device (1600) which received BS interference measurement information from multiple base stations in the network in which said base station is located.

Numbered method embodiment 7. The method of Numbered method embodiment 6, wherein said received per slot noise information includes average per slot noise information generated from base station measurements corresponding to uplink slots in a network transmission schedule used by the base station.

Numbered method embodiment 8. The method of Numbered method embodiment 7, wherein said received per slot noise information includes average per slot noise information generated from UE noise measurements corresponding to downlink slots in a network transmission schedule used by the base station.

Numbered Apparatus Embodiments Set 3

Numbered apparatus embodiment 1. A base station (BS) (e.g., gNB 2002, 1600, 2004, or 1700), comprising: a receiver (1716) for receiving information from another device (e.g., a master device); a processor (1702) configured to control the base station: identify (step 1158) cell edge UEs based on signal to interference noise measurements; operate the receiver to receive (step 1269) per slot noise information from another device (e.g., a master base station where the per slot noise information may include information on per symbol noise in each slot and may include noise information measured by one or more base stations (BS noise information which can be provided in some cases as an average and/or UE measured noise information which in some cases is provided as an average); and control a scheduler (1647 or 1747) in the base station (2004 or 1700) to schedule UEs for UL transmission, scheduling UEs for UL transmission including i) assigning less noisy UL slots to cell edge users and assigning more noisy UL slots to non-cell edge UEs (e.g. UEs with better UL channel-conditions than cell edge UEs), ii) assigning less noisy symbols of UL slots to cell edge users and assigning more noisy symbols of UL slots to non-cell edge UEs (e.g. UEs with better UL channel-conditions than cell edge UEs) or iii) prioritizing non-cell UEs with regard to both less noisy slots and less noisy symbols over non-cell UEs when assigning UL slots or symbols to UEs.

Numbered apparatus embodiment 2. The base station (e.g., gNB 2002, 1600, 2004, or 1700) of Numbered apparatus embodiment 1, wherein the received per slot noise information include BS measured noise information (e.g., average per slot BS noise information communicated to the BS from the master device); and wherein controlling the scheduler (1647 or 1648) in the base station (e.g., gNB 2002, 1600, 2004, or 1700) to schedule UEs for UL transmission includes controlling the schedule to: assign less noisy UL slots (e.g., as determined based on the received per slot noise information), to cell edge users, and assigning more noisy UL slots to non-cell edge UEs (e.g., UEs with better DL channel-conditions than cell edge UEs).

Numbered apparatus embodiment 3. The base station (e.g., gNB 2002, 1600, 2004, or 1700) of Numbered apparatus embodiment 1, wherein the received per slot noise information includes BS measured noise information on a per symbol basis for uplink slots (e.g., average per symbol per slot BS measured noise information for slots which are to be used as uplink slots that was communicated to the BS from the master device); and wherein controlling the scheduler (1646, 1647) in the base station (e.g., gNB 2002, 1600, 2004, or 1700) to schedule UEs for UL transmission includes controlling the scheduler to: assign less noisy symbols of UL slots (e.g., as determined based on the received per symbol per slot noise information), to cell edge UEs, and assign more noisy symbols of UL slots to non-cell edge UEs (e.g., UEs with better DL channel-conditions than cell edge UEs).

Numbered apparatus embodiment 4. The base station (e.g., gNB 2002, 1600, 2004, or 1700) of Numbered apparatus embodiment 1, wherein the received per slot noise information includes UE measured noise information (e.g., average per slot UE measured noise information corresponding to slots to be used as DL slots) and wherein the processor (1602 or 1702) is configured to: operate the scheduler (1647 or 1747) in the base station (e.g., gNB 2002, 1600, 2004, or 1700) to schedule UEs for DL transmission, scheduling UEs for DL transmission including assigning less noisy DL slots (e.g., as determined based on the received UE measured per slot noise information corresponding to DL slots), to cell edge UEs, and assigning more noisy DL slots to non-cell edge UEs (e.g., UEs with better DL channel-conditions than cell edge UEs).

Numbered apparatus embodiment 5. The base station (e.g., gNB 2002, 1600, 2004, or 1700) of Numbered apparatus embodiment 1, wherein the received per slot noise information includes UE measured noise information on a per symbol basis for downlink slots (e.g., average per symbol per slot UE measured noise information for slots which are to be used as downlink slots with the noise information having been communicated to the BS from the master device); and wherein the processor (1602 or 1702) is configured to control the scheduler in the base station, as part of scheduling UEs for DL transmission, to: assign less noisy symbols of DL slots (e.g., as determined based on the received per symbol per slot noise information), to cell edge UEs, and assign more noisy symbols of DL slots to non-cell edge UEs (e.g., UEs with better DL channel-conditions than cell edge UEs).

Numbered apparatus embodiment 6. The base station of Numbered apparatus embodiment 1, wherein said another device is a master device (1600) which received BS interference measurement information from multiple base stations in the network in which said base station is located.

Numbered apparatus embodiment 7. The base station of Numbered apparatus embodiment 6, wherein said received per slot noise information includes average per slot noise information generated from base station measurements corresponding to uplink slots.

Numbered apparatus embodiment 8. The base station of Numbered apparatus embodiment 7, wherein said received per slot noise information includes average per slot noise information generated from UE noise measurements corresponding to downlink slots in a network transmission schedule used by the base station.

The techniques of various embodiments may be implemented using software, hardware and/or a combination of software and hardware. Various embodiments are directed to apparatus, e.g., base stations, access points, user equipment (UE) devices, core network devices, etc. Various embodiments are also directed to methods, e.g., method of controlling and/or operating base stations, UEs such as smartphones, desktop computers, portable computers, and/or other devices with wireless capability, and core network devices.

Various exemplary described methods and apparatus are well suited for use in a wireless communications network implementing TDD, which may be located in the vicinity of another wireless communications network also implementing TDD, which may be operating on the same spectrum or partially overlapping spectrum. The spectrum may be, and sometimes is unlicensed spectrum which may be used by multiple networks in the same region, and the multiple networks may be uncoordinated with regard to their UL-DL TDD configuration and/or may dynamically vary their UL-DL TDD configuration, e.g., without giving notification to adjacent networks.

Various embodiments are also directed to a machine, e.g., computer, readable medium, e.g., ROM, RAM, CDs, hard discs, etc., which include machine readable instructions for controlling a machine to implement one or more steps of a method, e.g., any one of the methods described herein. The computer readable medium is, e.g., non-transitory computer readable medium. It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present the various steps in a sample order and are not meant to be limited to the specific order or hierarchy presented. In some embodiments, one or more processors are used to carry out one or more steps of each of the described methods.

In various embodiments each of the steps or elements of a method are implemented using one or more processors. In some embodiments, each of elements or steps are implemented using hardware circuitry.

In various embodiments devices, e.g., base stations, access points, UEs, and/or core network devices that are described herein are implemented using one or more components to perform the steps corresponding to one or more methods. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements.

Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., user (UE) devices, base stations, access points, core network devices include a processor configured to control the device to perform steps in accordance with one of the methods described herein. The configuration of the processor may be, and sometimes is, achieved by using one or more components, e.g., software components, to control processor configuration and/or by including hardware in the processor, e.g., hardware components, to perform the recited steps and/or control processor configuration.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in a base station, an AP, a UE, a mobile communications system, and/or a core network, for example, but could be in other devices as well. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a master device in a communications network comprising:

comparing an average Signal-to-Interference-plus-Noise Ratio (SINR) for the overall network to a channel state information interference measurement (CSI-IM) trigger threshold;

in response to said comparing determining that the average SINR for the overall network is below the CSI-IM trigger threshold, initiating a time division duplex (TDD) CSI-IM mode of operation to be implemented by multiple network devices in the communications network; and controlling multiple network devices to perform multiple CSI-IM measurements while operating in said CSI-IM mode of operation.

2. The method of claim 1, wherein controlling the multiple network devices to perform multiple CSI-IM measurements while operating in said CSI-IM mode of operation includes controlling base stations to make interference measurements during measurement (M) slots in which base stations and UEs in the communications network do not transmit.

3. The method of claim 2, wherein said M slots occupy less than 2% of available slots in a TDD timing structure used by said communications network during the CSI-IM mode of operation.

4. The method of claim 1, further comprising:

receiving average DL SINR reports from multiple gNBs in said communications network; and generating an average DL SINR for the overall network based on received average DL SINR reports received from the multiple gNBs.

5. The method of claim 4, wherein said average DL SINR reports from the multiple gNBs are reports corresponding to a normal mode of operation.

6. The method of claim 1, further comprising:

receiving, at the master device, TDD_CSI-IM measurement reports.

7. The method of claim 6, further comprising:

determining a new network wide TDD configuration to be implemented based on the received TDD_CSI-IM measurement reports.

8. The method of claim 7, wherein determining a new network wide TDD configuration to be implemented based on the received TDD_CSI-IM measurement reports includes generating a TDD-UL-DL configuration by assigning UL slots to time intervals determined to have the lowest interference levels.

9. The method of claim 7, wherein determining a new network wide TDD configuration to be implemented based on the received TDD_CSI-IM measurement reports includes:

generating a per slot average for TDD CSI-IM measurements to obtain long term statistics in the form of an average UE TDD CSI-IM for the overall network on a per slot basis, different average overall UE TDD CSI-IM values being generated for each slot used in the communications network.

10. The method of claim 9, further comprising:

communicating, from the master device, to one or more base stations in the communications network per slot UE interference information.

11. The method of claim 7, further comprising:
communicating the new network wide TDD configuration to devices in said communications network.

12. The method of claim 11, further comprising:
operating devices in said communications network in a normal mode of operation using the new network wide TDD configuration.

13. A master device in a communications network comprising: a wireless interface; and a processor configured to control the master device to: compare an average Signal-to-Interference-plus-Noise Ratio (SINR) for the overall network to a channel state information interference measurement (CSI-IM) trigger threshold; initiate, in response to said comparing determining that the average SINR for the overall network is below the CSI-IM trigger threshold, a time division duplex (TDD) CSI-IM mode of operation to be implemented by multiple network devices in the communications network; and control multiple network devices to perform multiple CSI-IM measurements while operating in said CSI-IM mode of operation.

14. The master device of claim 13, wherein the processor is further configured to control an interface of the master device to: send messages to the multiple network devices to control them to perform multiple CSI-IM measurements while operating in said CSI-IM mode of operation, said messages controlling base stations to make interference measurements during measurement (M) slots in which base stations and UEs in the communications network do not transmit.

15. The master device of claim 13, wherein said M slots occupy less than 2% of available slots in a TDD timing structure used by said communications network during the CSI-IM mode of operation.

16. The master device of claim 13, wherein the processor is further configured to control the master device to:
receive average DL SINR reports from multiple gNBs in said communications network; and
generate an average DL SINR for the overall network based on received average DL SINR reports received from the multiple gNBs.

17. The master device of claim 16, wherein said average DL SINR reports from the multiple gNBs are reports corresponding to a normal mode of operation.

18. The master device of claim 13, wherein the processor is further configured to control the master device to:
receive, at the master device, TDD_CSI-IM measurement reports.

19. The master device of claim 18, wherein the processor is further configured to control the master device to:
determine a new network wide TDD configuration to be implemented based on the received TDD_CSI-IM measurement reports.

20. A non-transitory computer readable medium including processor executable instructions which when executed by a processor of a master device in a communications network controls the master device to perform the steps of:
comparing an average Signal-to-Interference-plus-Noise Ratio (SINR) for the overall network to a channel state information interference measurement (CSI-IM) trigger threshold;
in response to said comparing determining that the average SINR for the overall network is below the CSI-IM trigger threshold, initiating a time division duplex (TDD) CSI-IM mode of operation to be implemented by multiple network devices in the communications network; and
controlling multiple network devices to perform multiple CSI-IM measurements while operating in said CSI-IM mode of operation.

* * * * *